(12) United States Patent
Lin et al.

(10) Patent No.: US 11,234,191 B2
(45) Date of Patent: *Jan. 25, 2022

(54) METHOD AND APPARATUS FOR POWER SAVING SIGNAL DESIGN IN NR

(71) Applicant: Samsung Electronics Co., Ltd., Suwon-si (KR)

(72) Inventors: Qiongjie Lin, Mountain View, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,584

(22) Filed: May 11, 2020

(65) Prior Publication Data

US 2020/0275372 A1 Aug. 27, 2020

Related U.S. Application Data

(63) Continuation of application No. 16/360,883, filed on Mar. 21, 2019, now Pat. No. 10,652,826.

(60) Provisional application No. 62/647,279, filed on Mar. 23, 2018, provisional application No. 62/655,408, filed on Apr. 10, 2018, provisional application No. 62/656,191, filed on Apr. 11, 2018, provisional application No. 62/660,586, filed on Apr. 20, 2018, provisional application No. 62/661,833, filed on Apr. 24, 2018, provisional application No. 62/664,521, (Continued)

(51) Int. Cl.
*H04B 1/38* (2015.01)
*H04W 52/02* (2009.01)

(52) U.S. Cl.
CPC ... *H04W 52/0235* (2013.01); *H04W 52/0219* (2013.01)

(58) Field of Classification Search
CPC .......... H04W 72/042; H04W 52/0216; H04W 52/0229; H04W 52/0235; H04W 72/0446; H04W 24/08; H04W 52/0219; H04W 48/12; H04W 72/1289; H04W 74/006
See application file for complete search history.

(56) References Cited

U.S. PATENT DOCUMENTS 9,872,252 B1  1/2018  Ang et al.
2017/0265171 A1  9/2017  Alvarino et al.
(Continued)

FOREIGN PATENT DOCUMENTS

WO  2014073799 A1  5/2014
WO  2014134807 A1  9/2014

OTHER PUBLICATIONS

3GPP TSG RAN WG1 Meeting #91 R1-1719471 Reno, USA, Nov. 27-Dec. 1, 2017 (Year: 2017).*
(Continued)

*Primary Examiner* — Khalid W Shaheed

(57) ABSTRACT

A method of a user equipment (UE) for power saving is provided. The method comprises receiving, from a serving cell, a set of configurations, receiving a power saving signal (PoSS) from a first downlink channel based on the received set of configurations, acquiring a first part of information for power saving from the PoSS, receiving, based on the received set of configurations, a second downlink channel that is a control channel, and acquiring a second part of information for the power saving from the received second downlink channel.

20 Claims, 32 Drawing Sheets

Related U.S. Application Data filed on Apr. 30, 2018, provisional application No. 62/665,687, filed on May 2, 2018, provisional application No. 62/680,826, filed on Jun. 5, 2018, provisional application No. 62/683,352, filed on Jun. 11, 2018, provisional application No. 62/690,058, filed on Jun. 26, 2018, provisional application No. 62/724,985, filed on Aug. 30, 2018, provisional application No. 62/726,629, filed on Sep. 4, 2018, provisional application No. 62/741,947, filed on Oct. 5, 2018, provisional application No. 62/755,222, filed on Nov. 2, 2018, provisional application No. 62/768,237, filed on Nov. 16, 2018, provisional application No. 62/771,864, filed on Nov. 27, 2018, provisional application No. 62/772,273, filed on Nov. 28, 2018, provisional application No. 62/790,760, filed on Jan. 10, 2019, provisional application No. 62/815,089, filed on Mar. 7, 2019.

(56) References Cited

U.S. PATENT DOCUMENTS

| | | | |
|---|---|---|---|
| 2017/0318620 A1 | 11/2017 | Tseng et al. | |
| 2019/0150114 A1* | 5/2019 | Liu | H04W 72/0446 370/252 |
| 2019/0200296 A1* | 6/2019 | Liu | H04W 24/10 |
| 2019/0261281 A1* | 8/2019 | Jung | H04W 72/14 |
| 2019/0369201 A1* | 12/2019 | Akkarakaran | G01S 5/0215 |

OTHER PUBLICATIONS

3GPP TSG-RAN WG1 Meeting #91 R1-1719351 Reno, Nevada, USA, Nov. 27-Dec. 1, 2017 (Year: 2017).*

U.S. Appl. No. 62/630,597 entitled "Method and Apparatus for Power Savings in New Radio Systems," filed Feb. 14, 2018, 30 pages.

Supplementary European Search Report dated Feb. 16, 2021 from the European Patent Office in connection with a counterpart European patent application No. 19770862.1, 14 pages.

Intel Corporation: "WUS consideration for eFeMTC", 3GPP TSG RAN WG2 Meeting #101, Athens, Greece, Feb. 26-Mar. 2, 2018, R2-1803302, 6 pages.

Qualcomm Incorporated, "Wake-Up Signaling for C-DRX", 3GPP TSG RAN WG2 RAN2#100, Reno, USA, Nov. 27-Dec. 1, 2017, R2-1713803 (Resubmission of R2-1711702), 5 pages.

Qualcomm Incorporated: "Advanced Grant Indication for UE Power Saving", 3GPP TSG RAN WG1 #90bis, Prague, Czech Republic, Oct. 9-13, 2017, R1-1718558, 5 pages.

Intellectual Property India, Examination Report dated Aug. 16, 2021 regarding Application No. 202047041113, 6 pages.

European Patent Office, Communication pursuant to Article 94(3) EPC dated Sep. 9, 2021 regarding Application No. 19770862.1, 5 pages.

* cited by examiner

METHOD AND APPARATUS FOR POWER SAVING SIGNAL DESIGN IN NR

CROSS-REFERENCE TO RELATED APPLICATION(S) AND CLAIM OF PRIORITY

This application is a continuation of U.S. patent application Ser. No. 16/360,883, filed on Mar. 21, 2019, which claims priority to:
U.S. Provisional Patent Application No. 62/647,279, filed on Mar. 23, 2018;
U.S. Provisional Patent Application No. 62/655,408, filed on Apr. 10, 2018;
U.S. Provisional Patent Application No. 62/656,191, filed on Apr. 11, 2018;
U.S. Provisional Patent Application No. 62/660,586, filed on Apr. 20, 2018;
U.S. Provisional Patent Application No. 62/661,833, filed on Apr. 24, 2018;
U.S. Provisional Patent Application No. 62/664,521, filed on Apr. 30, 2018;
U.S. Provisional Patent Application No. 62/665,687, filed on May 2, 2018;
U.S. Provisional Patent Application No. 62/680,826, filed on Jun. 5, 2018;
U.S. Provisional Patent Application No. 62/683,352, filed on Jun. 11, 2018;
U.S. Provisional Patent Application No. 62/690,058, filed on Jun. 26, 2018;
U.S. Provisional Patent Application No. 62/724,985, filed on Aug. 30, 2018;
U.S. Provisional Patent Application No. 62/726,629, filed on Sep. 4, 2018;
U.S. Provisional Patent Application No. 62/741,947, filed on Oct. 5, 2018;
U.S. Provisional Patent Application No. 62/755,222, filed on Nov. 2, 2018;
U.S. Provisional Patent Application No. 62/768,237, filed on Nov. 16, 2018;
U.S. Provisional Patent Application No. 62/771,864, filed on Nov. 27, 2018;
U.S. Provisional Patent Application No. 62/772,273, filed on Nov. 28, 2018;
U.S. Provisional Patent Application No. 62/790,760, filed on Jan. 10, 2019; and
U.S. Provisional Patent Application No. 62/815,089, filed on Mar. 7, 2019.
The content of the above-identified patent documents is incorporated herein by reference.

TECHNICAL FIELD

The present disclosure relates generally to power saving operation. Specifically, the present disclosure relates to power saving signal design in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide methods and apparatuses for power saving signal design in an advanced wireless communication system.

In one embodiment, a user equipment (UE), a user equipment (UE) for power saving is provided. The UE comprises a transceiver configured to receive, from a serving cell, a set of configurations and receive, from the serving cell, a power saving signal (PoSS) over a first downlink channel based on the received set of configurations. The UE further comprises a processor operably connected to the transceiver, the processor configured to acquire a first part of information for power saving from the PoSS. The UE further comprises the transceiver configured to receive, based on the received set of configurations, a second downlink channel that is a control channel. The UE further comprises the processor configured to acquire a second part of information for the power saving from the received second downlink channel.

In another embodiment, a serving cell (e.g., serving BS) for power saving is provided. The serving cell comprises a transceiver configured to transmit, to a user equipment (UE), a set of configurations, transmit, to the UE, a power saving signal (PoSS) over a first downlink channel based on the transmitted set of configurations, wherein a first part of information for power saving is acquired, by the UE, from the PoSS, and transmit, based on the transmitted set of configurations, a second downlink channel that is a control channel, wherein a second part of information for the power saving is acquired, by the UE, from the transmitted second downlink channel.

In yet another embodiment, a method of a user equipment (UE) for power saving is provided. The method comprises receiving, from a serving cell, a set of configurations, receiving a power saving signal (PoSS) from a first downlink channel based on the received set of configurations, acquiring a first part of information for power saving from the PoSS, receiving, based on the received set of configurations, a second downlink channel that is a control channel, and acquiring a second part of information for the power saving from the received second downlink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
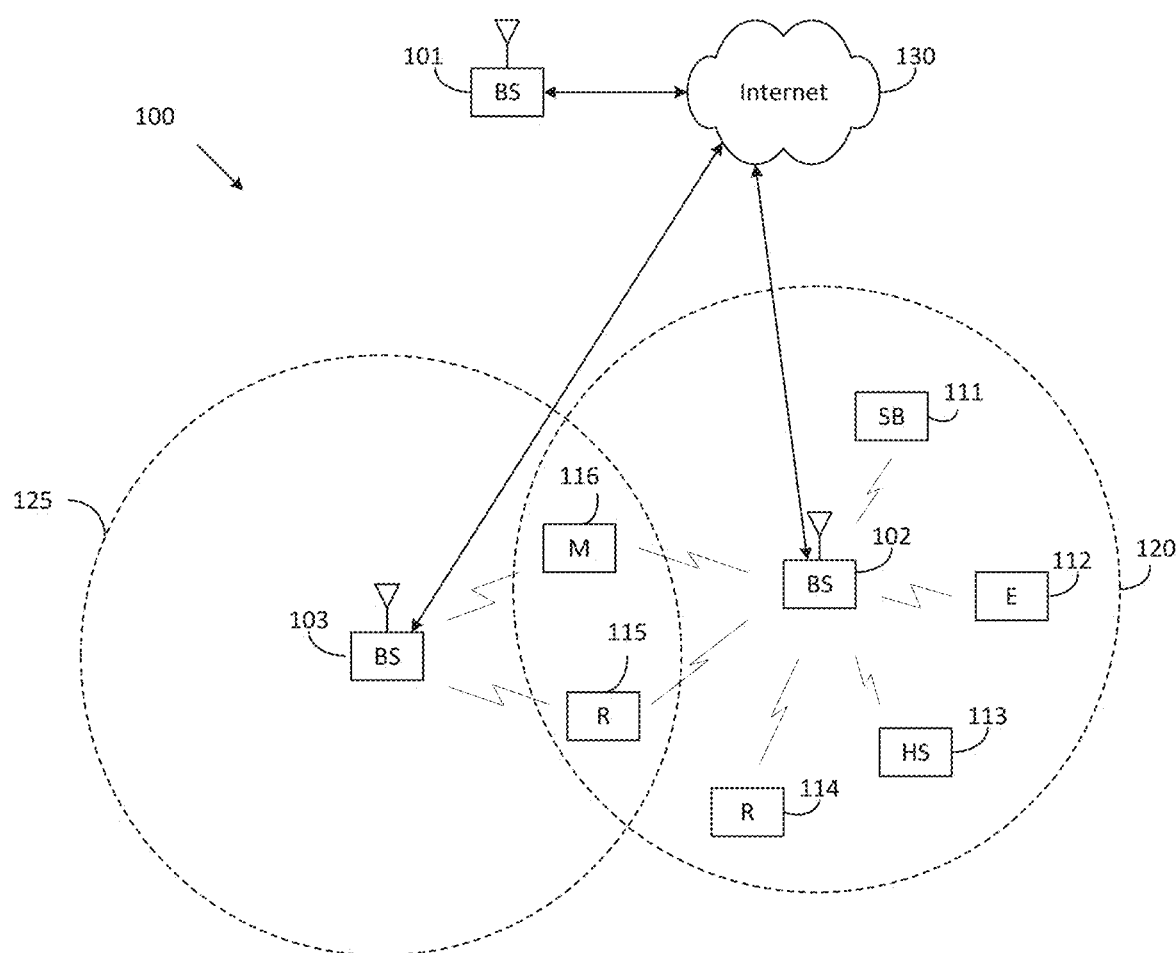
FIG. 1 illustrates an example wireless network according to embodiments of the present disclosure.

FIG. 1 through FIG. 36, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and channel coding;" 3GPP TS 38.213 v15.4.0, "NR; Physical layer procedures for control;" 3GPP TS 38.214 v15.4.0, "NR; Physical layer procedures for data;" 3GPP TS 38.215 v15.4.0, "NR; Physical layer measurements;" 3GPP TS 38.321 v15.4.0, "NR; Medium Access Control (MAC) protocol specification;" and 3GPP TS 38.331 v15.4.0, "NR; Radio Resource Control (RRC) protocol specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
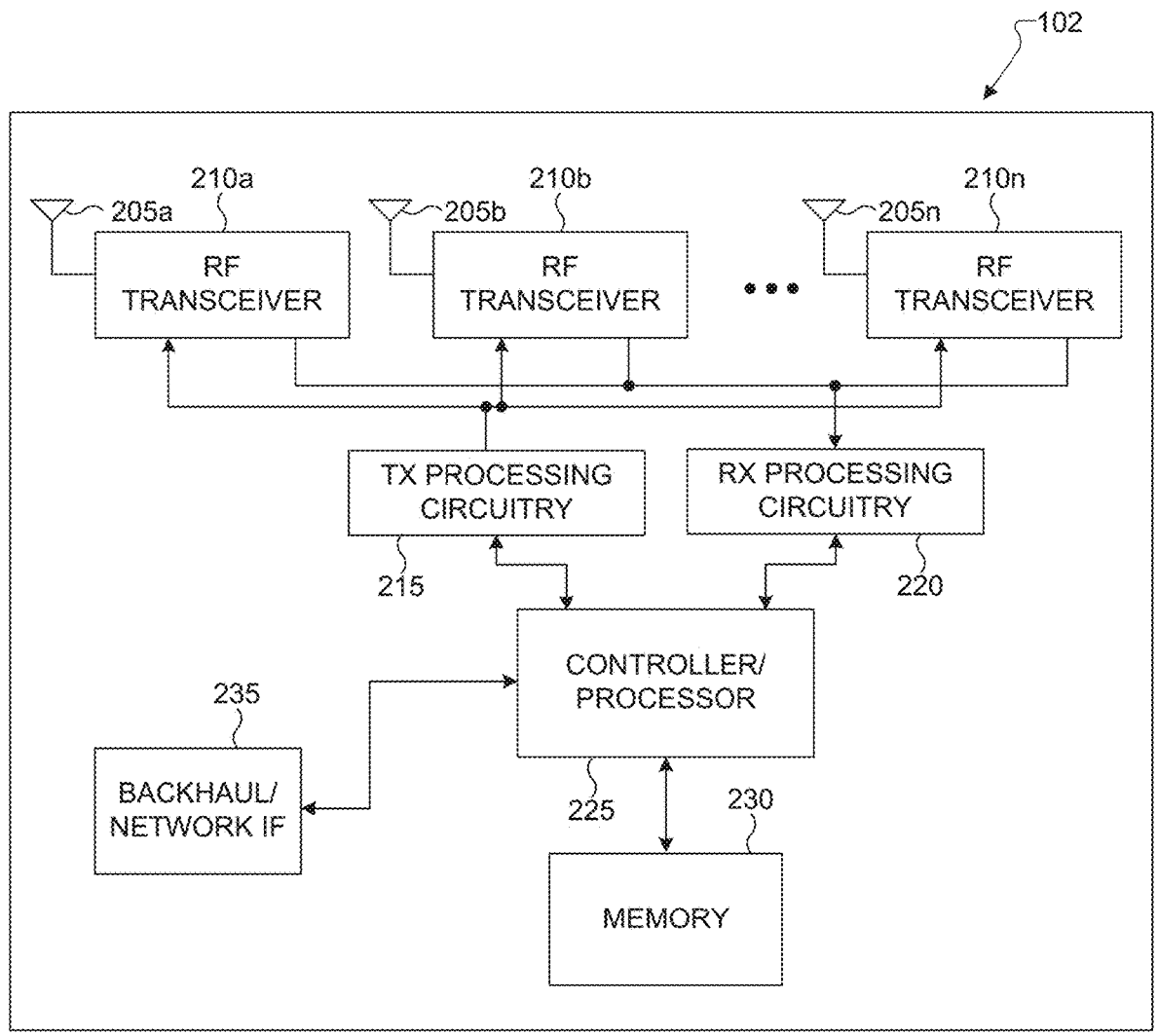
FIG. 2 illustrates an example gNB according to embodiments of the present disclosure.
Figure 3:
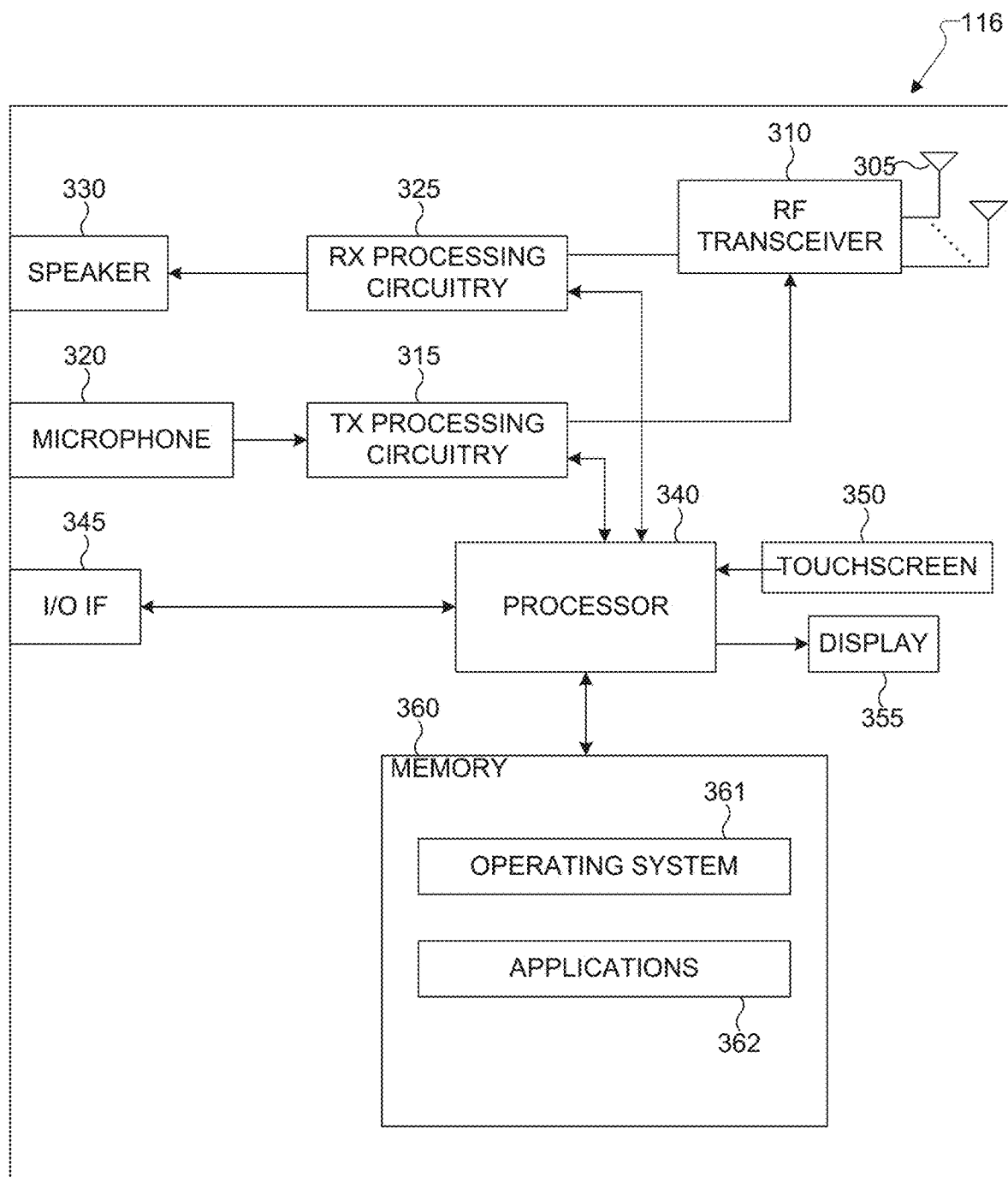
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient power saving operation in an advanced wireless communication system. In certain embodiments, and one or more of the gNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
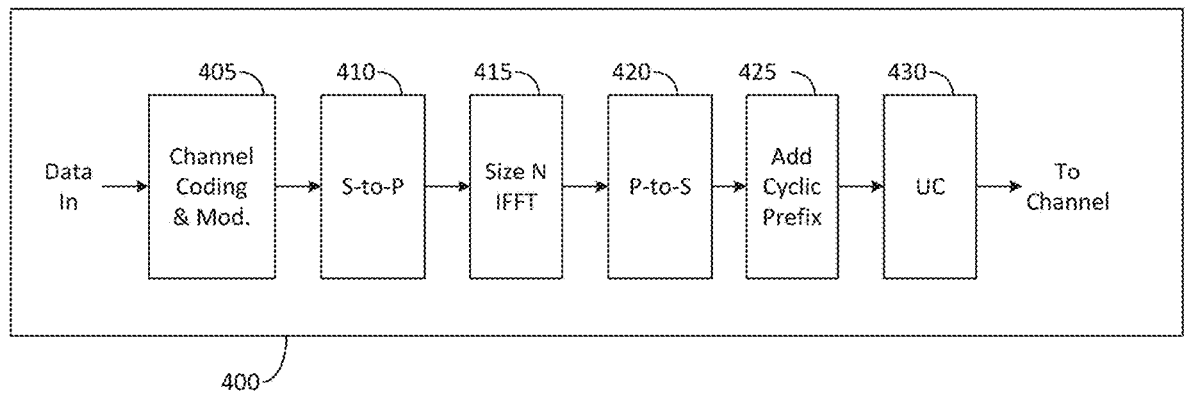
FIG. 4A illustrates an example high-level diagram of an orthogonal frequency division multiple access transmit path according to embodiments of the present disclosure.
Figure 4B:
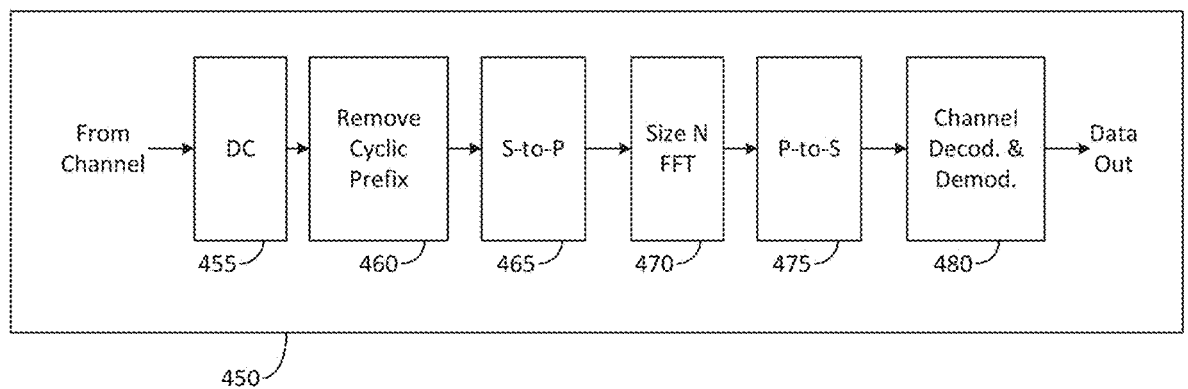
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., the gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNB s 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

A unit for DL signaling or for UL signaling on a cell is one symbol. A symbol belongs to a slot that includes a number of symbols such as 14 symbols and is referred to as DL symbol if used for DL signaling, UL symbol if used for UL signaling, or flexible symbol if used for either DL signaling or UL signaling.

A bandwidth (BW) unit is referred to as a resource block (RB). One RB includes a number of sub-carriers (SCs) and one SC in one symbol of a slot is referred to as resource element (RE). For example, a slot can have duration of 1 millisecond and a RB can have a bandwidth of 180 KHz when the RB includes 12 SCs with inter-SC spacing of 15 KHz. For example, a slot can have duration of 0.25 milliseconds and a RB can have a bandwidth of 720 KHz when the RB includes 12 SCs with inter-SC spacing of 60 KHz.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including channel state information RS (CSI-RS) and demodulation RS (DMRS).

A CSI-RS is primarily intended for UEs to perform measurements and provide channel state information (CSI) to a gNB. A DMRS is received only in the BW of a respective PDCCH or PDSCH reception and a UE typically uses the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access.

A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of transport blocks (TBs) with data information in a PDSCH, scheduling request (SR) indicating whether a UE has data to transmit in the UE's buffer, and CSI reports enabling a gNB to select appropriate parameters for PDSCH or PDCCH transmissions to a UE.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, to also DL CSI. Additionally, in order to establish synchronization or an initial RRC connection with a gNB, a UE can transmit a physical random access channel. To reduce control overhead for scheduling receptions or transmission over multiple RBs, a RB group (RBG) can be used as a unit for PDSCH receptions or PUSCH transmissions where an RBG includes a predetermined number of RBs.

DL transmissions or UL transmissions can be based on an orthogonal frequency division multiplexing (OFDM) waveform including a variant using DFT preceding that is known as DFT-spread-OFDM.

Figure 5:
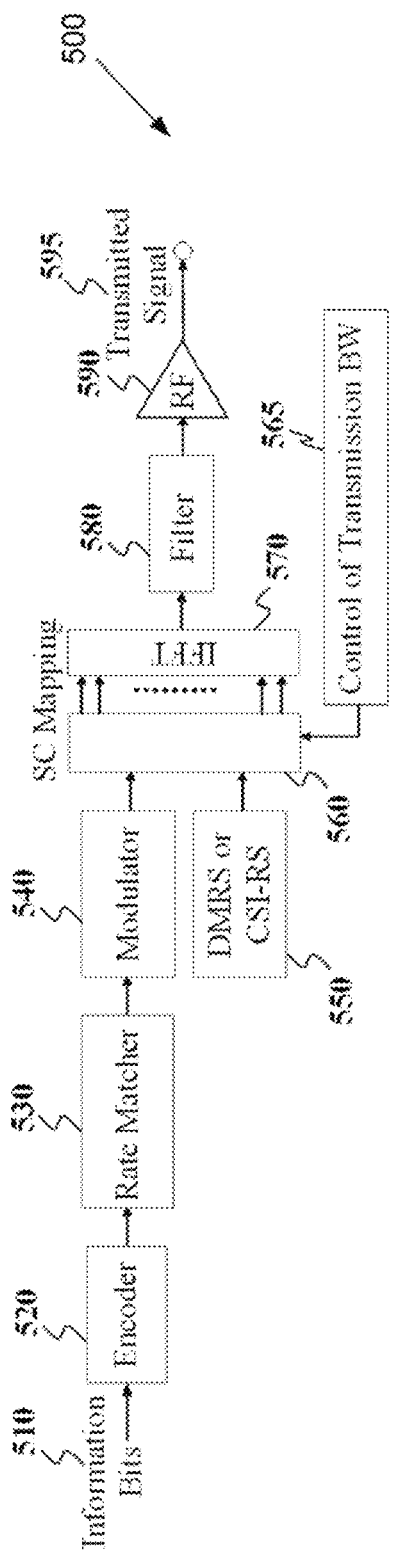
FIG. 5 illustrates an example transmitter structure using OFDM according to embodiments of the present disclosure.

FIG. 5 illustrates an example transmitter structure 500 using OFDM according to embodiments of the present disclosure. The embodiment of the transmitter structure 500 illustrated in FIG. 5 is for illustration only. FIG. 5 does not limit the scope of this disclosure to any particular implementation.

As illustrated in FIG. 5, information bits, such as DCI bits or data bits 510, are encoded by encoder 520, rate matched to assigned time/frequency resources by rate matcher 530, and modulated by the modulator 540. Subsequently, modulated encoded symbols and DMRS or CSI-RS 550 are mapped to SCs 560 by SC mapping unit 565, an inverse fast Fourier transform (IFFT) is performed by filter 570, a cyclic prefix (CP) is added by CP insertion unit 580, and a resulting signal is filtered by filter 590 and transmitted by an radio frequency (RF) unit 595.

Figure 6:
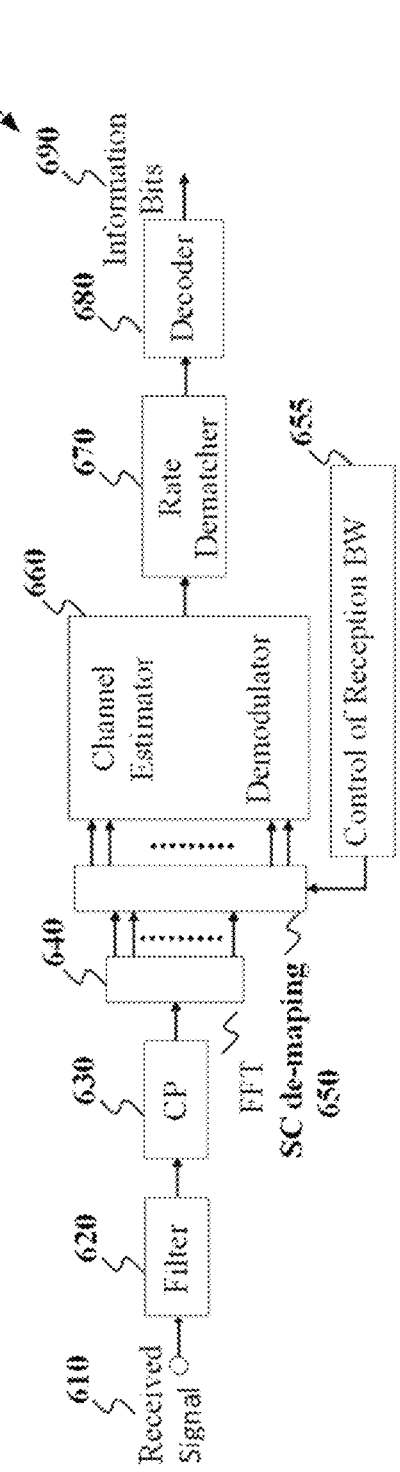
FIG. 6 illustrates an example receiver structure using OFDM according to embodiments of the present disclosure.

FIG. 6 illustrates an example receiver structure 600 using OFDM according to embodiments of the present disclosure. The embodiment of the receiver structure 600 illustrated in FIG. 6 is for illustration only. FIG. 6 does not limit the scope of this disclosure to any particular implementation.

As illustrated in FIG. 6, a received signal 610 is filtered by filter 620, a CP removal unit removes a CP 630, a filter 640 applies a fast Fourier transform (FFT), SCs de-mapping unit 650 de-maps SCs selected by BW selector unit 655, received symbols are demodulated by a channel estimator and a demodulator unit 660, a rate de-matcher 670 restores a rate matching, and a decoder 680 decodes the resulting bits to provide information bits 690.

A UE typically monitors multiple candidate locations for respective potential PDCCH receptions to decode one or more DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be a SI-RNTI. For a DCI format scheduling a PDSCH providing a random access response (RAR), the RNTI can be a RA-RNTI. For a DCI format providing transmit power control (TPC) commands to a group of UEs, the RNTI can be a TPC-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of PRBs. A gNB can configure a UE one or more sets of PRB sets, also referred to as control resource sets (CORESETs), for PDCCH receptions. A PDCCH reception can be over control channel elements (CCEs) of a CORESET. A UE determines CCEs for a PDCCH reception based on a search space set. A set of CCEs that can be used for PDCCH reception by a UE define a PDCCH candidate location.

Figure 7:
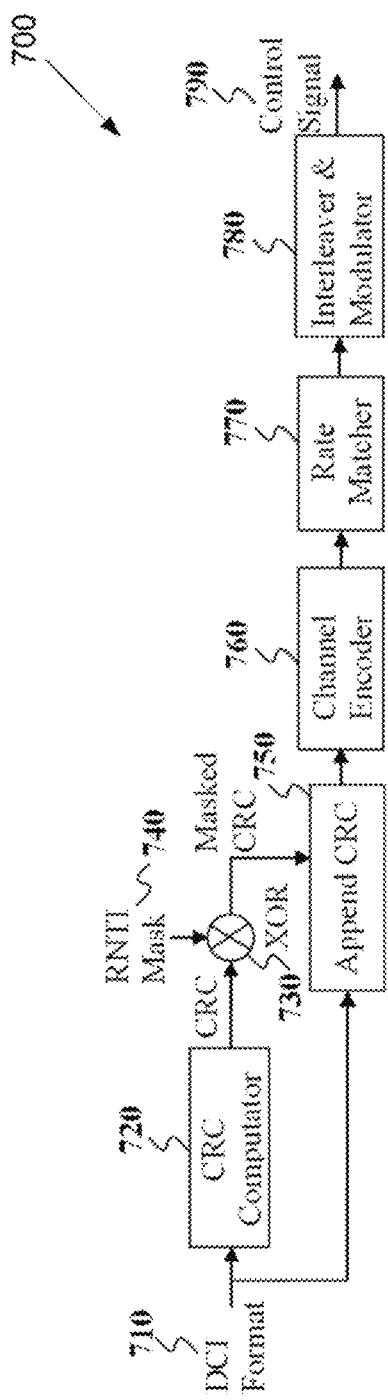
FIG. 7 illustrates an example encoding process for a DCI format according to embodiments of the present disclosure.

FIG. 7 illustrates an example encoding process 700 for a DCI format according to embodiments of the present disclosure. The embodiment of the encoding process 700 illustrated in FIG. 7 is for illustration only. FIG. 7 does not limit the scope of this disclosure to any particular implementation.

As illustrated in FIG. 7, a gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of (non-coded) DCI format information bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. An encoder 760 performs channel coding (such as tail-biting convolutional coding or polar coding), followed by rate matching to allocated resources by rate matcher 770. Interleaving and modulation units 780 apply interleaving and modulation, such as QPSK, and the output control signal 790 is transmitted.

Figure 8:
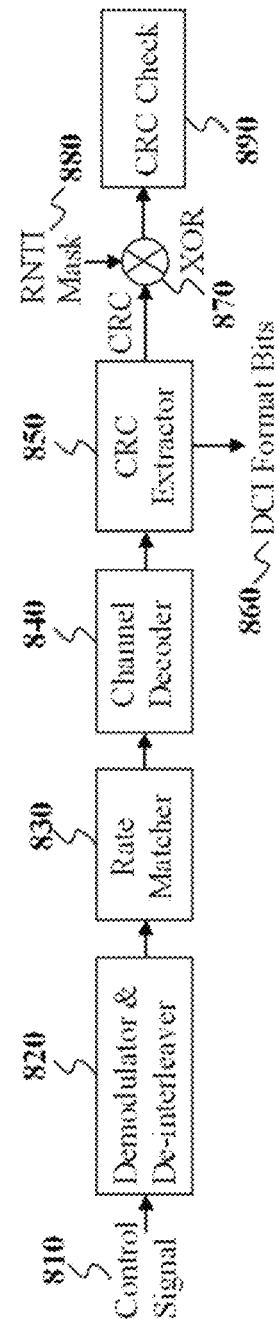
FIG. 8 illustrates an example decoding process for a DCI format according to embodiments of the present disclosure.

FIG. 8 illustrates an example decoding process 800 for a DCI format according to embodiments of the present disclosure. The embodiment of the decoding process 800 illustrated in FIG. 8 is for illustration only. FIG. 8 does not limit the scope of this disclosure to any particular implementation.

As illustrated in FIG. 8, a received control signal 810 is demodulated and de-interleaved by a demodulator and a de-interleaver 820. A rate matching applied at a transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid (at least when corresponding information is valid). When the CRC check does not succeed, the DCI format information bits are considered to be invalid.

For each DL bandwidth part (BWP) configured to a UE in a serving cell, the UE can be provided by higher layer signaling a number of CORESETs. For each CORESET, the UE is provided: a CORESET index p; a DM-RS scrambling sequence initialization value; a precoder granularity for a number of REGs in frequency where the UE can assume use of a same DM-RS precoder; a number of consecutive symbols; a set of resource blocks; CCE-to-REG mapping parameters; an antenna port quasi co-location, from a set of antenna port quasi co-locations, indicating quasi co-location information of the DM-RS antenna port for PDCCH reception; and an indication for a presence or absence of a transmission configuration indication (TCI) field for DCI format 1_1 transmitted by a PDCCH in CORESET p.

For each DL BWP configured to a UE in a serving cell, the UE is provided by higher layers with a number of search space sets where, for each search space set from the number search space sets, the UE is provided the following: a search space set index $_s$; an association between the search space set $_s$ and a CORESET p; a PDCCH monitoring periodicity of $k_s$ slots and a PDCCH monitoring offset of $o_s$ slots; a PDCCH monitoring pattern within a slot, indicating first symbol(s) of the control resource set within a slot for PDCCH monitoring; a number of PDCCH candidates $M_s^{(L)}$ per CCE aggregation level L; an indication that search space set $_s$ is either a common search space set or a UE-specific search space set; and a duration of $T_s < k_s$ slots indicating a number of slots that the search space set s exists.

For a search space set, associated with CORESET p, the CCE indexes for aggregation level L corresponding to PDCCH candidate $m_{s,n_{CI}}$ of the search space set in slot $n_{s,f}^\mu$ for a serving cell corresponding to carrier indicator field value $n_{CI}$ (also referred to as search space) are given as in Equation 1:

$$L \cdot \left\{ \left( Y_{p,n_{s,f}^\mu} + \left\lfloor \frac{m_{s,n_{CI}} \cdot N_{CCE,p}}{LM_{s,max}^{(L)}} \right\rfloor + n_{CI} \right) \mod \lfloor N_{CCE,p}/L \rfloor \right\} + i \quad \text{Equation 1}$$

where for any common search space, $Y_{p,n_{s,f}^\mu}=0$; for a UE-specific search space, $Y_{p,n_{s,f}^\mu}=(A_p \cdot Y_{p,n_{s,f}^\mu-1}) \mod D$, $Y_{p,-1}=n_{RNTI} \neq 0$, $A_p=39827$ for p mod3=0, $A_p=39829$ for p mod3=1, $A_p=39839$ for p mod3=2, and D=65537; i=0, ..., L−1; $M_{CCE,p}$ is the number of CCEs, numbered from 0 to $N_{CCE,p}-1$, in CORESET p; $n_{CI}$ is the carrier indicator field value if the UE is configured with a carrier indicator field; otherwise, including for any common search space, $n_{CI}=0$; $m_{s,n_{CI}}=0, \ldots, M_{p,s,n_{CI}}^{(L)}-1$, where $M_{s,n_{CI}}^{(L)}$ is the number of PDCCH candidates the UE is configured to monitor for aggregation level L for a serving cell corresponding to $n_{CI}$ and a search space set $_s$; for any common search space, $M_{s,max}^{(L)}=M_{s,0}^{(L)}$; for a UE-specific search space, $M_{s,max}^{(L)}$ is the maximum of $M_{s,n_{CI}}^{(L)}$ across all configured $n_{CI}$ values for a CCE aggregation level L of search space set $_s$ in control resource set p; the RNTI value used for $n_{RNTI}$.

A PUCCH can be transmitted according to one from multiple PUCCH formats. A PUCCH format corresponds to a structure that is designed for a particular range of a number of UCI bits as different numbers of UCI bits require different PUCCH transmission structures. A PUCCH transmission is also associated with a TCI state providing a spatial domain filter for a PUCCH transmission. A PUCCH can be used to convey HARQ-ACK information, SR, or periodic/semi-persistent CSI and their combinations.

A UE can be configured for operation with multiple bandwidth parts (BWP) in a DL system BW (DL BWPs) and in an UL system BW (UL BWP). At a given time, only one DL BWP and only one UL BWP are active for the UE. Configurations of various parameters, such as search space set configuration for PDCCH reception or PUCCH resources for PUCCH transmission, can be separately provided for each respective BWP. A primary purpose for BWP operation is to enable power savings for the UE. When the UE has data to transmit or receive, a large BWP can be used and, for example, search space sets can be more than one and have multiple PDCCH candidates with short monitoring periodicity. When the UE does not have data to transmit or receive, a small BWP can be used and, for example, a single search space set can be configured with fewer PDCCH candidates and a longer monitoring periodicity.

Figure 9:
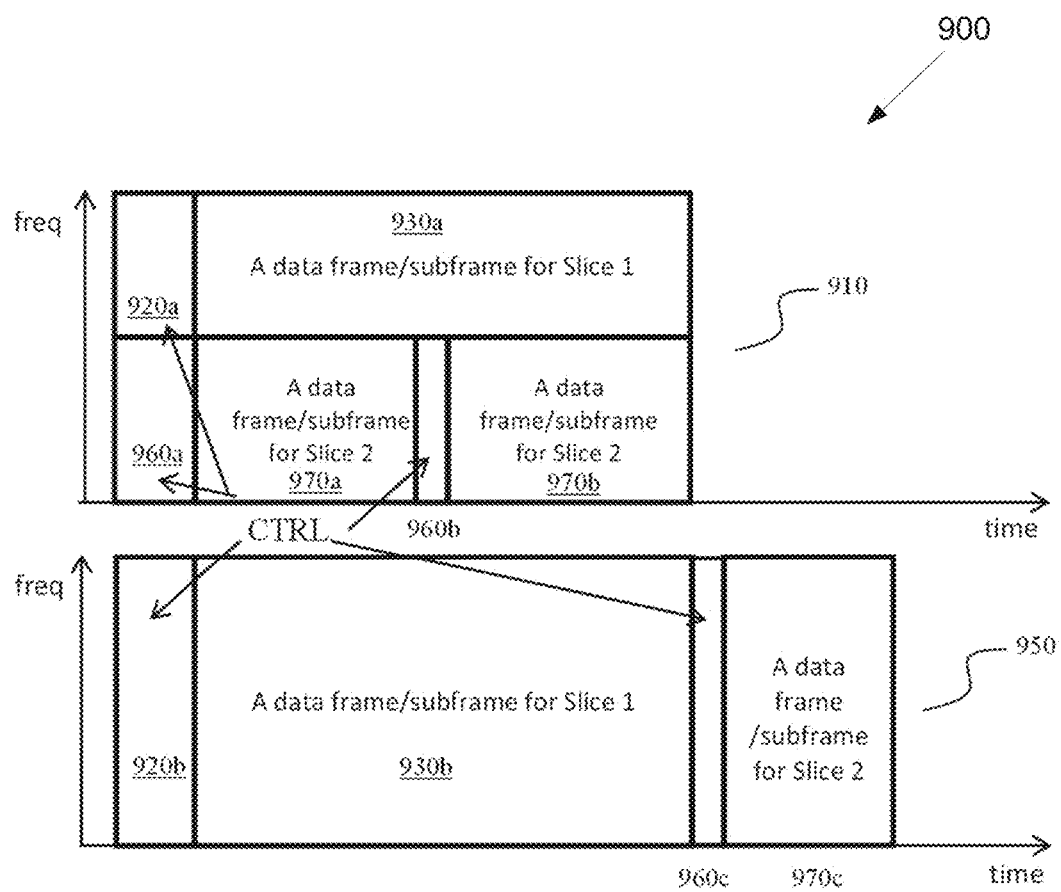
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
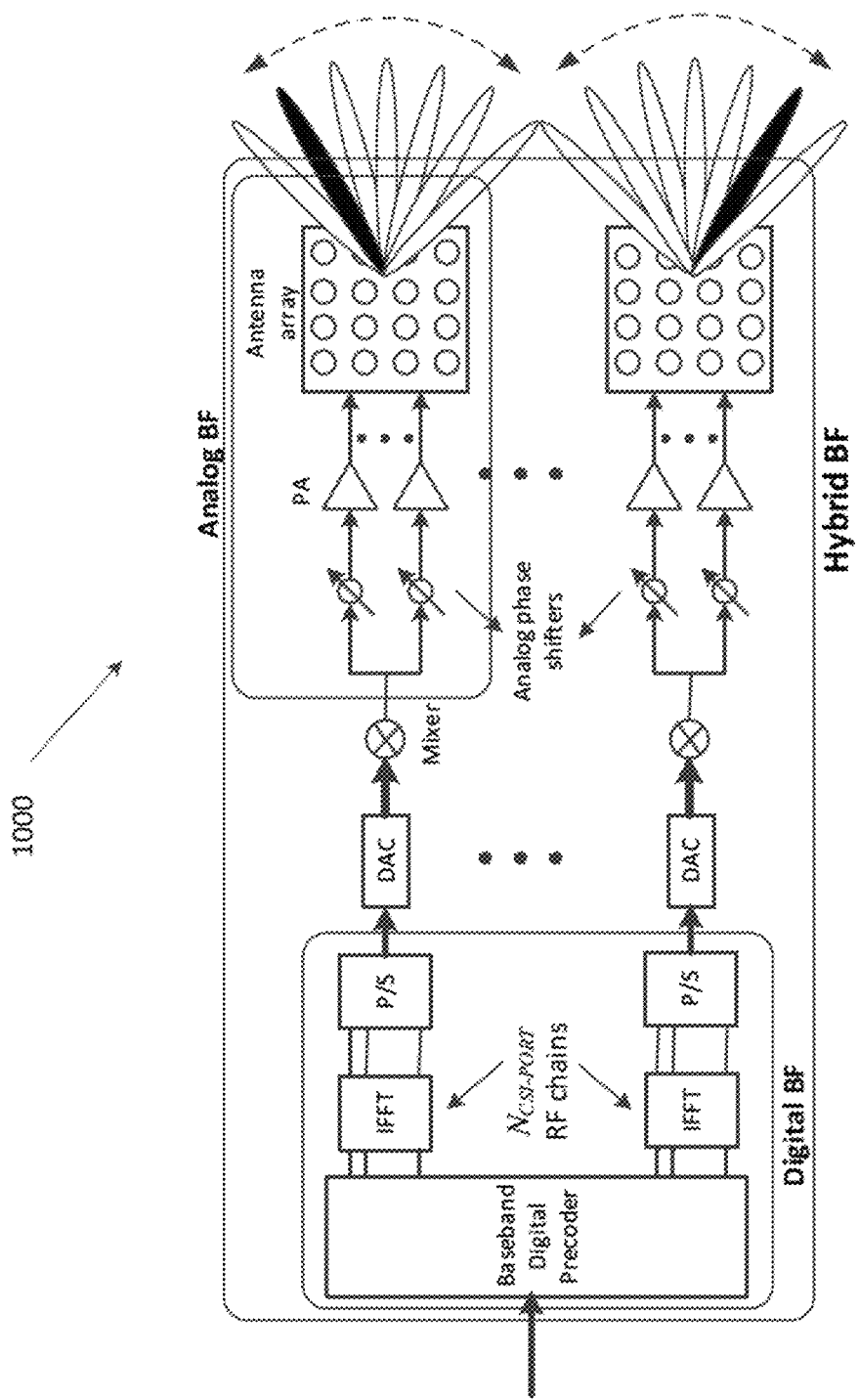
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
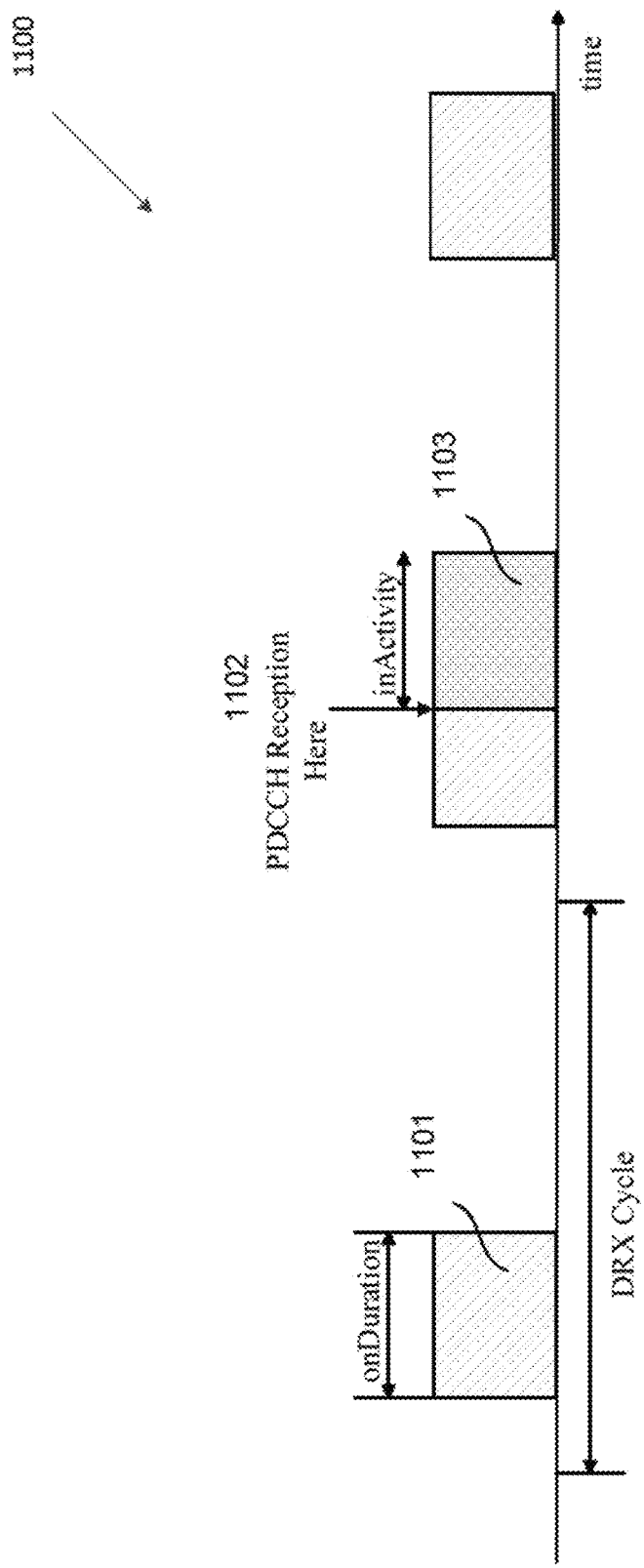
FIG. 11 illustrates an example a configuration of a C-DRX and an associated UE processing according to embodiments of the present disclosure.

FIG. 11 illustrates an example a configuration 1100 of a C-DRX and an associated UE processing according to embodiments of the present disclosure. The embodiment of the configuration 1100 illustrated in FIG. 11 is for illustration only. FIG. 11 does not limit the scope of this disclosure to any particular implementation.

For UE in RRC_CONNECTED state, connected mode discontinuous reception (C-DRX) operation is a mechanism for UE power savings in NR inherited from LTE. During the "On Duration" period 1101, the UE monitors PDCCH (attempts to detect DCI formats) in configured search space sets. If the UE detects a DCI format scheduling a PDSCH reception or a PUSCH transmission during the "On Duration" period 1102, the UE starts the "Inactivity Timer" 1103 and continues to monitor PDCCH until the "Inactivity Timer" expires and the UE goes into sleep mode.

NR Rel-15 supports reconfiguration for all associated DRX parameters from a predefined set of values using higher layer signaling. However, for the benefit of network flexibility, the UE-specific configuration tends to be unchanged over long time periods regardless of a UE power consumption status or a BWP bandwidth and activated number of component carriers (CCs)/cells. The associated configuration parameters are as follows: drx-onDurationTimer: the duration at the beginning of a DRX cycle; drx-SlotOffset: the delay in slots before starting the drx-onDurationTimer; drx-InactivityTimer: the duration after the PDCCH occasion in which a PDCCH indicates an initial UL or DL user data transmission for the medium access control (MAC) entity; drx-RetransmissionTimerDL (per DL hybrid automatic repeat request (HARQ) process): the maximum duration until a DL retransmission is received; drx-RetransmissionTimerUL (per UL HARQ process): the maximum duration until a grant for UL retransmission is received; drx-LongCycle: the long DRX cycle; drx-ShortCycle (optional): the short DRX cycle; drx-ShortCycleTimer (optional): the duration the UE may follow the short DRX cycle; drx-HARQ-RTT-TimerDL (per DL HARQ process): the minimum duration before a DL assignment for HARQ retransmission is expected by the MAC entity; and drx-HARQ-RTT-TimerUL (per UL HARQ process): the minimum duration before a UL HARQ retransmission grant is expected by the MAC entity.

Paging is the mechanism in which network informs UE in RRC_IDLE/INACTIVE discontinuous reception mode to about incoming calls, system information change, and Earthquake and Tsunami Warning System (ETWS) or Commercial Mobile Alert System (CMAS) notification. A UE can decode paging message on PDCCH monitoring occasions in associated PO using CRC scrambled by P-RNTI. The DCI format decoded in PO may only indicate short message about system information update or ETWS notification, in this case, UE does not need to decode PDSCH. For some other cases, UE may need to decode PDSCH when DCI format indicates scheduling information is included in a paging message. The network may address multiple UEs within a paging message by including one Paging Record for each UE.

However, a UE may waste power on monitoring PDCCH when paging rate is low in idle mode or scheduling rate is low in active period of C-DRX.

To successfully wake up after a period of sleep duration, a UE has to perform loop convergence, such as automatic gain control (AGC), time tracking loop (TTL), frequency tracking loop (FTL), based on some cell-specific DL reference sequence. Unlike LTE, there is no always on cell-specific signal (CRS) in NR. Alternatively, a UE can use a SS/PBCH block burst set for loop convergence. However, transmission of a SS/PBCH block burst set is configured per cell. For a particular UE, a closest SS/PBCH block monitoring occasion relative to a start time of On Duration or PO can be separated by tens of milliseconds. In such cases, a UE needs to keep wake-up/micro-sleep and maintain the time-frequency tracking after monitoring the closest SS/PBCH block burst set before the next On duration or PO.

Therefore, there is a need to develop mechanisms and associated signaling support for dynamic wake-up indication at least for UE operates in C-DRX mode or idle/inactive mode paging.

There is another need to develop mechanisms and associated signaling support for dynamic go-to-sleep in active period with or without C-DRX configured.

There is yet another need to develop signaling support for dynamic of adaptation request on various power consumption dimensions in RRC_CONNECTED state.

There is yet a another need to design additional reference signal, having transmission occasions aligned with a DRX cycle for a UE that can be used by the UE for channel tracking and RRM measurement.

The present disclosure relates to a pre-5th-Generation (5G) or 5G communication system to be provided for supporting higher data rates Beyond 4th-Generation (4G) communication system such as long term evolution (LTE). The present disclosure relates to enabling a power saving signal with detailed design on configuration, including monitoring occasion, resources allocation, numerology, QCL assumption, transmission scheme. The disclosure also relates to supporting power saving signal as dynamic indication of wake-up for both connected mode discontinuous reception (C-DRX) and idle/inactive mode paging.

The disclosure further relates to supporting power saving signal as dynamic indication of go-to-sleep for UE operates in RRC_CONNECTED state with or without C-DRX. The disclosure additionally relates to supporting power saving signal as indication of the start of channel occupancy time (COT) in NR unlicensed spectrum (NR-U). The disclosure also relates to supporting power saving signal as dynamic adaptation request for UE operates in RRC_CONNECTED state. The disclosure also relates to supporting power saving signal as additional reference signal (RS) for channel tracking and RRM measurement outside active period of C-DRX cycle. This disclosure additionally relates to supporting power saving signal as indication for UE assistance information report.

In one embodiment, the configuration a PoSS is provided, including monitoring occasion, channel resources allocation, numerology, QCL assumption, and transmission scheme.

A PoSS can be transmitted by gNB to a single UE or a group of UEs or all UEs in the associated serving cell(s). The PoSS can carry at least the associated UE ID or UE group UD or Cell ID, denoted as $I\hat{}ID$ in this disclosure. $0<=I\hat{}ID<2\hat{}N\_bits-1$, where N_bits is a positive integer such as N_bits=16 for a single UE. A UE can determine $I\hat{}ID$ in the PoSS to monitor through one of the following In one example, the UE can determine $I\hat{}ID$ by decoding the associated RRC parameter in a PDSCH scheduled by a DCI format with CRC scrambled by C-RNTI.

In another example, the UE can determine $I\hat{}ID$ by decoding the associated RRC parameter in SIB.

In yet another example, the UE can determine $I\hat{}ID$ by UE ID, such that $I\hat{}ID=mod(floor(I\hat{}UE/c1), c2)*c3$, where $I\hat{}UE$ is UE ID, for example, $I\hat{}UE$ is C-RNTI, and c1, c2, c3 are either predetermined in the system operation, such as c1=1, c2=4, c3=1, or provided to UE by higher layers.

In one sub-example, $I\hat{}ID=mod(C\text{-}RNTI, N\_UG)$, where N_UG is a number of UE groups.

In yet another example, the UE can determine $I\hat{}ID$ by Cell ID, such that $I\hat{}ID=mod(floor(I\hat{}cell\_ID/c1), c2)*c3$, where $I\hat{}cell\_ID$ is cell ID, and c1, c2, c3 are either predetermined in the system operation, such as c1=1, c2=4, c3=1, or provided to UE by higher layers.

In one sub-example, $I\hat{}ID=mod(I\hat{}cell\_ID, N\_CG)$, where N_CG is a number of cell groups.

Figure 12:
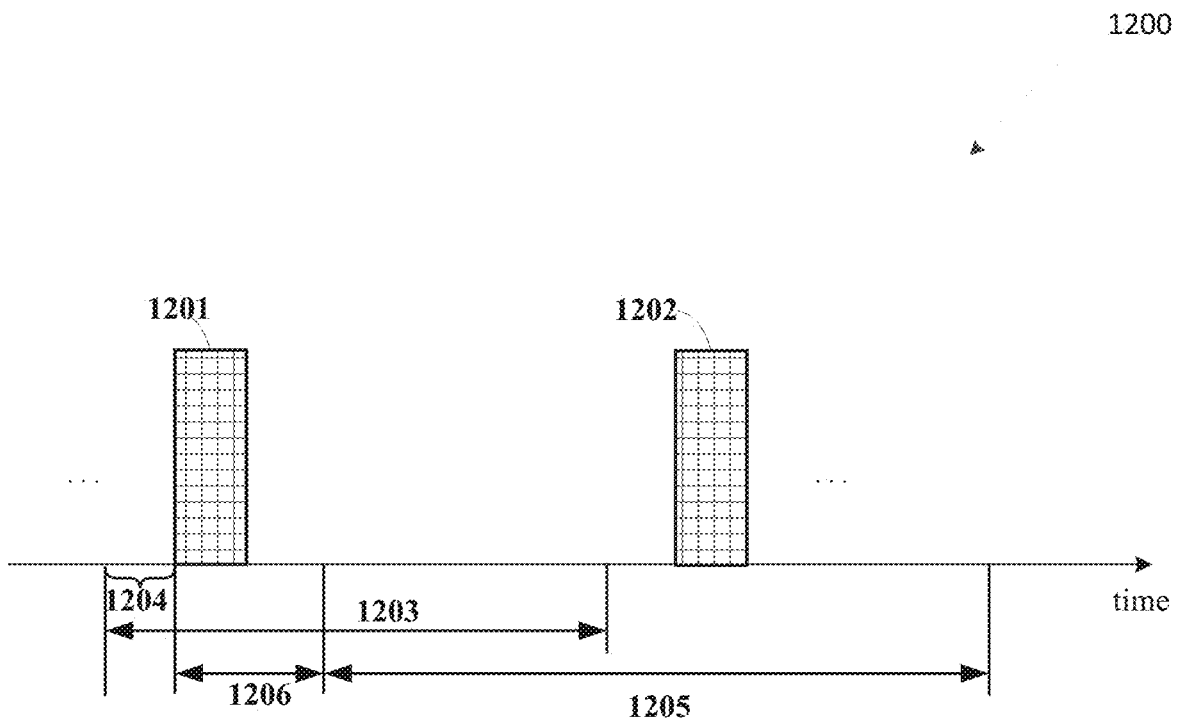
FIG. 12 illustrates an example monitoring occasion of PoSS according to embodiments of the present disclosure.

FIG. 12 illustrates an example monitoring occasion 1200 of PoSS according to embodiments of the present disclosure. The embodiment of the monitoring occasion 1200 illustrated in FIG. 12 is for illustration only. FIG. 12 does not limit the scope of this disclosure to any particular implementation.

As illustrated in FIG. 12, a UE can determine a configuration for monitoring PoSS by a periodicity, $T\hat{}PoSS$ 1203, in the unit of one slot or one millisecond or one OFDM symbol through one of the following.

In one example, $T\hat{}PoSS$ can be fixed and defined in the specification of the system operation, e.g., $T\hat{}PoSS=1$ ms or 1 slot. In one sub-example, $T\hat{}PoSS$ can be less than 1 slot for URLLC UEs or in NR-U.

In another example, $T\hat{}PoSS$ is provided to UE through higher layer signaling.

In yet another example, $T\hat{}PoSS$ can be associated with DRX cycle, $T\hat{}DRX$, such that $T\hat{}PoSS=c1*T\hat{}DRX$, where c1 can be a positive integer, e.g., c1=1, and can be either predetermined or provided to the UE through higher layer signaling. T_DRX can be cell-specific DRX, T_c, or UE-specific DRX, T_UE, or min(T_c, T_UE), or eDRX/DRX in idle/inactive mode paging, or long or short DRX cycle in C-DRX.

In yet another example, $T\hat{}PoSS$ can be associated with PDCCH monitoring periodicity, $T\hat{}PDCCH$, such that $T\hat{}PoSS=c1*T\hat{}PDCCH$.

In one sub-example, c1 can be a positive integer, e.g., c1=1, and can be either predetermined or provided to the UE through higher layer signaling.

In another sub-example, c1 can be a fractional value, e.g., c1=0.25, and can be either predetermined or provided to the UE through higher layer signaling.

In yet another example, $T\hat{}PoSS$ is provided to the UE by higher layer signaling from a serving gNB based on assistance information of preferred values for $T\hat{}PoSS$ provided from the UE to the gNB.

A UE can determine a configuration of PoSS monitoring offset, $O\hat{}PoSS$ 1204. $O\hat{}PoSS$ can be either defined as a time offset relative to the start of a PoSS monitoring period or a time offset prior to a reference point, for example, the start of ON duration, or start of a PO, in the unit of one slot or one ms. A UE can determine a configuration of $O\hat{}PoSS$ through one of the following.

In one example, $O\hat{}PoSS$ can be fixed and defined in the specification of the system operation, e.g., $O\hat{}PoSS=1$ slot.

In another example, $O\hat{}PoSS$ is provided to the UE through higher layer signaling.

In another example, $O\hat{}PoSS$ can be determined by $I\hat{}ID$. For example, $$O\hat{}PoSS = \mathrm{mod}\left(\left\lfloor \frac{I\hat{}ID}{c1} \right\rfloor, c2\right) * c3$$

where $0<c2<T\hat{}PoSS$ c1, c2, c3 are either predetermined in the system operation, such as c1=1, c2=4, c3=1, or are provided to UE by higher layers.

A PoSS can be transmitted to UE on demand by gNB. The functionality/control information indicated by the PoSS can be valid for a limited effective duration, I^ED 1205, after a time gap, t_gap 1206, since the start of associated PoSS. When a UE detects a PoSS 1201 with limited I^ED 1205, the UE can skip remaining PoSS monitoring 1202 within the associated effective duration. A UE can determine I^ED and I_gap, in the unit of one ms or one slot or one OFDM symbol, through one of the following.

In one example, I^ED and I_gap can be fixed and defined in the specification of the system operation, e.g., I_gap=0, I^ED equals the COT in NR-U.

In another example, I^ED and I_gap is provided to the UE through higher layer signaling.

In yet another example, I^ED of PoSS detected in current monitoring occasion is automatically extended to next PoSS monitoring period if no PoSS is detected in the next PoSS monitoring occasion.

In yet another example, I^ED can be associated with PoSS monitoring periodicity, T^PoSS, such that I^ED=c1*T^PoSS.

In one sub-example, c1 can be a positive integer, e.g., c1=2, and can be either predetermined or provided to the UE through higher layer signaling. In this case, the monitoring periodicity is relative smaller than effective period, which can be applicable at least for NR unlicensed spectrum.

In another sub-example, c1 can be a fractional value, e.g., c1=0.5, and can be either predetermined or provided to the UE through higher layer signaling.

A UE can determine the start OFDM symbol of PoSS within a monitoring occasion, denoted as PoSS_startOS, through one of the following.

In one example, PoSS_startOS can be fixed and defined in the specification of the system operation, e.g., PoSS_startOS=0.

In another example, PoSS_startOS can be provided to UE through higher layer signaling.

In another example, PoSS_startOS can be determined by associated UE ID, I^ID. For example, $$\text{PoSS\_startOS} = \mod\left(\left\lfloor\frac{I^\wedge ID}{c1}\right\rfloor, c2\right) * c3$$

where 0<c2<14 c1, c2, c3 are either predetermined in the system operation, such as c1=1, c2=4, c3=1, or are provided to UE by higher layers.

For channel resources allocation, PoSS can be transmitted by gNB in beam-sweeping manner, or single-directional beam manner on-demand. A PoSS transmission burst can consists of L^PoSS>=1 PoSS block(s).

Figure 13:
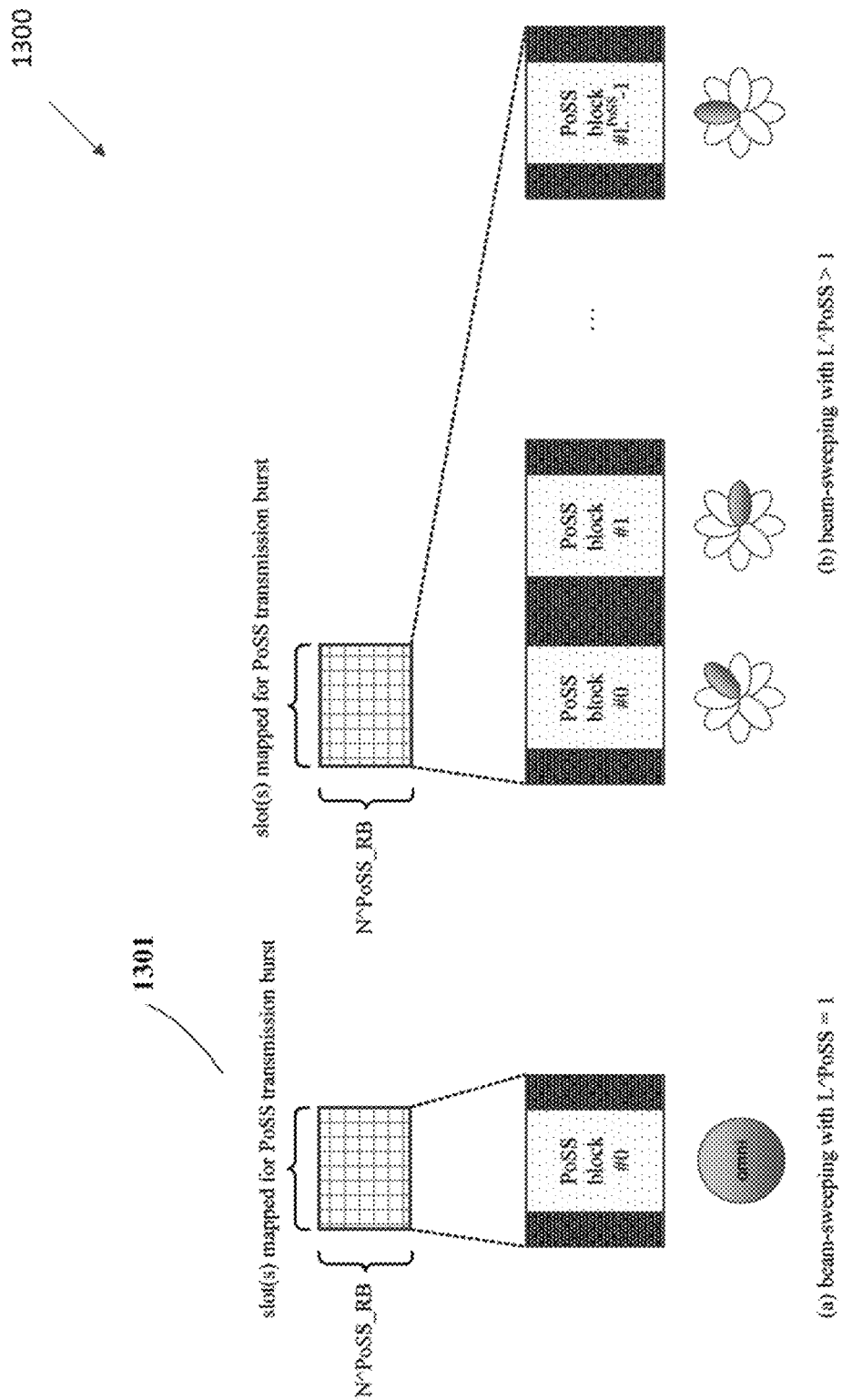
FIG. 13 illustrates an example PoSS transmission burst in beam-sweeping manner according to embodiments of the present disclosure.

FIG. 13 illustrates an example PoSS transmission burst 1300 in beam-sweeping manner according to embodiments of the present disclosure. The embodiment of the PoSS transmission burst 1300 illustrated in FIG. 13 is for illustration only. FIG. 13 does not limit the scope of this disclosure to any particular implementation.

For PoSS transmitted in beam-sweeping manner, L^PoSS PoSS block(s) can be mapped to either consecutive or non-consecutive OFDM symbols/slots in the time domain, and mapped to N^PoSS_RB resource blocks (RBs) in the frequency domain. In one example 1301, L^PoSS=1 for single-beam operation where the PoSS transmission is omni-directional. In another example 1302, L^PoSS>1 for multi-beam operation where UEs in different areas can be covered by the multiple beams. A UE can determine L^PoSS through one of the following.

In one example, L^PoSS is same as a maximum number of SS/PBCH blocks, e.g., L^PoSS=L, where L=4 for carrier frequency range 0 to 3 GHz; L=8 for carrier frequency range 3 to 6 GHz; L=64 for carrier frequency range 6 to 52.6 GHz.

In one sub-example, a monitoring window of each PoSS block within a PoSS burst set is associated with an SS/PBCH block index. Denote N^PoSS_{sym, i} as the starting symbol of the i-th PoSS block within the PoSS burst set and by N^SSB_{sym, i} as the starting symbol of i-th SS/PBCH block within the SS/PBCH burst set, wherein 0≤i≤L−1. Then, N^PoSS_{sym, i}=N^SSB_{sym, i}+d_i, where d_i is a constant integer denoting the offset for a given i and given configuration of time-domain resource for PoSS.

In another example, L^PoSS can be configured by higher layers and a mapping pattern on the location of each PoSS block within a PoSS burst set is predefined for each configured L^WUS. A UE can determine a monitoring window of each PoSS block according to the configured L^PoSS and the predefined mapping pattern.

In yet another example, L^PoSS can be provided to the UE by higher layer signaling from a serving gNB based on assistance information of preferred values for L^PoSS provided from the UE to the gNB.

Figure 14:
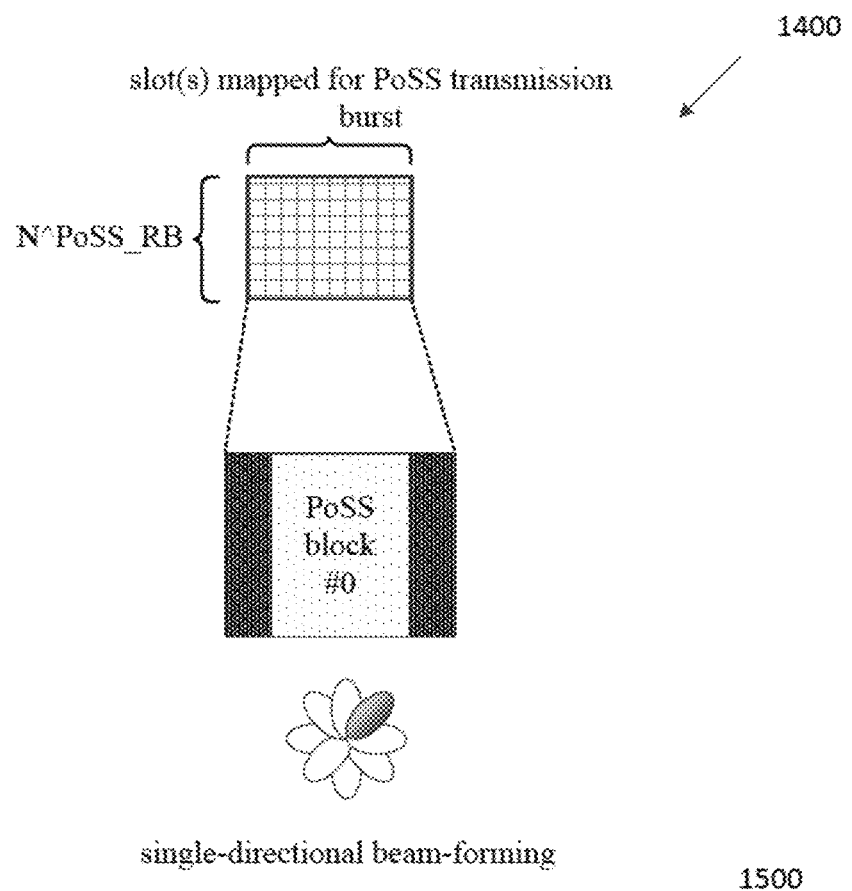
FIG. 14 illustrates an example PoSS transmission burst in single directional beam manner according to embodiments of the present disclosure.

FIG. 14 illustrates an example PoSS transmission burst 1400 in single directional beam manner according to embodiments of the present disclosure. The embodiment of the PoSS transmission burst 1400 illustrated in FIG. 14 is for illustration only. FIG. 14 does not limit the scope of this disclosure to any particular implementation.

For PoSS transmitted in single-directional beam manner 1401, the single PoSS block for the beamforming transmission forms the PoSS transmission burst, and L^PoSS=1, e.g., to address a UE or a group of UEs in specific area in RRC_CONNECTED state.

A UE can determine a configuration for bandwidth (BW) of PoSS, denoted as N^PoSS_RB, in the unit of one RB, through one of the following.

In one example, N^PoSS_RB can be associated with the BW of an associated DL BWP, N^BWP_RB. For example, N^PoSS_RB=N^BWP_RB*a_BW+b_BW, where a_BW is a constant and 0<a_BW<=1; b_BW is a constant integer, and b_BW>=0, e.g., a_BW=1, b_BW=0, where the size of PoSS is same as the size of associated DL BWP.

In another example, N^PoSS_RB can be associated with the bandwidth of an associated CORESET. For example, N^PoSS_RB equals the BW of associated CORESET.

In yet another example: N^PoSS_RB can be fixed and defined in the specification of the system operation.

In one example, N^PoSS_RB=24 RBs and is same as the minimum configured CORESET BW for common search space.

In another example, N^PoSS_RB=12RBs and is same as the bandwidth for PRACH preamble and PSS and SSS.

In another example, N^PoSS_RB=6RBs and is a narrow-band.

In yet another example: N^PoSS_RB can be provided to UE through higher layer signaling.

In yet another example, N^PoSS_RB is provided to the UE by higher layer signaling from a serving gNB based on assistance information of preferred values for N^PoSS_RB provided from the UE to the gNB.

A UE can determine a configuration for start RB of PoSS, denoted as PoSS_startRB, in the unit of one RB, through one of the following.

In one example, PoSS_startRB is associated with an active DL BWP. In one sub-example, PoSS_startRB is the center of active DL BWP, such as PoSS_startRB=floor(N^BWP_RB/2)−floor(N^PoSS_RB/2). In another sub-example, PoSS_startRB=startRB_BWP+c1, where startRB_BWP is the start RB of active DL BWP, while c1 is non-negative integer, and is either predetermined, e.g., c1=0, or provided to UE through higher layer signaling.

In another example, PoSS_startRB is associated with start RB of a CORESET, denoted as CORESET_startRB, such that PoSS_startRB=CORESET_startRB+c1, where c1 is a non-negative integer, and is either predetermined or provided to UE through higher layer signaling. In one sub-example, PoSS_startRB is same as the start RB of associated CORESET, where c1=0. In another sub-example, c1 is no less than the bandwidth of associated CORESET, so that PoSS is FDMed with the associated CORESET.

In yet another example, PoSS_startRB is associated with PO, such as PoSS_startRB=startRB_PO+c2, where startRB_BWP is the start RB of associated PO, while c2 is non-negative integer, and is either predetermined, e.g., c1=0, or provided to UE through higher layer signaling.

In yet another example, PoSS_startRB can be fixed and predefined in the specification of system operation, e.g., PoSS_startRB=0.

In yet another example, PoSS_startRB can be provided to UE through higher layer signaling.

A PoSS block may not be mapped to all REs within a slot and remaining REs in the slot can be used for multiplexed transmissions of other signals/channels, e.g., a SS/PBCH blocks, PDCCH/PDSCH of SIB, or left empty, depending on the time-domain and frequency-domain location of the PoSS transmission burst.

In one example, a PoSS is mapped to RE discontinuously where the PoSS is mapped to RE or subcarrier indices in multiples of K0. More specifically, a PoSS is mapped to subcarrier indices, x, where mod(x, K0)=K1, and 0<=K1<K0, K0 and K1 are constant integers. In one sub-example, K0=2, K1=0, where a PoSS occupies all even subcarriers within an associated bandwidth. In another sub-example, K0=2, K1=1, where a PoSS occupies all odd subcarriers within an associated bandwidth. In yet another sub-example, K0=4, where a PoSS occupies one out of 4 subcarriers within an associated bandwidth.

A UE can determine a configuration of the numerology of PoSS, in terms of the subcarrier spacing (SCS) and Cyclic Prefix (CP) length, through one of the following.

In one example, the numerology of PoSS is same as default numerology as active DL BWP.

In another example, the numerology of PoSS is configurable and can be provided to UE through higher layer signaling. In one sub-example, the candidate SCS of PoSS can be same as candidate SCS for BWP. In another sub-example, one candidate SCS of PoSS can be 7.5 KHz. In this way, s longer PoSS sequence can be supported.

A UE can determine the DL BWP to monitor PoSS through one of the following.

In one example, the BWP of PoSS is initial DL BWP.

In another example, the BWP of PoSS is provided to UE through higher layer signaling.

In yet another example, the BWP of PoSS is same as active DL BWP.

In yet another example, the BWP of PoSS is a dedicated BWP for PoSS monitoring with bandwidth of N^PoSS_BW. In one sub-example, N^PoSS_BW is a fixed and defined in the specification of system operation, e.g., N^PoSS_BW=12 PRBs. In another sub-example, N^PoSS_BW is same as LBT bandwidth in NR-U, e.g., 20 MHz. In yet another sub-example, N^PoSS_BW is provided to UE through higher layer signaling.

In yet another example, the BWP of PoSS is the target BWP based on assistance information from the UE to the gNB. In one sub-example, the target BWP can be UE's preferred BWP to switch to.

This sub-embodiment considers the quasi co-located (QCL) assumption, from a UE perspective, between a de-modulation reference signal (DMRS) antenna port associated with a SS/PBCH reception, or other DL reference signal (RS) antenna port associated with reception of PDCCH/PDSCH, and an antenna port associated with PoSS reception. The QCL assumption is with respect to delay spread, Doppler spread, Doppler shift, average delay, and spatial reception (RX) parameters.

A UE can determine the QCL assumption of PoSS through one of the following.

In one example, antenna port(s) associated with a reception of PoSS can be assumed to be QCLed with a DMRS antenna port associated with a SS/PBCH reception.

In another example, antenna port(s) associated with a reception of PoSS can be assumed to be QCLed with an antenna port associated with one or more DL RS configured by a Transmission Configuration Indicator (TCI) state for a search space set configuration.

In yet another example, antenna port(s) associated with a reception of PoSS may not assumed to be QCLed with an antenna port associated with other RS. For example, a UE or group of UEs with high mobility, or a UE or group of UEs with long DRX cycle, can use this type of QCL assumption.

In yet another example, antenna port(s) associated with a reception of PoSS can be assumed to be QCLed with a DMRS antenna port associated with a PDCCH/PDSCH reception.

PoSS can be transmitted with repetitions, such that L^PoSS>=1 PoSS blocks can be repeated N^PoSS_reps>=1 times.

In one example, UE can assume the PoSS block(s) with same block index within different repetitions have same QCL. A UE can determines the locations of repetitions through one of the following.

In one example, the N^PoSS_reps repetitions can be mapped over different slots in time domain. The gap between two adjacent repetition in the time domain in terms of the number of slots can be N^gap_slot. N^gap_slot can be either predetermined, e.g., N^gap_slot=0, or provided to UE through higher layer signaling.

In another example, the N^PoSS_reps repetitions can be mapped into different RBs in frequency domain. The gap between two adjacent repetitions in the frequency domain in terms of number of RBs can be N^gap_RB. N^gap_RB can be either predetermined or provided to UE through higher layer signaling.

In another example, transmission diversity scheme can be applied to N^PoSS_reps repetitions of PoSS transmission bursts. The transmission diversity scheme can be either transparent to the UE, or predefined that at most a fixed number of transmissions of PoSS blocks with same PoSS block index have same antenna port assumption.

In yet another example, frequency-hopping can be applied to N^PoSS_reps repetitions of PoSS transmission bursts. The number of available narrowband for the transmission of PoSS repetitions can be determined as N_NB=floor (N^BWP_RB/N^PoSS_RB), where N^BWP_RB, and N^PoSS_RB are the BW of associated DL BWP and PoSS respectively. N^PoSS_reps repetitions of PoSS transmission burst can be mapped to different narrowbands sequentially.

In yet another example, different cover codes can be applied to different repetitions in order to increase randomness over time.

For the repetition on PoSS, a sequence repetition within each PoSS block can be considered to improve the detection performance of PoSS at UE side.

This sub-embodiment considers UE procedure for receiving PoSS. A PoSS can carry N>=1 bit of information explicitly. Meanwhile, some additional power saving information can be carried in a PDCCH, and the reception of the associated PDCCH can be triggered or indicated by PoSS. The associated PDCCH carrying additional power saving information can be defined/referred as power saving channel. The resource and the configuration of the associated PDCCH reception can either be fixed and predefined in the specification of system operation or provided to the UE through higher layer signaling together with the configuration of PoSS. When the PoSS is monitored by a group of UEs, the associated PDCCH can be a group-common PDCCH. When PoSS is monitored by a dedicated UE, the associated PDCCH can be decoded by UE with CRC scrambled by C-RNTI or a new RNTI dedicated for power saving purpose, for example P-RNTI.

Figure 15:
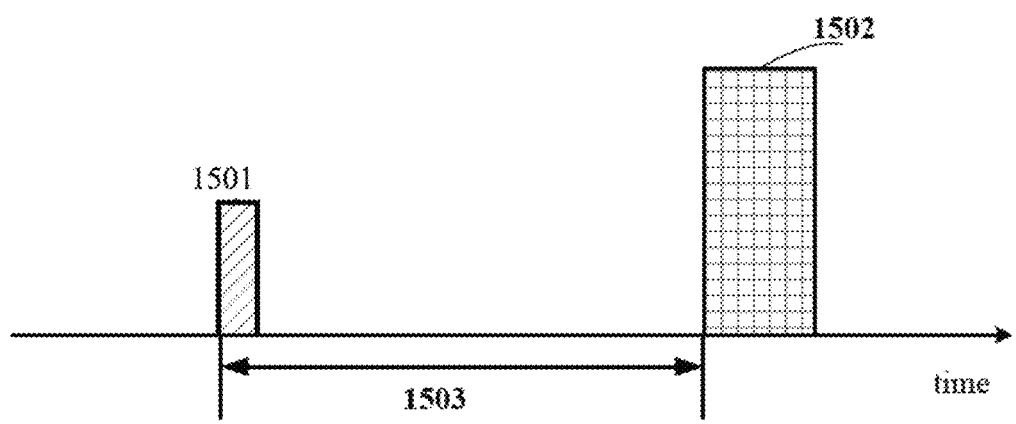
FIG. 15 illustrates an example configuration of PoSS and associated PDCCH in time domain according to embodiments of the present disclosure.

FIG. 15 illustrates an example configuration 1500 of PoSS and associated PDCCH in time domain according to embodiments of the present disclosure. The embodiment of the configuration 1500 illustrated in FIG. 15 is for illustration only. FIG. 15 does not limit the scope of this disclosure to any particular implementation.

A gap in terms of number of slots or OFDM symbols between the start of PoSS 1501 and the start of associated PDCCH 1502, denoted as N^gap_PDCCH 1503 can be either predetermined in the specification of system operation, e.g., N^gap_DCI=1 slot or provided to UE through higher layer signaling.

A UE can determine the reception of an associated PDCCH to a PoSS through one of the following.

In one example, the existence of associated PDCCH is pre-known to the UE. UE can decode the associated PDCCH after detection of the PoSS. An association between PoSS and additional PDCCH can either be fixed and predefined in the specification of operation system or be provided to the UE through higher layer signaling.

In another example, the indication of reception of an associated PDCCH can be carried in PoSS. In this case, a UE can determine whether or not to decode associated PDCCH after detecting and decoding the information in PoSS.

Figure 16:
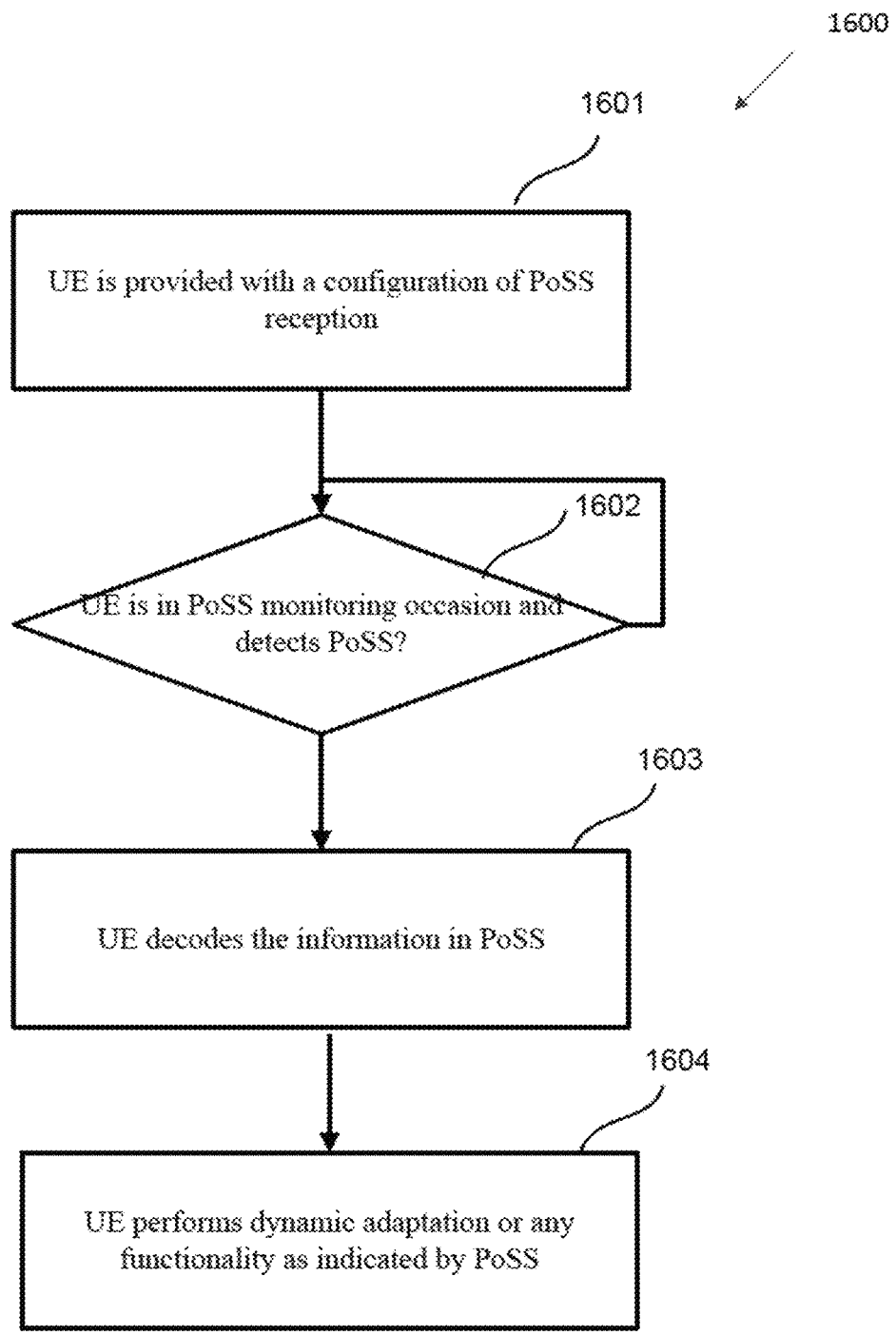
FIG. 16 illustrates an example UE procedure for receiving PoSS according to embodiments of the present disclosure.

FIG. 16 illustrates an example UE procedure 1600 for receiving PoSS according to embodiments of the present disclosure. The embodiment of the UE procedure 1600 illustrated in FIG. 16 is for illustration only. FIG. 16 does not limit the scope of this disclosure to any particular implementation.

A UE is provided with a configuration for PoSS reception, including the parameters described in the aforementioned embodiment, such as a monitoring periodicity, bandwidth, and so on, at step 1601. The UE determines whether or not the UE is in PoSS monitoring occasion to detect PoSS at step 1602. When the UE is in PoSS monitoring occasion and detects the PoSS, the UE decodes the PoSS to get information for triggering dynamic adaptation or indication of any functionalities at step 1603. The UE then performs dynamic adaptation or any functionality as indicated by the received PoSS at step 1604.

Figure 17:
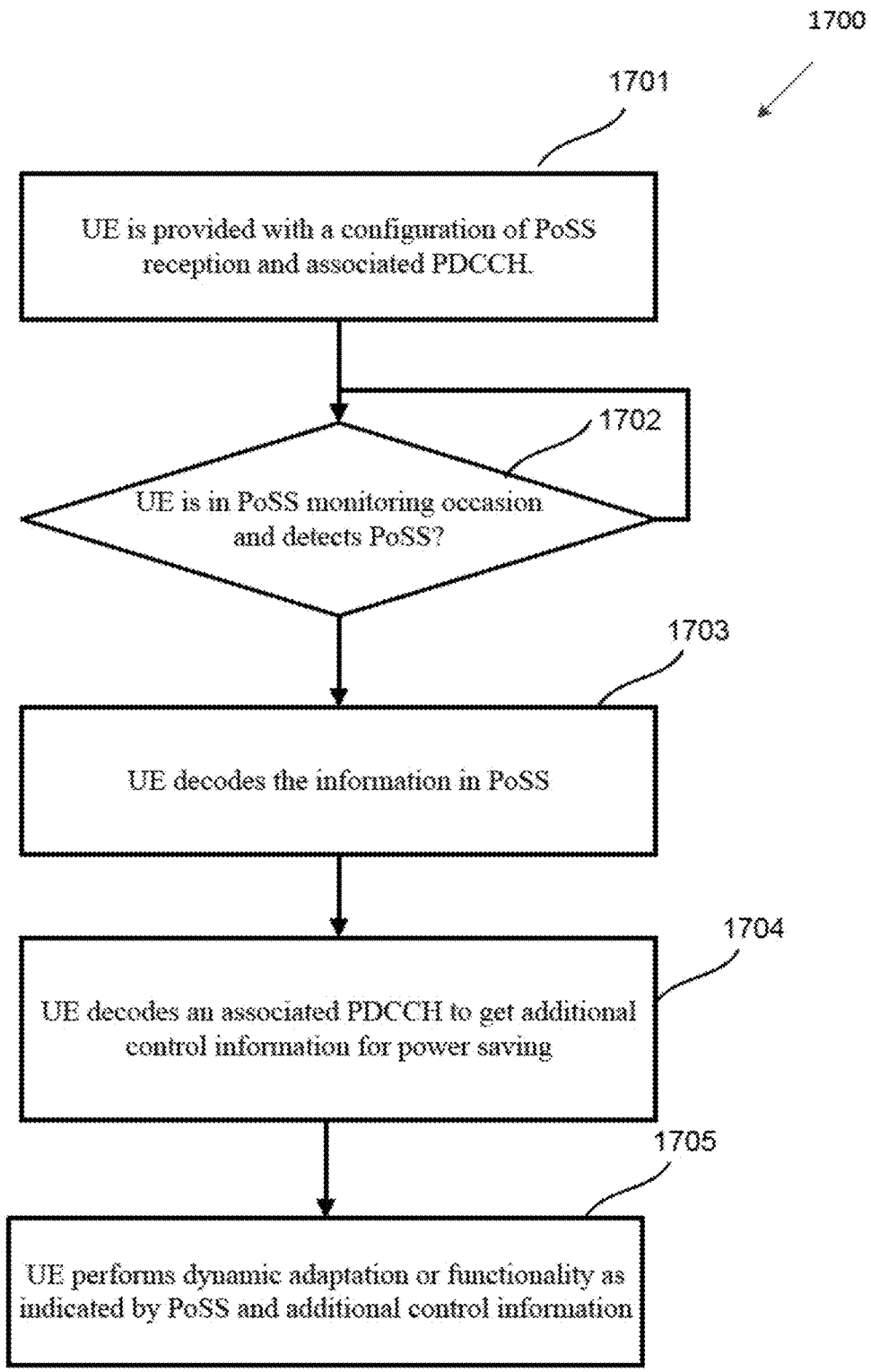
FIG. 17 illustrates an example UE procedure for receiving PoSS according to embodiments of the present disclosure.

FIG. 17 illustrates an example UE procedure 1700 for receiving PoSS according to embodiments of the present disclosure. The embodiment of the UE procedure 1700 illustrated in FIG. 17 is for illustration only. FIG. 17 does not limit the scope of this disclosure to any particular implementation.

A UE is provided with a configuration for PoSS reception, including the parameters described in the aforementioned embodiment, such as a monitoring periodicity, bandwidth, and an associated PDCCH at step 1701. The UE determines whether or not the UE is in PoSS monitoring occasion to detect the PoSS at step 1702. When the UE is in PoSS monitoring occasion and detects the PoSS, the UE decodes the PoSS to get information for triggering dynamic adaptation or indication of any functionalities at step 1703. The UE then decodes an associated PDCCH to get additional power saving information for power saving purpose if indicated by the PoSS at step 1704. The UE performs dynamic adaptation or any functionality as indicated by the received PoSS and additional power saving information at step 1705.

In one embodiment, PoSS is used as indication of wake-up (PoSS-WU). PoSS-WU can be used to trigger a UE in sleep mode to wake-up and perform at least PDCCH monitoring for a scheduling grant of PDSCH reception and PUSCH transmission in an active period in C-DRX mode or idle/inactive mode paging. The default active period in C-DRX mode is the ON duration in associated CDRX cycle(s) within the monitoring periodicity of PoSS. The default active period in idle/inactive mode paging is the paging occasion(s) within the monitoring periodicity of PoSS. A UE that detects the PoSS-WU in configured monitoring occasion may wake-up for PDCCH monitoring for an active period.

Except for indication of wake-up for a default active period, more information can be carried by PoSS-WU explicitly or in a PDCCH reception indicated by PoSS-WU for power saving purpose.

In one example, when a PoSS-WUS is monitored by a group of UEs, a subset of UEs that may wake-up, denoted as L^WU_IDs, can be carried in PoSS explicitly or in the associated PDCCH.

In another example, a dynamic active period that a UE may wake up and keep monitoring PDCCH, denoted as T_active, can be carried in PoSS explicitly or in the associated PDCCH.

In yet another example, adaptation request on one or multiple power consumption dimensions for the UEs that are triggered to wake up can be carried in PoSS explicitly or in the associated PDCCH.

Figure 18:
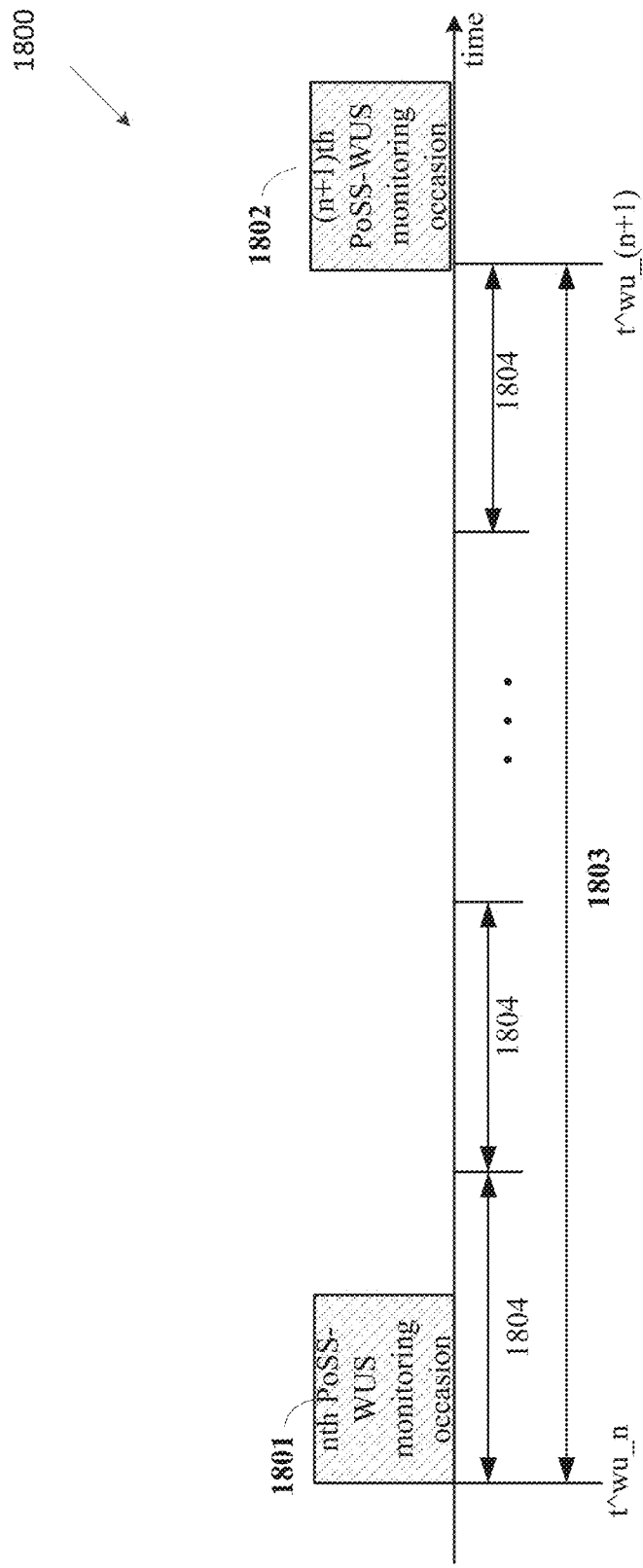
FIG. 18 illustrates an example dynamic partial active period according to embodiments of the present disclosure.

FIG. 18 illustrates an example dynamic partial active period 1800 according to embodiments of the present disclosure. The embodiment of the dynamic partial active period 1800 illustrated in FIG. 18 is for illustration only. FIG. 18 does not limit the scope of this disclosure to any particular implementation.

In one example of dynamic active period, T_active can be partial period between two consecutive PoSS-WU monitoring occasions, 1801 and 1802. In this case, the time interval between two consecutive PoSS-WU monitoring occasions 1803 can be denoted as: [t^wu_n, t^wu_(n+1)], where t^wus_n, is the nth PoSS-WU monitoring occasion and t^wus_n+1 is the (n+1)th PoSS-WU monitoring occasion. A bitmap information, denoted as I_active=[b_0, b_1, . . . b_{N−1}], with size of N bits can be used to indicate a discontinuous active period associated with the detected PoSS-WU at the nth PoSS-WU monitoring occasion. N can be derived from the time granularity, denoted as T0 1804, for example N=ceil(T^PoSS/T0). When the ith bit b_i is 1, the time interval, [b_i*T0++t^wu_n, b_{i+1}*T0+t^wus_n] is active, wherein a UE can switch from sleep mode to active mode; otherwise, when the ith bit b_i equals to 0, the time interval, [b_i*T0++t^wu_n, b_{i+1}*T0+t^wu_n] is inactive, wherein a UE can keep sleep. The control information I_active can be carried by the PoSS-WU or in a PDCCH reception indicated by PoSS-WU.

In another example of dynamic active period, T_active can be multiple times of PoSS-WU monitoring periodicity, T^PoSS, such that T_active=I_active*T^PoSS, where I_active is a positive integer. In this case, a UE can skip monitoring remaining PoSS-WU occasions within the dynamic active period. The assistance information I_active can be carried by the PoSS-WU or in a PDCCH reception indicated by PoSS-WU.

In one example for dynamic adaptation triggered by PoSS-WU, an adaptation table or profile can be either predetermined or provided to a UE through higher layer signaling. A dynamic row index of the adaptation profile can be carried by PoSS-WU or in a PDCCH reception indicated by PoSS-WU. In this case, the information about dynamic adaptation request, I_AR, is the row index to a pre-known adaptation profile.

In another example for dynamic adaptation triggered by PoSS-WU, one or multiple scalar(s), $s^X$, indicating dynamic scaling on related adaptive parameter(s), X, can be carried in PoSS-WU or in a PDCCH reception indicated by PoSS-WU. In this case, the information for dynamic adaptation request can be denoted as I_AR={$s^X$}, which is a list of scalars, $s^X$.

The reception of information other than wake-up indication, including a list of dynamic wake-up UE(s), L^WU_IDs, dynamic wake-up period, I_active, and dynamic adaptation request, I_AR, can be received by a UE in PoSS-WU directly.

Figure 19:
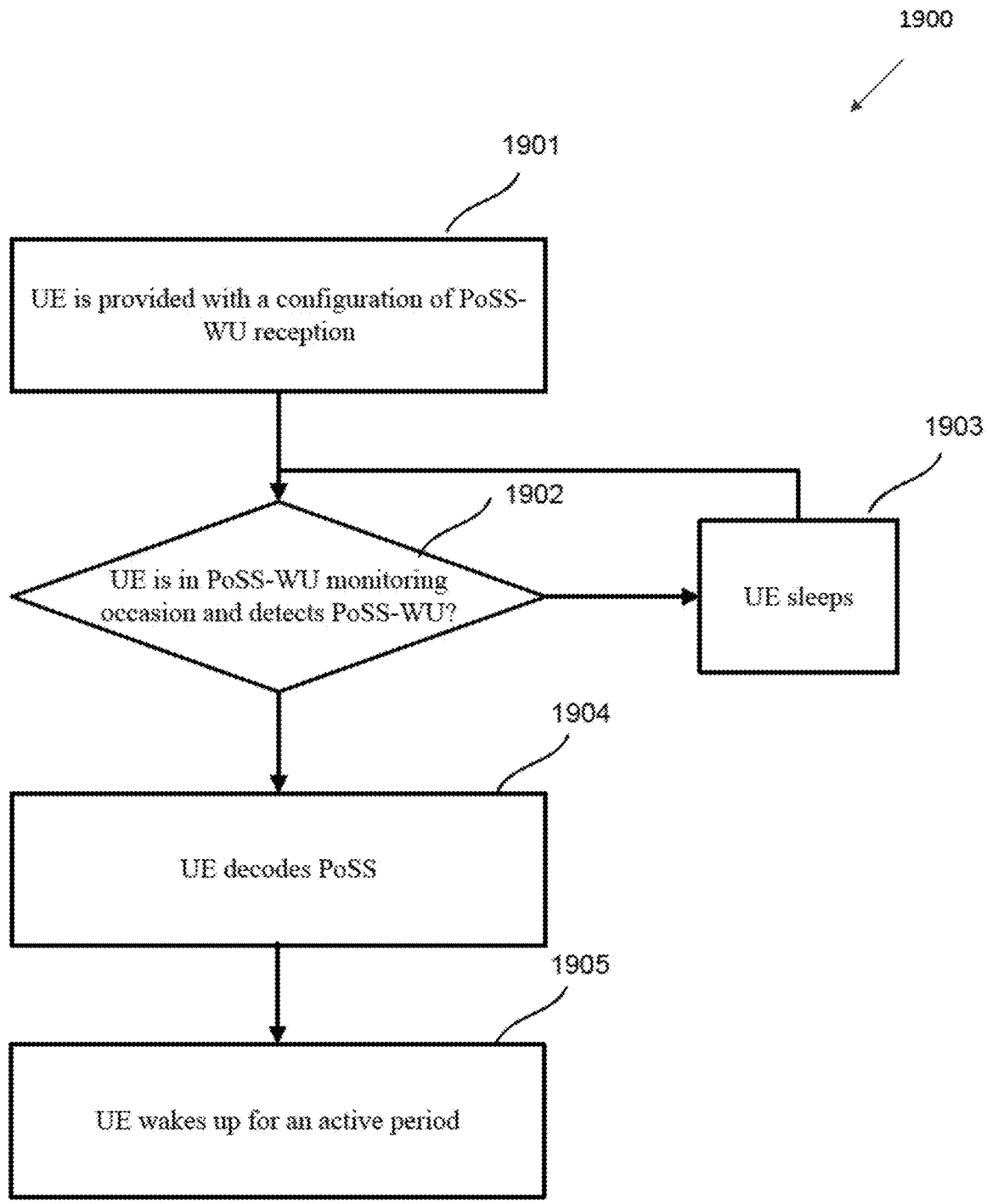
FIG. 19 illustrates an example UE procedure for receiving PoSS-WU and wake-up according to embodiments of the present disclosure.

FIG. 19 illustrates an example UE procedure 1900 for receiving PoSS-WU and wake-up according to embodiments of the present disclosure. The embodiment of the UE procedure 1900 illustrated in FIG. 19 is for illustration only. FIG. 19 does not limit the scope of this disclosure to any particular implementation.

As illustrated in FIG. 19, a UE is provided with a configuration on PoSS-WU reception, including the parameters described in embodiment I, such as a monitoring periodicity, bandwidth, and so on, at step 1901. The UE determines whether or not the UE is in PoSS-WU monitoring occasion to detect PoSS-WU at step 1902. When the UE is not in PoSS-WU monitoring occasion or does not detect the PoSS-WU, the UE goes to a sleep mode at step 1903; otherwise the UE decodes PoSS to get the control information for power saving if configured. The UE wakes up and monitors PDCCH for scheduling grants of PUSCH transmission and PDSCH reception in an active period indicated by PoSS-WU, and may perform dynamic adaptation on associated power consumption domains if additional information, I_AR, is carried by PoSS-WU at step 1904.

The reception of additional information other than wake-up indication, including a list of dynamic wake-up UE(s), L^WU_IDs, dynamic wake-up period, I_active, and dynamic adaptation request, I_AR, can be received by a UE in a PDCCH indicated by PoSS-WU. The associated PDCCH can be received after the reception of PoSS-WU. In this case, the UE has to wake up in two steps/stages in order to get all information needed to get ready for wake-up.

Figure 20:
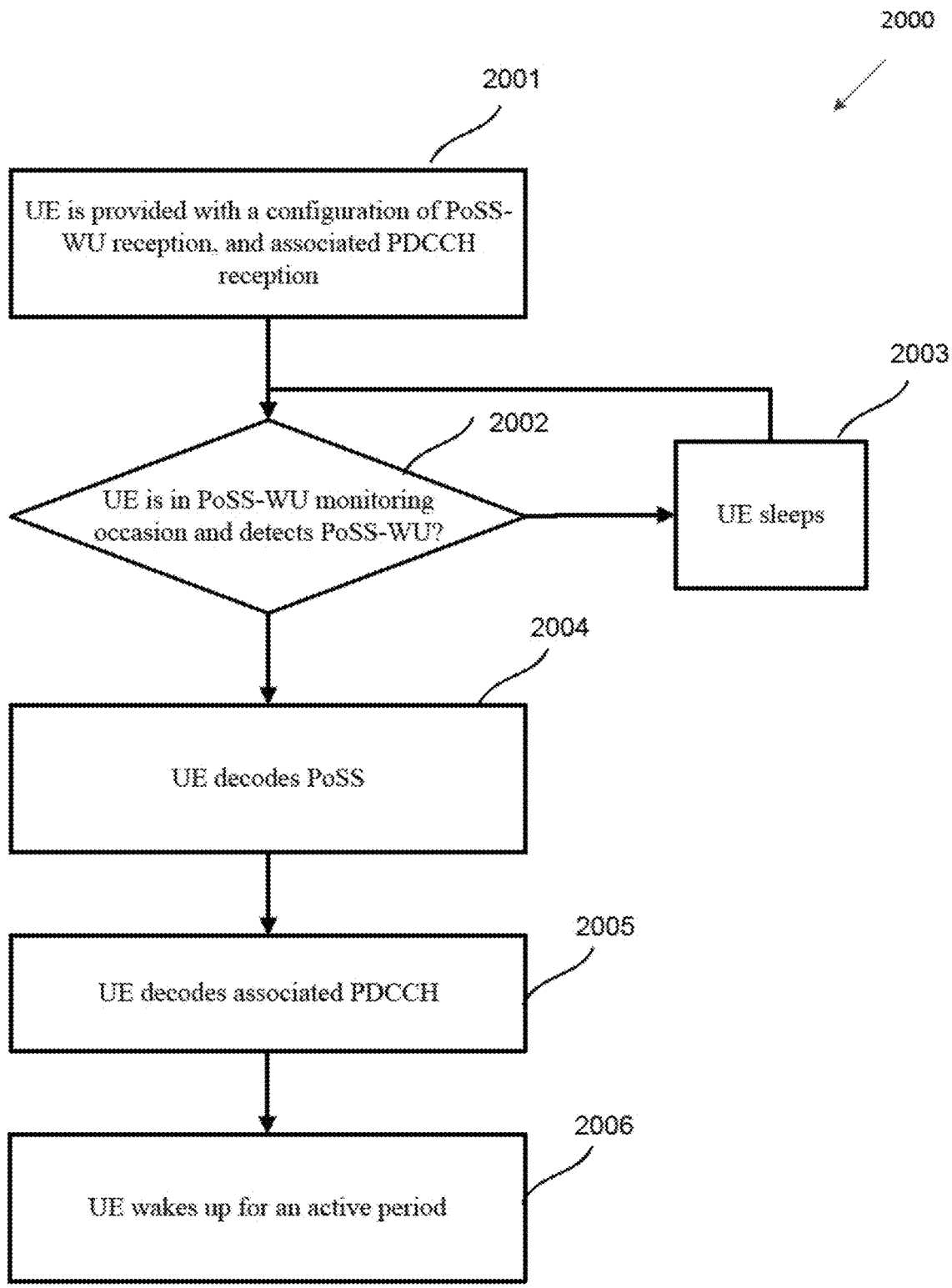
FIG. 20 illustrates another example UE procedure for receiving PoSS-WU and wake-up according to embodiments of the present disclosure.

FIG. 20 illustrates another example UE procedure 2000 for receiving PoSS-WU and wake-up according to embodiments of the present disclosure. The embodiment of the UE procedure 2000 illustrated in FIG. 20 is for illustration only. FIG. 20 does not limit the scope of this disclosure to any particular implementation.

A UE is provided with a configuration on PoSS-WU reception, including the parameters described in embodiment I and associated PDCCH for reception of additional power saving information at step 2001. The UE determines whether or not the UE is in PoSS-WU monitoring occasion to detect PoSS-WU at step 2002. When the UE is not in PoSS-WU monitoring occasion or does not detect the PoSS-WU, the UE goes to a sleep mode at step 2003; otherwise the UE decodes PoSS at step 2004 and associated PDCCH at step 2005 for additional information, including dynamic wake-up UE list, I^WU_IDs, dynamic active period, I_active, and dynamic adaptation request, I_AR. The UE wakes up for at least PDCCH monitoring and performs dynamic adaptation in an active period as indicated by PoSS-WU at step 2005.

In this sub-embodiment, a PoSS-WU is supported for a UE that operates in C-DRX mode. The monitoring periodicity of PoSS-WU, T^PoSS can be associated C-DRX cycle, TADRX. There can be 1-to-1 or 1-to-N mapping between PoSS-WU and C-DRX cycles.

Figure 21:
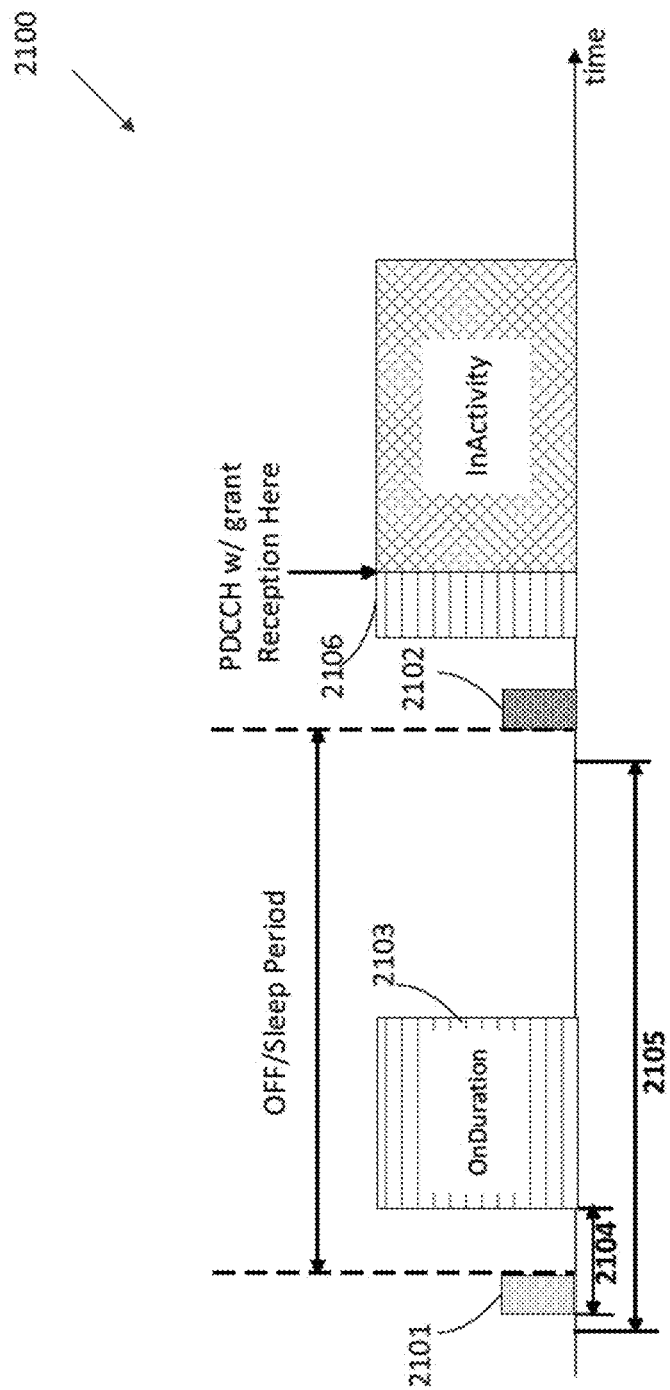
FIG. 21 illustrates an example time domain configuration of PoSS-WU associated with C-DRX according to embodiments of the present disclosure.

FIG. 21 illustrates an example time domain configuration 2100 of PoSS-WU associated with C-DRX according to embodiments of the present disclosure. The embodiment of the time domain configuration 2100 illustrated in FIG. 21 is for illustration only. FIG. 21 does not limit the scope of this disclosure to any particular implementation.

As illustrated in FIG. 21, a gNB can configure a monitoring periodicity of PoSS-WU, T^PoSS 2105, associated with DRX cycle, T^DRX, such that T^PoSS=c1*T^DRX, where c1 is a positive integer, and is either predetermined, e.g., c1=1, or provide to the UE through higher layer signaling. A start of PoSS-WU can be associated with the start of the first OnDuration 2103 within the periodicity 2105. A monitoring time gap, 2104, indicates a gap between the start of PoSS-WU and the start of the first OnDuration. The UE can skip wake-ups for the associated OnDuration 2103 if the UE doesn't detect PoSS-WU in associated monitoring occasion 2101; otherwise when the UE detects a PoSS-WU 2102, the UE wakes up in associated OnDuration 2106.

Figure 22:
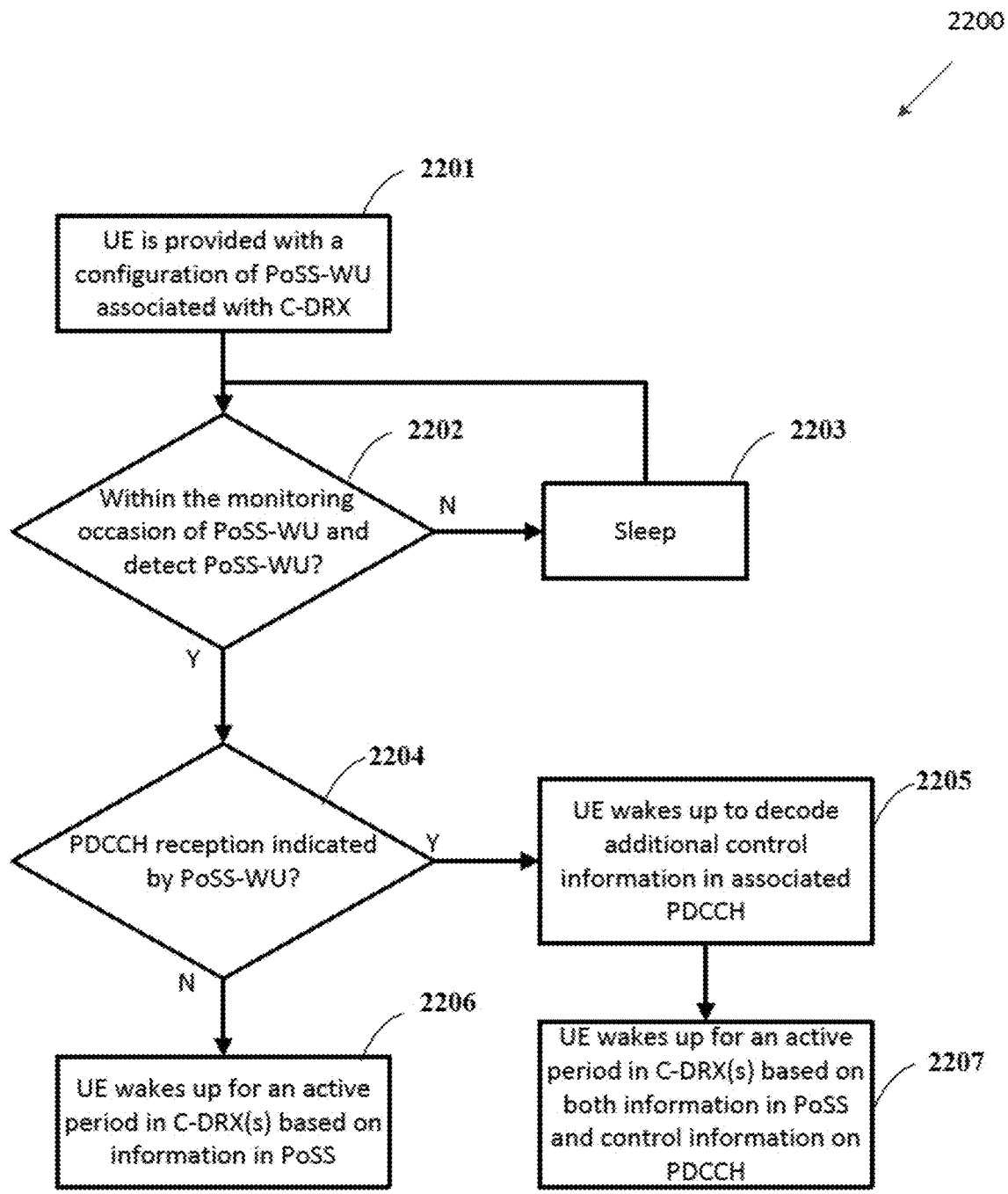
FIG. 22 illustrates an example UE procedure for PoSS-WU processing in C-DRX according to embodiments of the present disclosure.

FIG. 22 illustrates an example UE procedure 2200 for PoSS-WU processing in C-DRX according to embodiments of the present disclosure. The embodiment of the UE procedure 2200 illustrated in FIG. 22 is for illustration only. FIG. 22 does not limit the scope of this disclosure to any particular implementation.

A UE is provided with a configuration on PoSS-WU reception associated with C-DRX at step 2201. The UE determines whether or not the UE is in PoSS-WU monitoring occasion to detect PoSS-WU at step 2202. When the UE is not in PoSS-WU monitoring occasion or does not detect the PoSS-WU, the UE goes to a sleep mode at step 2203; otherwise the UE determines whether or not a PDCCH reception is needed at step 2204. When a PDCCH reception is indicated by the detection of the PoSS, the UE wakes up to decode additional power saving information in the associated PDCCH at step 2205, and wakes up to monitor PDCCH for scheduling grants of data reception and transmission in an active period of C-DRX(s) and perform dynamic adaptation as indicated by both PoSS-WU and additional power saving information at step 2207; otherwise the UE wakes up to monitor PDCCH for scheduling grants of data reception and transmission in an active period of C-DRX(s) and perform dynamic adaptation as indicated by decoded information in PoSS-WU at step 2206.

In this sub-embodiment, a PoSS-WU is supported for the UE that operates in idle/inactive mode paging. The monitoring periodicity of PoSS-WU, T^PoSS, can be associated with a paging configuration, such as PF and PO.

In one example, there can be 1-to-1 or 1-to-N mapping between PoSS-WU and PF(s). One PoSS-WU monitoring occasion can be associated with N1>=1 consecutive PF(s) and is effectively associated to all paging occasions (POs) within the associated PF(s). A PoSS-WU is transmitted from a gNB to a group of UEs that monitor paging messages in associated POs. The PoSS-WU can be used to trigger a UE to wake up for decoding a paging message in an associated PO.

Figure 23:
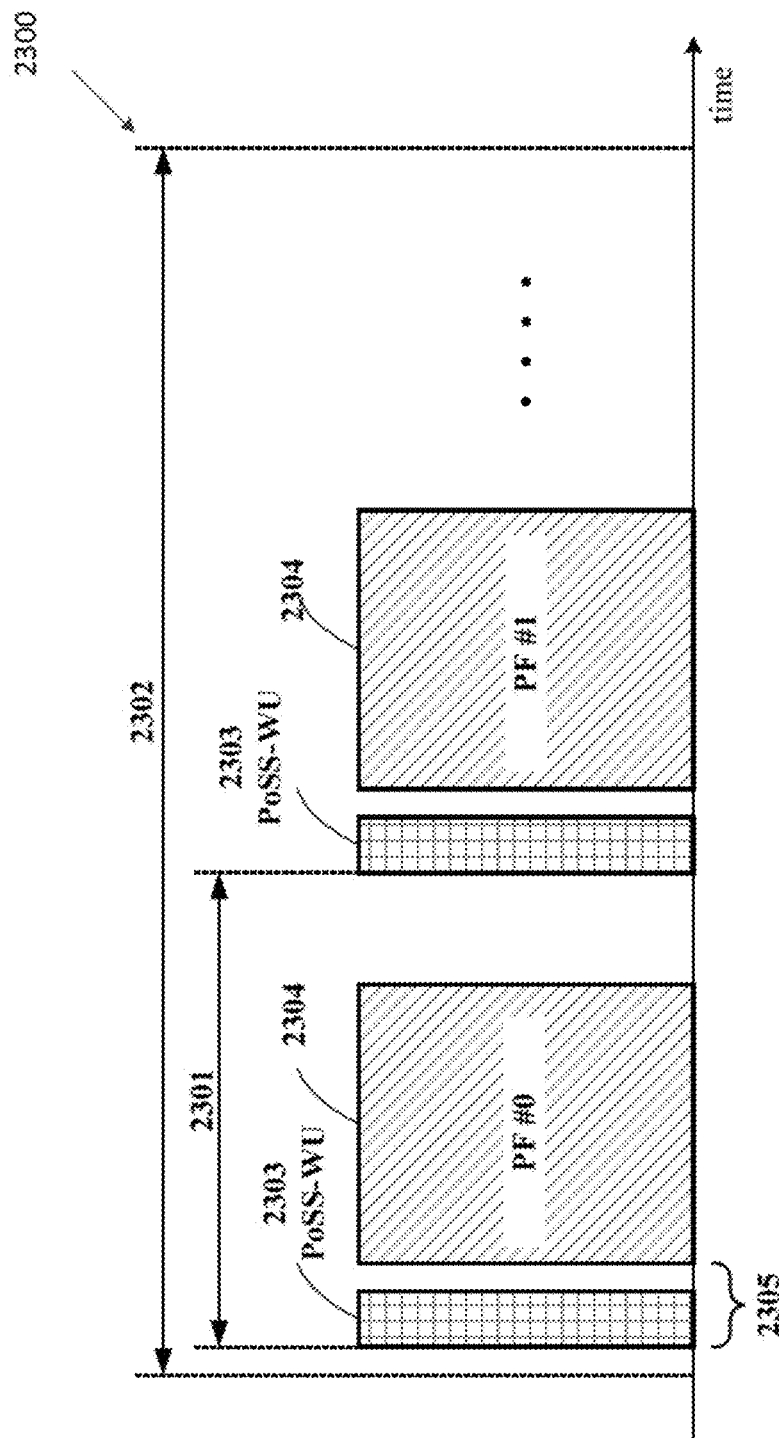
FIG. 23 illustrates an example a time domain configuration of PoSS-WU associated with PF according to embodiments of the present disclosure.

FIG. 23 illustrates an example time domain configuration 2300 of PoSS-WU associated with PF according to embodiments of the present disclosure. The embodiment of the time domain configuration 2300 illustrated in FIG. 23 is for illustration only. FIG. 23 does not limit the scope of this disclosure to any particular implementation.

As illustrated in FIG. 23, a gNB can configure a PoSS-WU monitoring occasion 2301 prior to N1>=1 consecutive PF(s) within a DRX cycle, TADRX 2302, in idle mode paging. A monitoring time offset of PoSS-WU 2305 can be the time gap between the start of PoSS-WU and the start of the first associated PF. A PoSS-WU monitoring periodicity can be T^PoSS=floor(T_DRX/N_PF)*c1, where N_PF is the number of PFs within one DRX cycle and c1>=1 is a positive integer and can be predetermined or provided to the UE through higher layer signaling.

In another example, there can be 1-to-1 or 1-to-N mapping between PoSS-WU and PO(s). One PoSS-WU monitoring occasion can be associated with N2>=1 consecutive PO(s). A PoSS-WU is transmitted from a gNB to a group of UEs that monitor paging messages in associated POs. The PoSS-WU can be used to trigger the UE to wake up for decoding a paging message in an associated PO.

Figure 24:
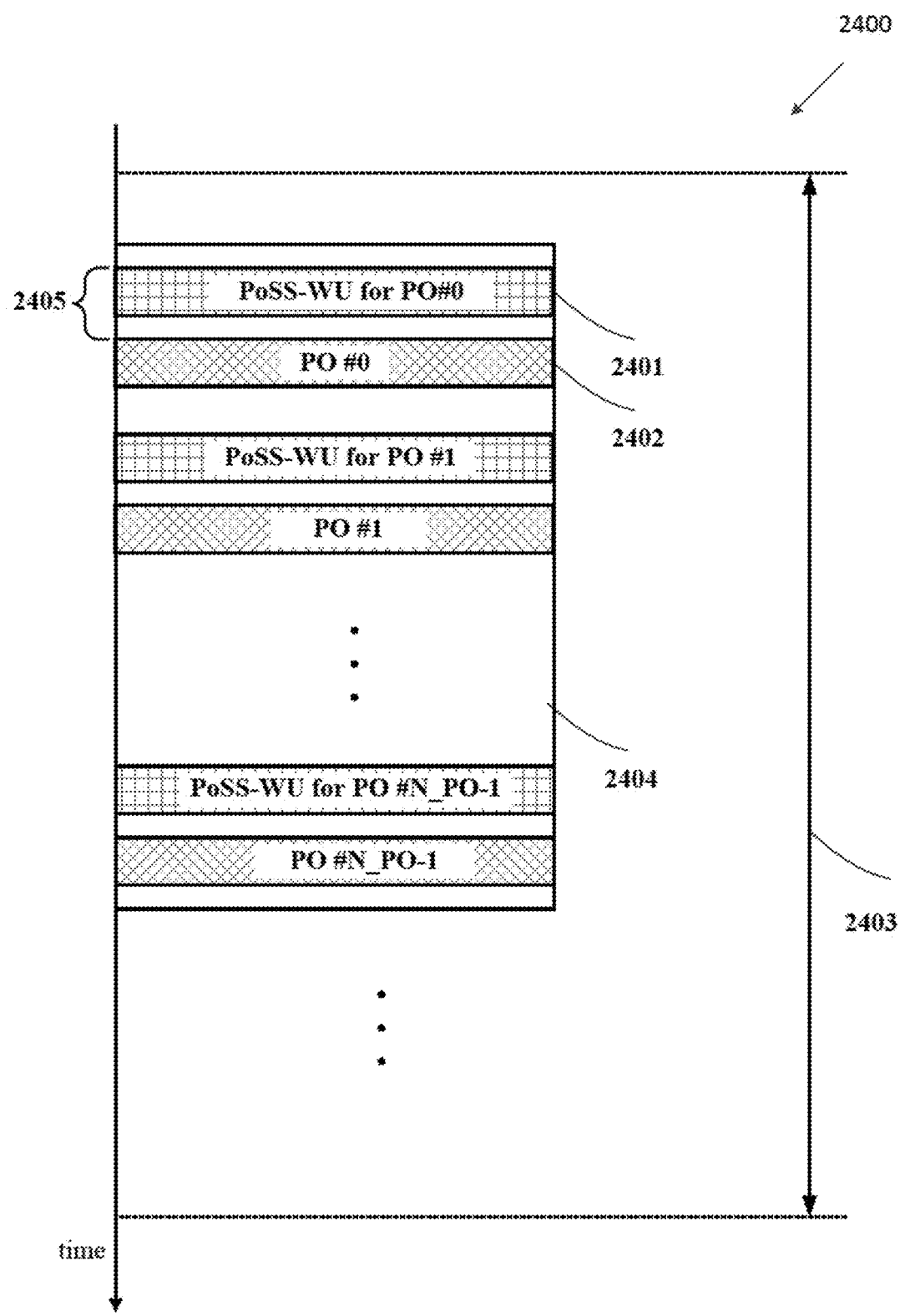
FIG. 24 illustrates an example time domain configuration of PoSS-WU associated with PO(s) according to embodiments of the present disclosure.

FIG. 24 illustrates an example time domain configuration 2400 of PoSS-WU associated with PO(s) according to embodiments of the present disclosure. The embodiment of the time domain configuration 2400 illustrated in FIG. 24 is for illustration only. FIG. 24 does not limit the scope of this disclosure to any particular implementation.

As illustrated in FIG. 24, a gNB can configure one PoSS-WU monitoring occasion 2401 prior to N2>=1 consecutive PO(s) 2402 in the time domain within a PF 2404 for idle/inactive mode paging. A PoSS-WU monitoring occasion can be identified by a time offset between the start of PoSS-WU and the start of first associated PO 2405. The time offset can be zeros, so that PoSS-WU is FDMed with PO(s).

A PoSS-WU monitoring periodicity can be T^PoSS=floor(T_0/N_PO)*c2, where N_PO is the number of POs within one PF, T0 is the duration of one PF, and c2 is a positive integer and can be predetermined, e.g., c2=1, or provided to the UE through higher layer signaling.

Figure 25:
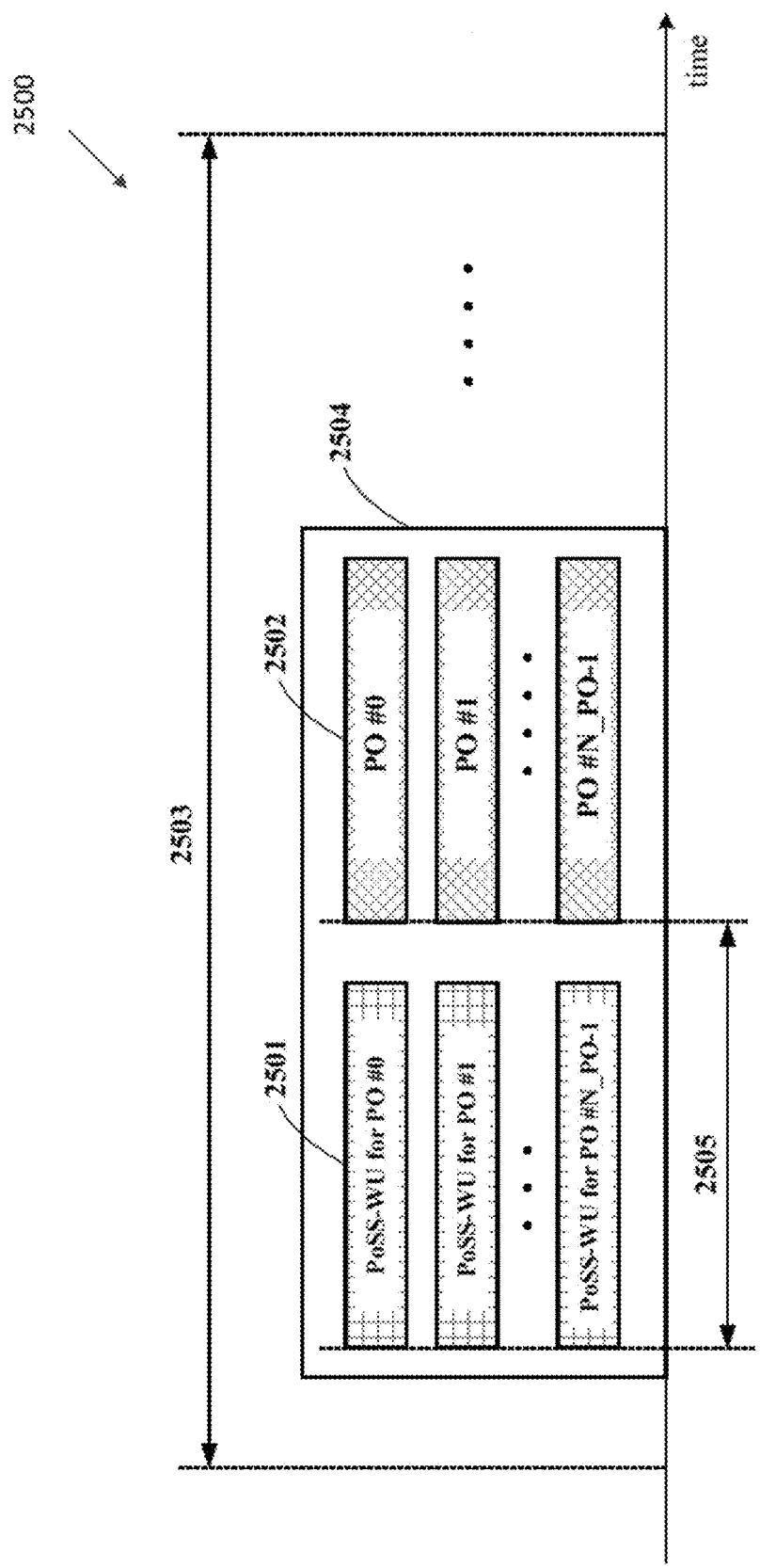
FIG. 25 illustrates another example time domain configuration of PoSS-WU associated with PO(s) according to embodiments of the present disclosure.

FIG. 25 illustrates another example time domain configuration 2500 of PoSS-WU associated with PO(s) according to embodiments of the present disclosure. The embodiment of the time domain configuration 2500 illustrated in FIG. 25 is for illustration only. FIG. 25 does not limit the scope of this disclosure to any particular implementation.

As illustrated in FIG. 25, a gNB can configure one PoSS-WU monitoring occasion 2501 prior to N2>=1 consecutive PO(s) 2502 in the frequency domain within a PF 2504 for idle/inactive mode paging. A PoSS-WU monitoring occasion can be identified by a time offset 2505 between the start of PoSS-WU and the start of the first associated PO.

A UE can determine a configuration of N1/N2 that can either be fixed and predefined in the specification, e.g., N1/N2=1, or provided to the UE through higher layer signaling.

Figure 26:
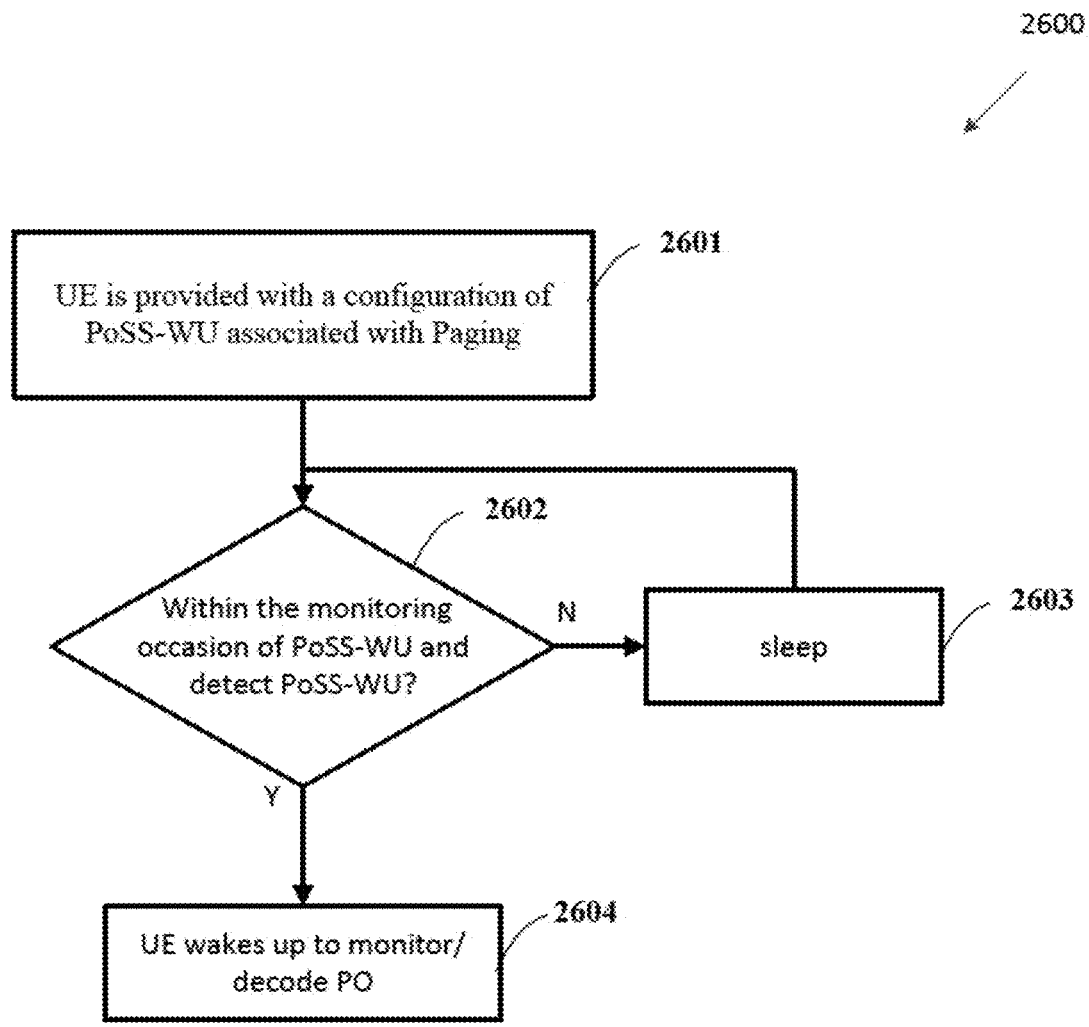
FIG. 26 illustrates an example UE procedure for processing PoSS-WU according to embodiments of the present disclosure.

FIG. 26 illustrates an example UE procedure 2600 for processing PoSS-WU according to embodiments of the present disclosure. The embodiment of the UE procedure 2600 illustrated in FIG. 26 is for illustration only. FIG. 26 does not limit the scope of this disclosure to any particular implementation.

As illustrated in FIG. 26, a UE is provided with a configuration for PoSS-WU reception associated with Paging at step 2601. The UE determines whether or not the UE is in PoSS-WU monitoring occasion to detect PoSS-WU at step 2602. When the UE is not in PoSS-WU monitoring occasion or does not detect the PoSS-WU, the UE goes to a sleep mode at step 2603; otherwise the UE wakes up to monitor PDCCH in an active period of paging occasion(s) as indicated by decoded information in PoSS-WU at step 2604.

In one embodiment, PoSS is used as indication of go-to-sleep, i.e., PoSS-GTS. PoSS-GTS can be used to trigger the UE to skip PDCCH monitoring and go-to-sleep for a duration of a sleep period with or without C-DRX configured in RRC_CONNECTED state. Except for indication of go-to-sleep, more information can be carried by PoSS-GTS directly, or in a PDCCH reception indicated by PoSS-GTS.

In one example, when a PoSS-GTS is monitored by a group of UEs, an indication for a subset of UEs that may go to sleep, denoted as L^GTS_IDs, can be carried in PoSS-GTS explicitly or in the associated PDCCH.

In another example, the duration of sleep period, denoted as T_sleep, can be carried in PoSS-GTS explicitly or in the associated PDCCH.

In yet another example, a UE can be provided with different "power saving states" or "sleep types" where each sleep type can be associated with different minimum sleep duration or different power consumption characteristics or different transition overhead to switch from different power saving mode/sleep mode to active mode. All possible sleep modes/types can be either predefined in the specification of system operation or provided to the UE through higher layer signaling. In this case, the row index associated with pre-known power saving mode/sleep mode, denoted as I_AR, can be carried in PoSS-GTS explicitly or in the associated PDCCH.

Figure 27:
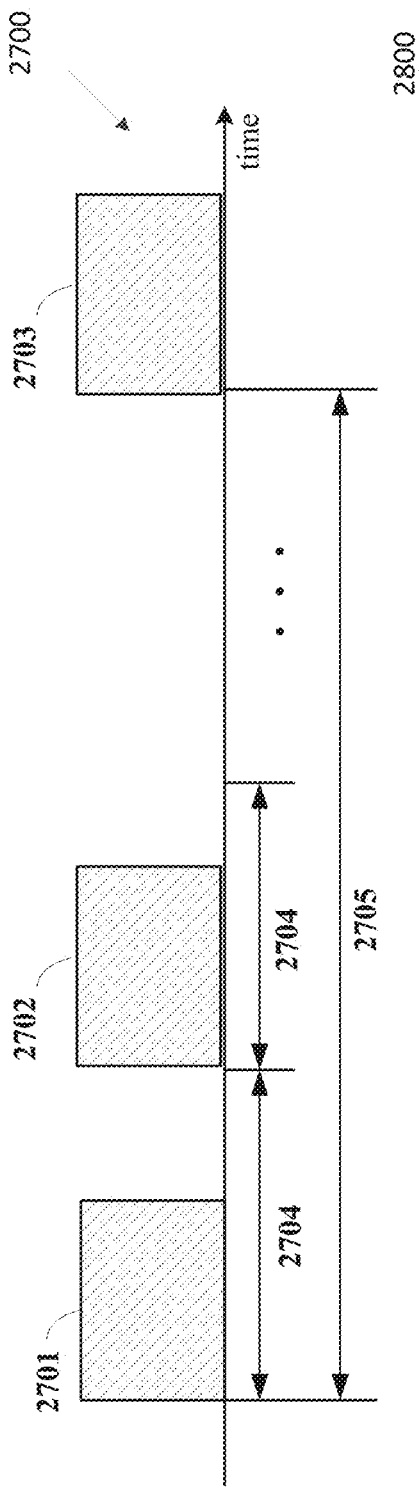
FIG. 27 illustrates an example dynamic sleep period indicated by PoSS-GTS according to embodiments of the present disclosure.

FIG. 27 illustrates an example dynamic sleep period 2700 indicated by PoSS-GTS according to embodiments of the present disclosure. The embodiment of the dynamic sleep period 2700 illustrated in FIG. 27 is for illustration only. FIG. 27 does not limit the scope of this disclosure to any particular implementation.

As illustrated in FIG. 27, in one example of dynamic active period, T_sleep 2705 can be a multiple of PoSS-GTS monitoring periodicity, T^PoSS 2704, such that T_sleep=I_sleep*T^PoSS, where I_sleep is a positive integer. In this case, a UE can skip monitoring remaining PoSS-GTS occasions 2702 within the dynamic sleep period 2705. The assistance information I_sleep can be carried by the PoSS-GTS or in a PDCCH reception indicated by PoSS-GTS.

Figure 28:
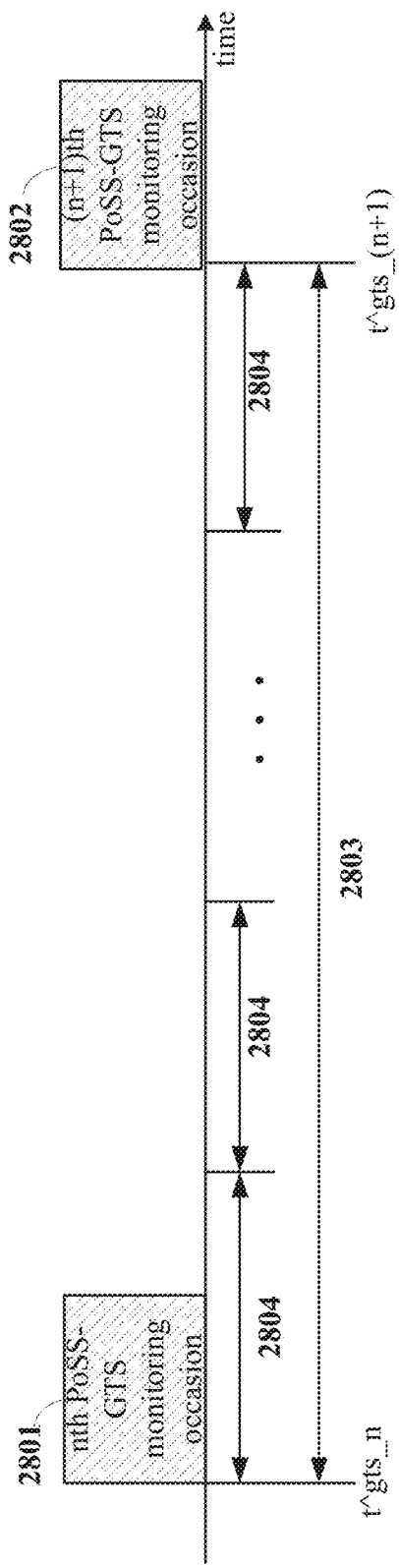
FIG. 28 illustrates an example dynamic partial sleep period indicated by PoSS-GTS according to embodiments of the present disclosure.

FIG. 28 illustrates an example dynamic partial sleep period 2800 indicated by PoSS-GTS according to embodiments of the present disclosure. The embodiment of the dynamic partial sleep period 2800 illustrated in FIG. 28 is for illustration only. FIG. 28 does not limit the scope of this disclosure to any particular implementation.

As illustrated in FIG. 28, in another example of dynamic sleep period, T_sleep can be a partial period between two consecutive PoSS-GTS monitoring occasions, 2801 and 2802. In this case, the time interval between two consecutive PoSS-GTS monitoring occasions 2803 can be denoted as: [tˆgts_n, tˆgts_(n+1)], where tˆgts_n is the nth PoSS-GTS monitoring occasion and tˆgts_n+1 is the (n+1)th PoSS-GTS monitoring occasion. A bitmap information, denoted as I_sleep=[b_0, b_1, . . . b_{N−1}], with size of N bits can be used to indicate a dynamic sleep period associated with the detected PoSS-GTS at the nth PoSS-GTS monitoring occasion.

N can be derived from the time granularity denoted as T0 2804. For example N=ceil(TˆPoSS/T0). When the ith bit b_i is 1, the UE can switch from active mode to sleep mode during the time interval, [b_i*T0++tˆwus_n, b_{i+1}*T0+ tˆwus_n]; otherwise, when the ith bit b_i is 0, the UE is in active mode during the time interval [b_i*T0++tˆwus_n, b_{i+1}*T0+tˆwus_n]. The control information I_sleep can be carried by the PoSS-GTS or in a PDCCH reception indicated by PoSS-GTS.

TABLE 1

An example of UE sleep modes/types

| Row index | Sleep types | Power consumption characteristics | Average power/slot | Additional transition energy (Relative power x ms) | Minimum sleep duration |
| --- | --- | --- | --- | --- | --- |
| 0 | Deep sleep | Turn off BB modules & RF | Low, e.g., 1 | High, e.g., 450 | e.g., 20 ms |
| 1 | Light sleep | Turn off BB modules | Moderate, e.g., 20 | Moderate, e.g., 100 | e.g., 6 ms |
| 2 | Micro sleep | Turn off most of BB modules | High, e.g., 45 | Negligible | e.g., 0 ms |
|  | Dormant | Turn off the BB modules associated with PDCCH processing/data reception/ transmission | High, e.g., 50 | Negligible | e.g., 0 ms |

PoSS-GTS can be applicable for UEs in RRC_CONNECTED state with C-DRX configured or without C-DRX configured.

Figure 29:
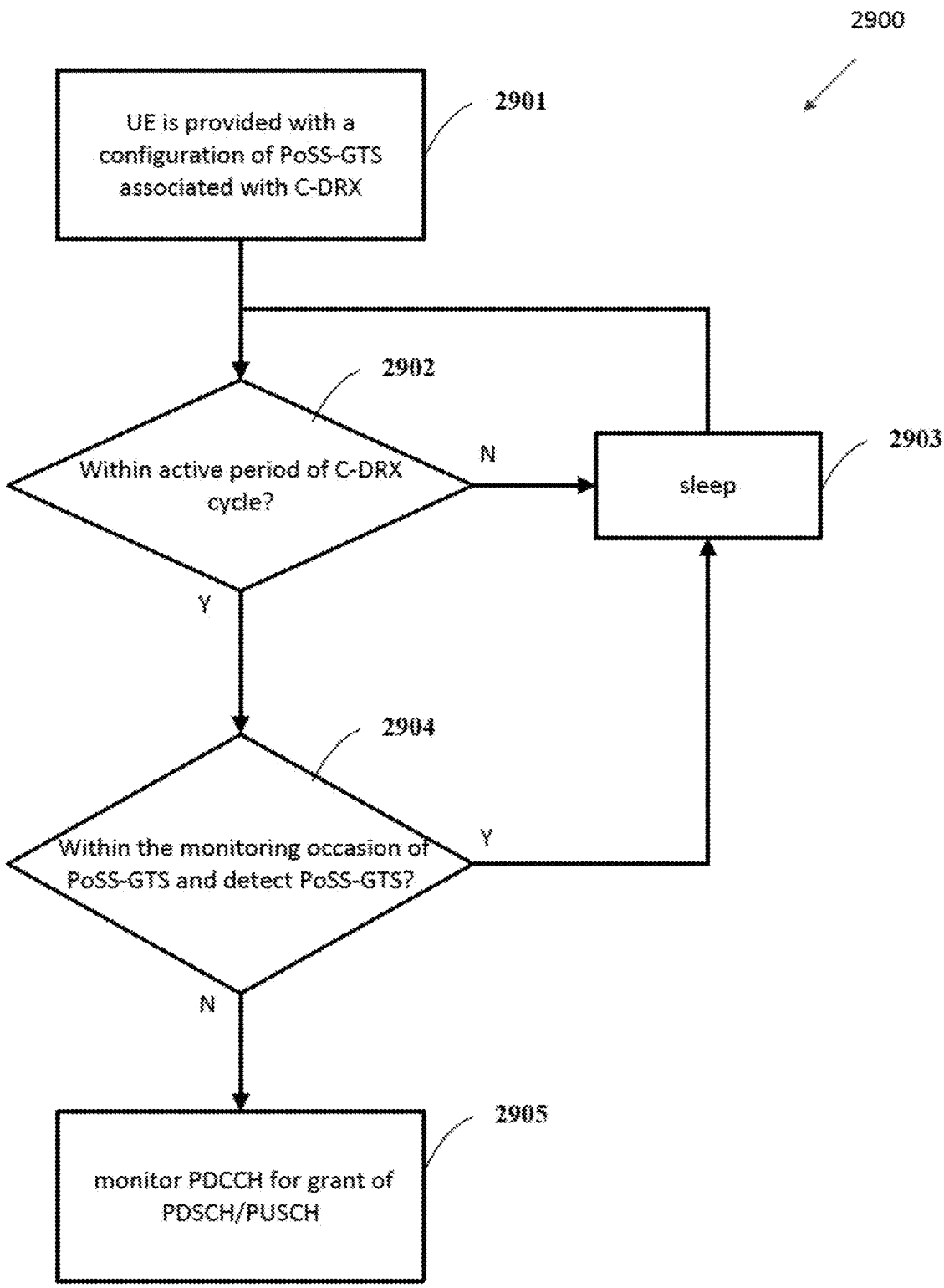
FIG. 29 illustrates an example UE procedure for monitoring PoSS-GTS with C-DRX according to embodiments of the present disclosure.

FIG. 29 illustrates an example UE procedure 2900 for monitoring PoSS-GTS with C-DRX according to embodiments of the present disclosure. The embodiment of the UE procedure 2900 illustrated in FIG. 29 is for illustration only. FIG. 29 does not limit the scope of this disclosure to any particular implementation.

As illustrated in FIG. 29, a UE is provided with a configuration for PoSS-GTS reception associated with C-DRX at step 2901. The UE determines whether or not the UE is in an active period of C-DRX cycle at step 2902. When the UE is not in the active period of C-DRX cycle, the UE sleeps at step 2903; otherwise the UE determines whether or not the UE is in a PoSS-GTS monitoring occasion to detect PoSS-GTS at step 2904. When the UE is not in PoSS-GTS monitoring occasion or does not detect the PoSS-GTS, the UE monitors PDCCH for scheduling grants of data reception and transmission through PDSCH and PUSCH, respectively, at step 2905; otherwise the UE goes to sleep as indicated by PoSS-GTS at step 2903.

Figure 30:
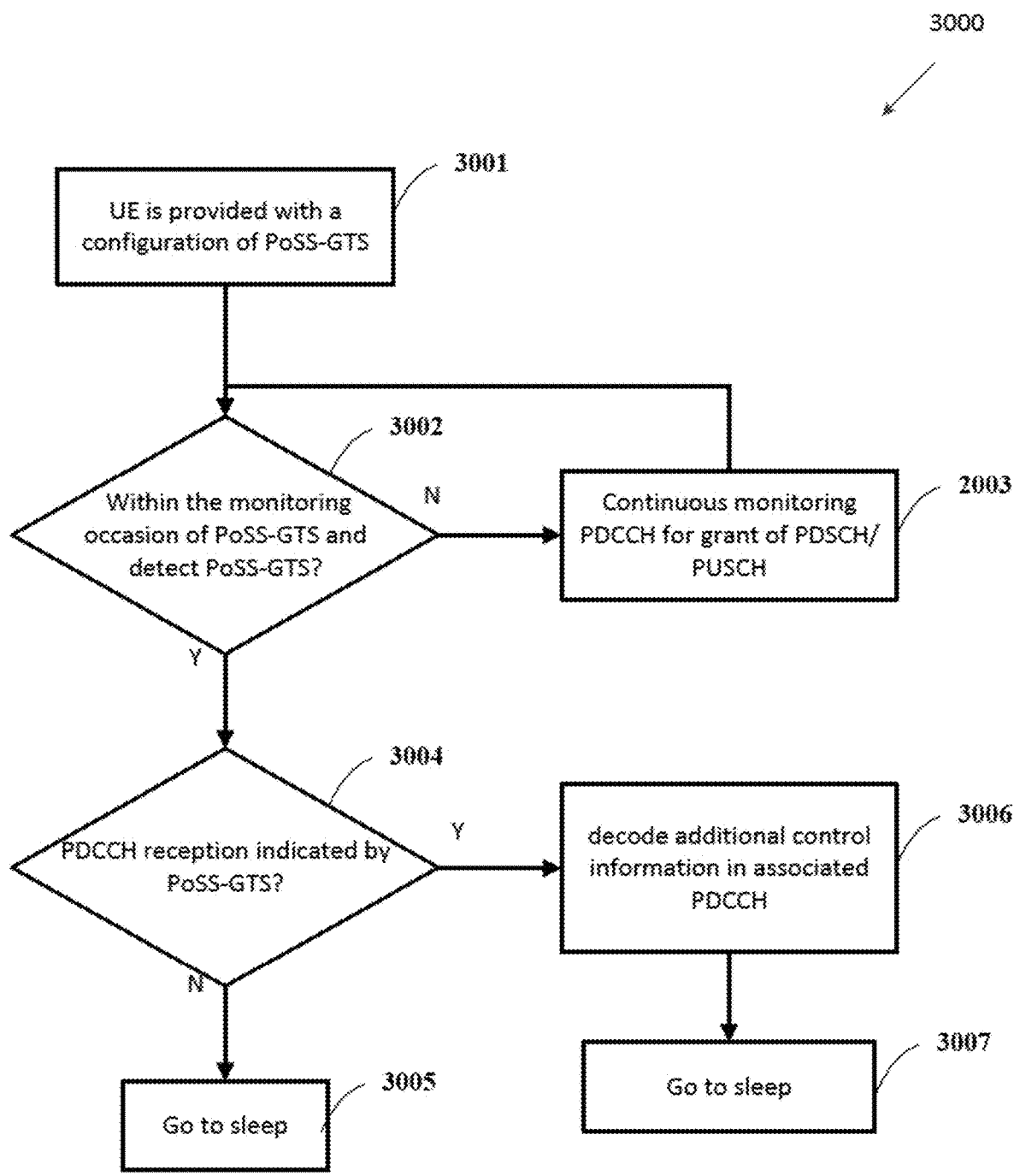
FIG. 30 illustrates an example UE procedure for monitoring PoSS-GTS without C-DRX according to embodiments of the present disclosure.

FIG. 30 illustrates an example UE procedure 3000 for monitoring PoSS-GTS without C-DRX according to embodiments of the present disclosure. The embodiment of the UE procedure 3000 illustrated in FIG. 30 is for illustration only. FIG. 30 does not limit the scope of this disclosure to any particular implementation.

As illustrated in FIG. 30, a UE is provided with a configuration for PoSS-GTS reception and no C-DRX is enabled at step 3001. The UE determines whether or not the UE is in a PoSS-GTS monitoring occasion to detect PoSS-GTS at step 3002. When the UE is not in PoSS-GTS monitoring occasion or does not detect the PoSS-GTS, the UE continues monitoring PDCCH for scheduling grant of data reception and transmission through PDSCH and PUSCH, respectively, at step 3003; otherwise the UE determines whether or not a PDCCH reception is indicated by PoSS-GTS at step 3004. When a PDCCH reception is indicated by the PoSS-GTS, the UE decodes additional information in associated PDCCH at step 3006 and then goes to sleep for a period based on decoded information in both PoSS-GTS and associated PDCCH at step 3007; otherwise the UE sleeps for a period based on the information decoded from the PoSS-GTS at step 3005.

In one embodiment, PoSS is used as an indication of a start of channel occupancy time (COT) of a serving gNB in NR unlicensed spectrum (NR-U), i.e., PoSS-COT. The UE can start monitoring PDCCH for scheduling grants of PUSCH transmission and PDSCH reception within the COT indicated by PoSS-COT.

Figure 31:
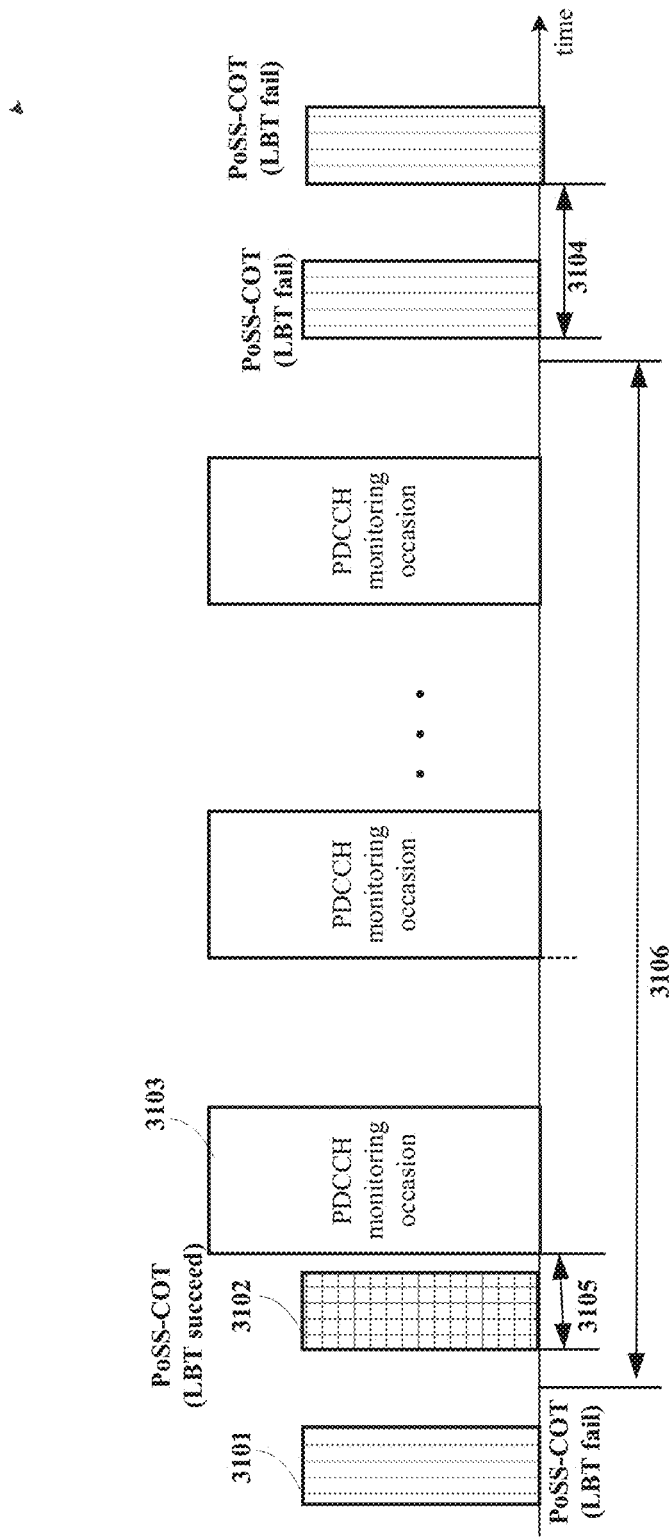
FIG. 31 illustrates an example configuration of PoSS-COT monitoring occasion in the time domain according to embodiments of the present disclosure.

FIG. 31 illustrates an example configuration 3100 of PoSS-COT monitoring occasion in the time domain according to embodiments of the present disclosure. The embodiment of the configuration 3100 illustrated in FIG. 31 is for illustration only. FIG. 31 does not limit the scope of this disclosure to any particular implementation.

As illustrated in FIG. 31, a PoSS-COT after PoSS-COT 3102 (successful LBT) can be mapped to the symbols within a partial slot between the completion of a LBT and the starting boundary of a slot containing PDCCH/PDSCH in COT, and can also serve for reservation purposes to occupy the channel. In the other word, the start of COT is the start of the slot, wherein the UE detects a PoSS-COT. The periodicity of PoSS-COT monitoring, TˆPoSS 3104, can be associated with a LBT interval if configured. The UE can stop monitoring PoSS-COT within the COT 3106 indicated by a detected PoSS-COT 3102.

Except for indicating of the start of COT, additional information for power saving can be carried by PoSS-COT directly or in a PDCCH reception indicated by PoSS-COT. The additional power saving information, denoted as I_PS, can be one of any combination of the following.

In one example, I_PS can be the length of COT (e.g., in the unit of ms or slot) for associated UEs.

In another example, I_PS can be the LBT priority class in NR-U and the UE can use this information to infer the maximum COT. A UE assumes that the UE can receive the PDCCH/PDSCH from a serving gNB within the maximum COT. For example, for a given combination of other parameters (e.g., cell ID), there can be N WUS sequences or N states of a field in a DCI format corresponding to N LBT priority class (e.g., N=4).

In yet another example, I_PS can be dynamic list of UEs that may monitoring PDCCH in associated COT. For the UEs whose ID are not included in I_PS, the UEs can be inactive for the associated COT.

In yet another example, I_PS can be DL/UL direction configuration in the associated COT. In one sub-example, I_PS can be any slot format indication (SFI) from a set of predefined values/candidates. In another sub-example, I_PS can be a bitmap to indicate the DL/UL direction within the COT, I_PS=[v0, . . . v_{N−1}]. The ith bit (v_i, i=0, . . . N−1) indicates the DL/UL direction during the time interval i*D0 to (i+1)*D0, where D0 is the time granularity of the bitmap. For example, D0 equals to one slot duration and N=ceil(D_COT/D0) is the size of bitmap I_PS, wherein D_COT is the duration of COT. For one sub-example, v_i=1 indicates the corresponding i-th time interval being a downlink one.

In yet another sub-example, if there is at most one DL/UL switch point within the COT, I_PS can carry the information indicating the switching point between DL duration and UL duration within the associated COT. In this case, the COT is divided into two intervals, e.g., the COT duration with starting location COT_s and ending location COT_e (e.g., D_COT=COT_e−COT_s) and can be divided into a DL duration D_DL and an UL duration D_UL.

In one instance, the COT is assumed to always start with DL transmission and I_PS indicates the location of the switching point within the COT. I_PS=0, . . . , ceil(D_COT/C0)−1 where C0 is the time granularity for DL and UL switching, e.g., C0=1 slot duration. In this case, the DL duration can be derived as D_DL=[COT_s, COT_s+I_PS*C0] while the UL duration can be derived as D_UL=[COT_s+I_PS*C0+1, COT_e].

In another instance, the COT is assumed to always start with DL transmission and I_PS indicates the DL duration. I_PS=0, . . . , ceil(D_COT/C1)−1, where C1 is the time granularity for DL duration within the associated COT, e.g., C1=1 slot duration. In this case, the DL duration can be determined as D_DL=[COT_s, COT_s+I_PS*C1] while the UL duration can be derived as D_UL=[COT_s+I_PS*C1+1, COT_e].

In yet another instance, the COT is assumed to always start with DL transmission and I_PS indicates the UL duration. I_PS=0, . . . , ceil(COT/C2)−1, where C2 is the time granularity for UL duration within the associated COT, e.g., C2=1 slot duration. In this case, the DL duration can be determined by D_DL=[COT_s, COT_e−I_PS*C2−1] while the UL duration can be derived as D_UL=[COT_e−I_PS*C2, COT_e].

In yet another instance, the COT is assumed to always start with a transmission aligned with the COT (e.g., start with DL if COT is associated to a LBT performed by a serving gNB or start with UL if COT is associated to a LBT performed by the UE), and I_PS indicates a location of a switching point within the COT. I_PS=0, . . . , ceil(D_COT/C0)−1 where C0 is a time granularity for DL and UL switching, e.g., C0=1 slot duration. In this case, if the COT is obtained from DL, the DL duration can be derived as D_DL=[COT_s, COT_s+I_PS*C0] while the UL duration can be derived as D_UL=[COT_s+I_PS*C0+1, COT_e]. If the COT is obtained from UL, the UL duration can be derived as D_UL=[COT_s, COT_s+I_PS*C0], while the DL duration can be derived as D_DL=[COT_s+I_PS*C0+1, COT_e].

In yet another sub-example, the COT is assumed to always start with a transmission aligned with the COT (e.g., start with DL if COT is associated to a LBT performed by a serving gNB or start with UL if COT is associated to a LBT performed by the UE), and I_PS indicates the duration before switching. I_PS=0, . . . , ceil(D_COT/C1)−1, where C1 is a time granularity for DL duration within the associated COT, e.g., C1=1 slot duration. In this case, if the COT is obtained from DL, the DL duration can be determined as D_DL=[COT_s, COT_s+I_PS*C1] while the UL duration can be derived as D_UL=[COT_s+I_PS*C1+1, COT_e]. If the COT is obtained from UL, the UL duration can be derived as D_UL=[COT_s, COT_s+I_PS*C1] while the DL duration can be derived as D_DL=[COT_s+I_PS*C1+1, COT_e].

In yet another example, the COT is assumed to always start with a transmission aligned with the COT (e.g., start with DL if COT is associated to a LBT performed by a serving gNB or start with UL if COT is associated to a LBT performed by the UE), and I_PS indicates the duration after switching. I_PS=0, . . . , ceil(COT/C2)−1, where C2 is the time granularity for UL duration within the associated COT, e.g., C2=1 slot duration. In this case, if the COT is obtained from DL, the DL duration can be determined by D_DL=[COT_s, COT_e−I_PS*C2−1] while the UL duration can be derived as D_UL=[COT_e−I_PS*C2, COT_e]. If the COT is obtained from UL, the UL duration can be determined by D_UL=[COT_s, COT_e−I_PS*C2−1] while the DL duration can be derived as D_DL=[COT_e−I_PS*C2, COT_e].

Figure 32:
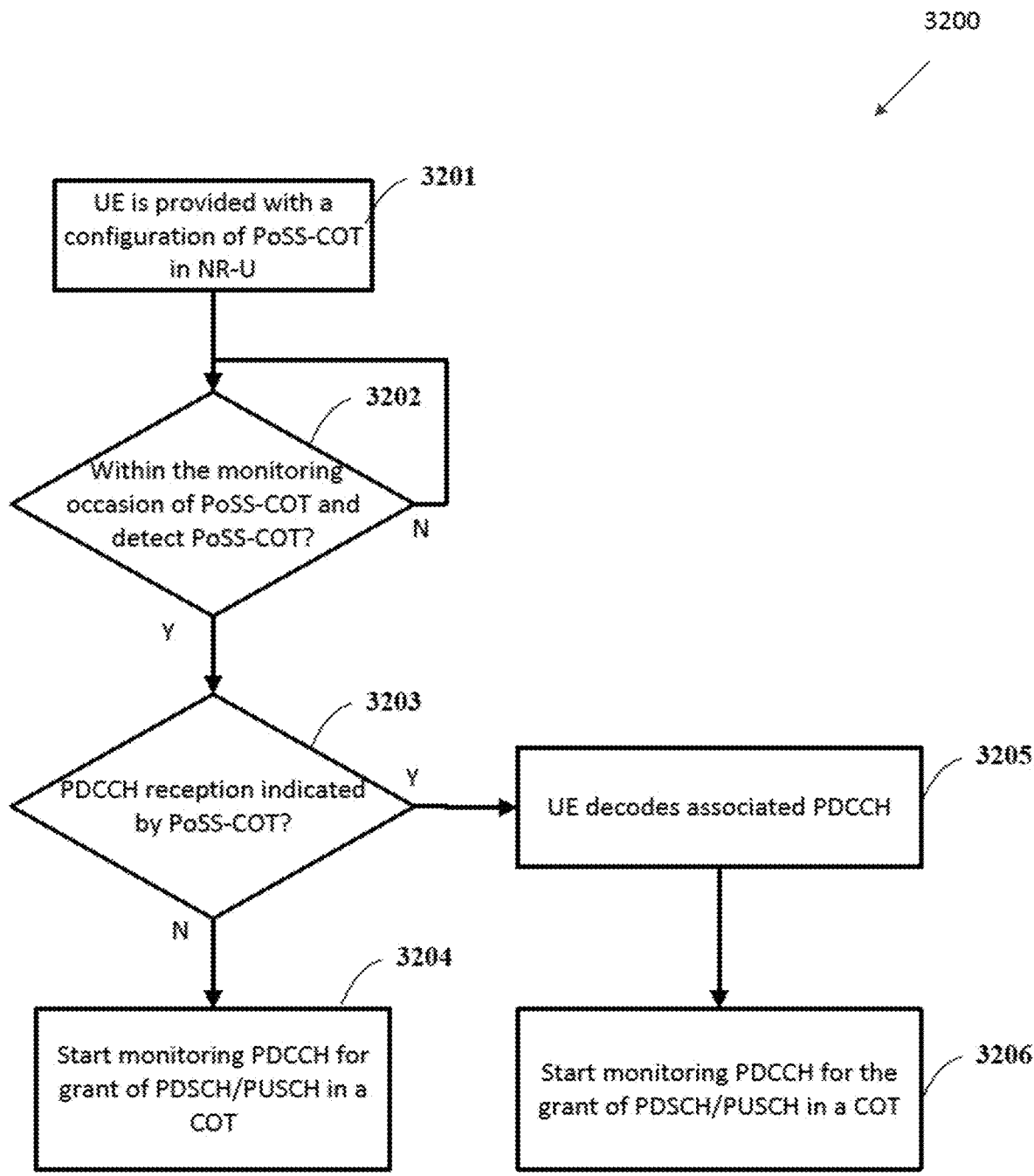
FIG. 32 illustrates an example UE procedure for monitoring PoSS-COT in NR-U according to embodiments of the present disclosure.

FIG. 32 illustrates an example UE procedure 3200 for monitoring PoSS-COT in NR-U according to embodiments of the present disclosure. The embodiment of the UE procedure 3200 illustrated in FIG. 32 is for illustration only. FIG. 32 does not limit the scope of this disclosure to any particular implementation.

As illustrated in FIG. 32, a UE is provided with a configuration on PoSS-COT reception at step 3201. The UE determines whether or not the UE in a PoSS-COT monitoring occasion and detect PoSS-COT at step 3202. When the UE is in PoSS-COT monitoring occasion and the UE detects the PoSS-COT, the UE determines whether or not a PDCCH reception is indicated by PoSS-COT at step 3203. When a PDCCH reception is indicated by PoSS-COT, the UE decodes additional power saving information in associated PDCCH at step 3205, and then start monitoring PDCCH for the grant of PDSCH/PUSCH in a COT based on decoded power saving information in both PoSS-COT and associated PDCCH at step 3206; otherwise the UE start monitoring PDCCH for the grant of PDSCH/PUSCH in a COT based on decoded power saving information in PoSS-COT at step 3204.

In one embodiment, PoSS is used to trigger dynamic adaptation request for power saving purpose, i.e., PoSS-AR. The PoSS-AR can be applicable for the UE in the active period of RRC_CONNECTED state.

In one approach of dynamic adaptation request, the PoSS-AR can carry an index to a pre-known adaptation profile/table. The column of the adaptation table or profile can indicate different adaptation domains, such as C-DRX configuration, antenna layers, and number of SCells, while the row of the adaptation profile/table can indicate different values for associated adaptive parameters.

TABLE 2 shows an example of UE adaptation profile across multiple power consumption domains/dimensions.

TABLE 3 shows another example of UE adaptation/table for single power consumption domain, which is C-DRX configuration.

TABLE 2

An example of UE adaptation profile

| Row index | Time domain [DRX cycle, inactivity timer] | Freq. domain [BWP in PCell, activated CCs] | Antenna domain [N_layers] | Notes: (Potential adaptation condition) |
|---|---|---|---|---|
| 0 | (N/A, N/A) | {BWP #1, CC #1-8} | 4 | high/burst traffic load |
| 1 | (40 ms, 10 ms) | {BWP #2, CC #1-4} | 2 | medium traffic load |
| 2 | (160 ms, 100 ms) | {BWP #2, CC #1-2} | 1 | low traffic load |
| ... | ... | ... | ... | ... |

TABLE 3

An example of UE adaptation/table

| Row index | DRX cycle | inactivity | On duration |
|---|---|---|---|
| 0 | 40 ms | 10 ms | 4 ms |
| 1 | 160 ms | 100 ms | 2 ms |
| ... | ... | ... | ... |

In another approach of dynamic adaptation request, the PoSS-AR can carry one or multiple scalars, $s^X$, indicating dynamic scaling to associated adaptive parameter, X. In this case, the control information for dynamic adaptation request can be denoted as $I\_AR=\{s^X\}$, which is a list of scalars, $s^X$.

In one example, when the associated adaptive parameter X is selected as one value, v_i, out from a candidate list, such as $L\_X=\{v\_0, v\_1 \ldots, v\_{K-1}\}$, the value of X can be adapted from v_i to v_j according to $$\begin{cases} j = (i + a_{step}) \bmod K, & \text{if } s^X = 1 \\ j = (i - a_{step}) \bmod K, & \text{if } s^X = 0 \end{cases}$$

where, a_step is a positive constant integer and can be either predetermined, e.g., a_step=1, or provided to the UE though higher layer signaling.

In another example, when the associated adaptive parameter X is configured as a fixed value, the value of X can be adapted according to $$\begin{cases} X = \min(a_{step} * X, X_{max}), & \text{if } s^X = 1 \\ X = \max\left(\dfrac{X_{ref}}{a_{step}}, X_{min}\right), & \text{if } s^X = 0 \end{cases}$$

where, $a_{step}$ is a positive integer, $X_{max}$ and $X_{min}$ are the maximum and minimum values of X. $a_{step}$, $X_{max}$, and $X_{min}$ can be either predetermined, e.g., $a_{step}$=2, or provide to the UE through higher layer signaling.

The adaptive parameter X can be one or any combination of the following.

In one example, X can be a PDCCH or search space(s) monitoring periodicity/duration. In another example, X can be a maximum value of cross-slot scheduling delay. In yet another example, X can be a number of UE antennas. In yet another example, X can be a number of antenna panels or a maximum/minimum number of antenna panels. In yet another example, X can be a maximum number of MIMO layers. In yet another example, X can be a bandwidth of an active BWP or the active BWP. In yet another example, X can be a DRX cycle, such as C-DRX cycle, DRX for idle/inactive mode paging, eDRX cycle. In yet another example, X can be an ON duration within one C-DRX. In yet another example, X can be an inactivity timer in C-DRX mode. In yet another example, X can be a CSI reporting periodicity. In yet another example, X can be a CSI-RS bandwidth for CSI or RRM measurements. In yet another example, X can be a CSI-RS or RRM measurement periodicity.

In yet another approach of dynamic adaptation request, the PoSS-AR can indicate effective/valid PDCCH candidates to monitor. PoSS-AR can indicate a subset of candidates for one or multiple PDCCH monitoring related parameter, Y. Y can be one or any combination of the following.

In one example, Y can be all configured CORESETs per associated BWP. In another example, Y can be all configured search space sets per associated BWP. In yet another example, Y can be all CCE aggregation levels to monitor PDCCH. In yet another example, Y can be all DCI format lengths to monitor. In yet another example, Y can be all DCI formats to monitor. In yet another example, Y can be all PDCCH candidates per CCE aggregation level to monitor.

The candidates for PDCCH monitoring related parameter Y can be divided into N groups, and a bitmap associated to PDCCH monitoring parameter Y, i.e., Bitmap_Y=$[c_0, \ldots, c_{N-1}]$ with size of N bits, can be carried in PoSS-AR. When the ith bit, $c_i$, is 1, the bit indicates that the PDCCH candidate in the ith group is monitored by associated UEs; otherwise when ith bit, $c_i$, is 0, a UE can skip monitoring associated PDCCH candidates in the ith group. For example, when Y is all DCI formats for a UE to monitor, the Y can be divided into two groups, wherein one group consists of all DCI formats for DL scheduling (PDSCH), and the other group consists of all DCI formats for UL scheduling (PUSCH).

In one approach for the configuration of PoSS-AR, PoSS-AR can be configured per BWP with configuration as defined in Embodiment I of this disclosure.

In another approach for the configuration of PoSS-AR, PoSS-AR can be configured per search space set(s). There can be 1-to-1 or a 1-to-N mapping between PoSS-AR and search space set(s). PoSS-AR can be FDMed or TDMed with associated search space set(s).

Figure 33:
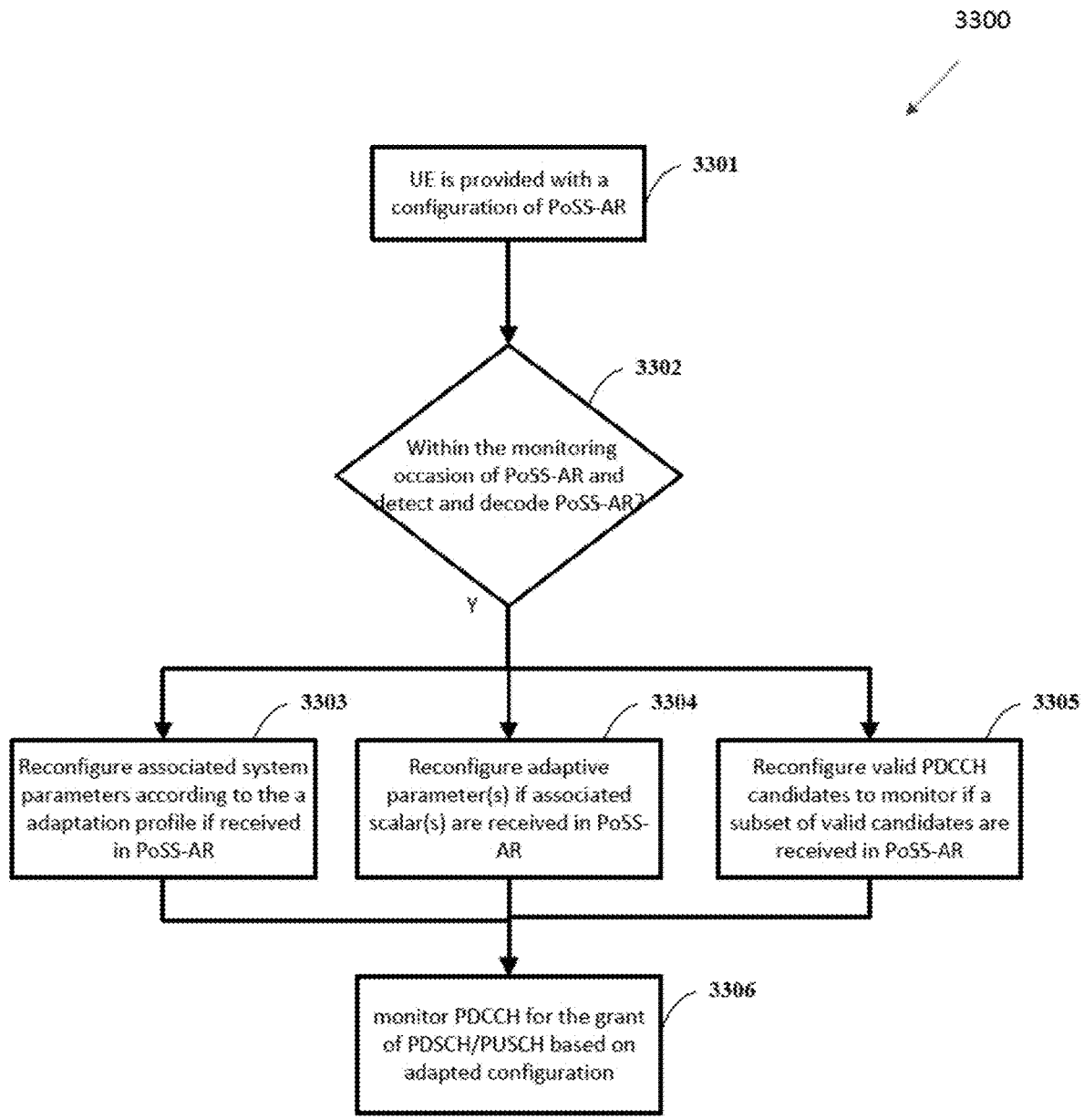
FIG. 33 illustrates an example UE procedure for receiving PoSS-AR during active period according to embodiments of the present disclosure.

FIG. 33 illustrates an example UE procedure 3300 for receiving PoSS-AR during active period according to embodiments of the present disclosure. The embodiment of the UE procedure 3300 illustrated in FIG. 33 is for illustration only. FIG. 33 does not limit the scope of this disclosure to any particular implementation.

As illustrated in FIG. 33, a UE is provided with a configuration of PoSS-AR reception at step 3301. The UE determines whether or not the UE is in the PoSS-AR monitoring occasion to detect the PoSS-AR at step 3302. When the UE is in the PoSS-AR and detects the PoSS-AR, the UE reconfigures the associated system parameters if an adaptation profile is indicated in received PoSS-AR at step 3303, or reconfigures adaptive parameters if associated scalar(s) are indicated in received PoSS-AR at step 3304, or reconfigures valid PDCCH candidates to monitor if a subset of valid candidates is indicated in PoSS-AR at step 3305. The UE then monitors PDCCH candidates for scheduling grants of PDSCH and PUSCH based on the adapted configuration.

In one embodiment, PoSS is used by a UE as an additional reference signal (RS) for channel tracking/measurement, resynchronization and RRM measurements in RRC_CONNECTED or RRC_INACTIVE/IDLE state.

For PoSS used as additional RS for channel tracking/measurement and resynchronization, the PoSS can carry timing information. For PoSS as additional RS for RRM measurements, the PoSS can carry at least cell ID or UE ID.

A UE can determine a resource for transmission of an associated PUSCH/PUCCH providing a CSI report indicated by PoSS through one of the following.

In one example, a resource for transmission of associated PUSCH/PUCCH is pre-known to the UE. The UE can transmit the associated PUSCH/PUCCH after detection of the PoSS. The association between PoSS and PUSCH/PUCCH providing a CSI report can either be fixed and predefined in the specification of system operation or be provided to the UE through higher layer signaling.

In another example, the indication of a resource for transmission of an associated PUSCH/PUCCH providing a CSI report can be carried in PoSS. In this case, the UE can determine whether or not to transmit the associated PUSCH/PUCCH for a CSI report after detecting and decoding the information in PoSS.

A PoSS-WU can be used by a UE as additional RS prior to C-DRX ON duration.

The PoSS-WU also be used to trigger a CSI report in a PUSCH/PUCCH from the UE at the beginning of an associated ON duration. A gap in terms of number of slots or OFDM symbols between the start of active period or ON duration and the start of associated PUSCH/PUCCH, $N\hat{~}gap\_CSI$, can be either predetermined in the specification of system operation, e.g. $N\hat{~}gap\_CSI=1$ slot, or be provided to the UE through higher layer signaling together with the configuration of PoSS.

Figure 34:
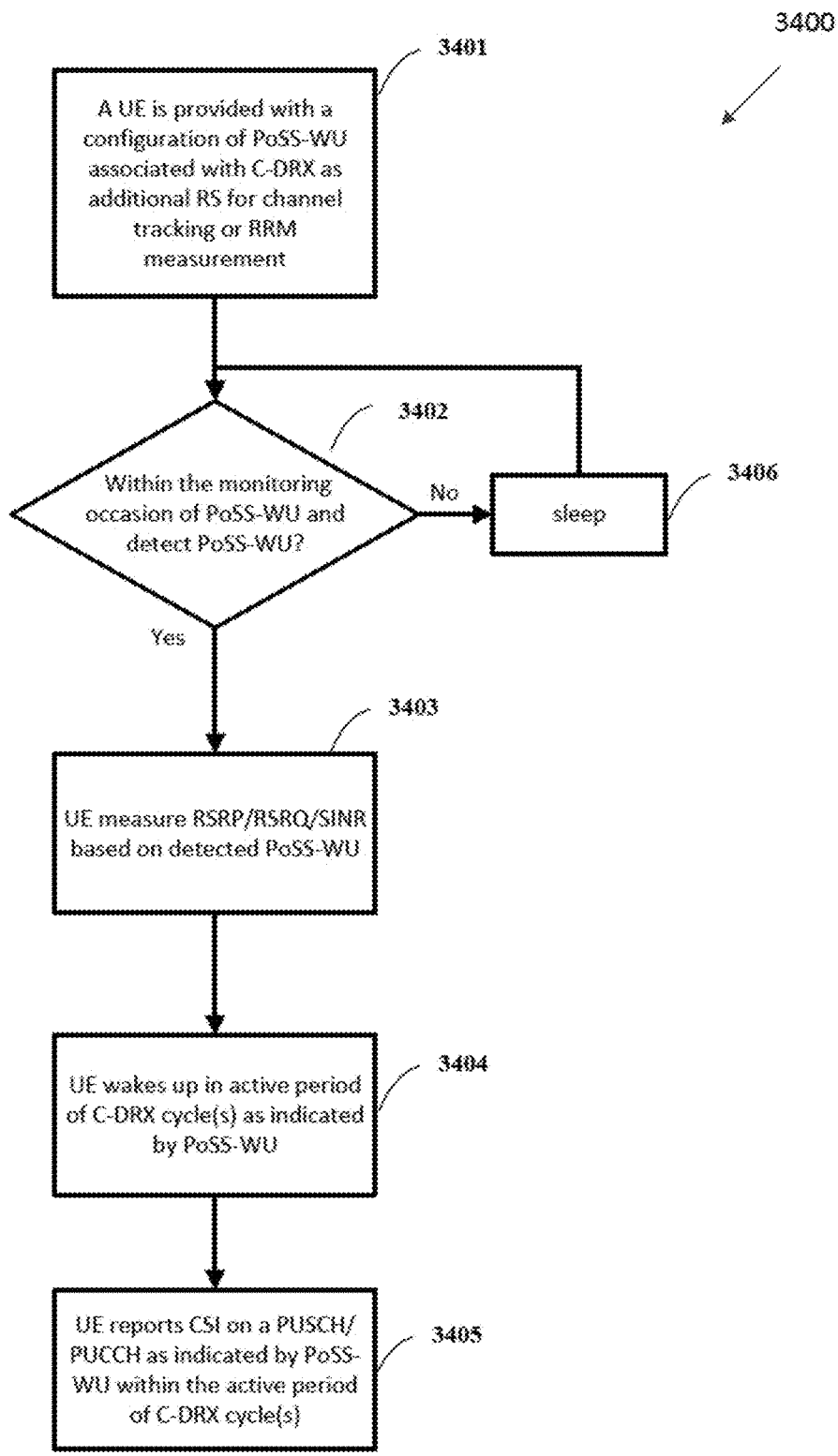
FIG. 34 illustrates an example UE procedure for receiving PoSS-WU as additional RS according to embodiments of the present disclosure.

FIG. 34 illustrates an example UE procedure 3400 for receiving PoSS-WU as additional RS according to embodiments of the present disclosure. The embodiment of the UE procedure 3400 illustrated in FIG. 34 is for illustration only. FIG. 34 does not limit the scope of this disclosure to any particular implementation.

As illustrated in FIG. 34, a UE is provided with a configuration of PoSS-WU associated with C-DRX as additional RS for channel tracking or RRM measurement outside of the active period of DRX cycle at step 3401. The UE determines whether or not the UE is within the PoSS-WU monitoring occasion to detect the PoSS-WU at step 3402. When the UE is not within the PoSS-WU monitoring occasion or does not detect the PoSS-WU, the UE goes into a sleep mode at step 3406; otherwise, the UE measures the RSRP/RSRQ/SINR based on detected PoSS-WU at step 3403. The UE wakes up for an active periof of C-DRX(s) as indicated by PoSS-WU at step 3404. The UE reports CSI on a PUSCH/PUCCH as indicated by PoSS-WU within the active period of C-DRX(s) at step 3405.

A PoSS can be used as additional RS for channel measurement and to trigger a CSI report for the UE-triggered BWP switching. A gap in terms of number of slots or OFDM symbols between the start of PoSS and the start of associated PUSCH/PUCCH for CSI report, $N\hat{~}gap\_CSI$, can be provided to the UE by a serving gNB through higher layer signaling. The UE can report CSI through a PUSCH/PUCCH in either a target BWP or in an active BWP. The value of $N\hat{~}gap\_CSI$ and the configuration of PUSCH/PUCCH resources for the CSI report can be either predetermined in the specification of system operation, e.g., $N\hat{~}gap\_CSI=1$ slot, or be provided to the UE through higher layer signaling, for example together with the configuration of PoSS.

Figure 35:
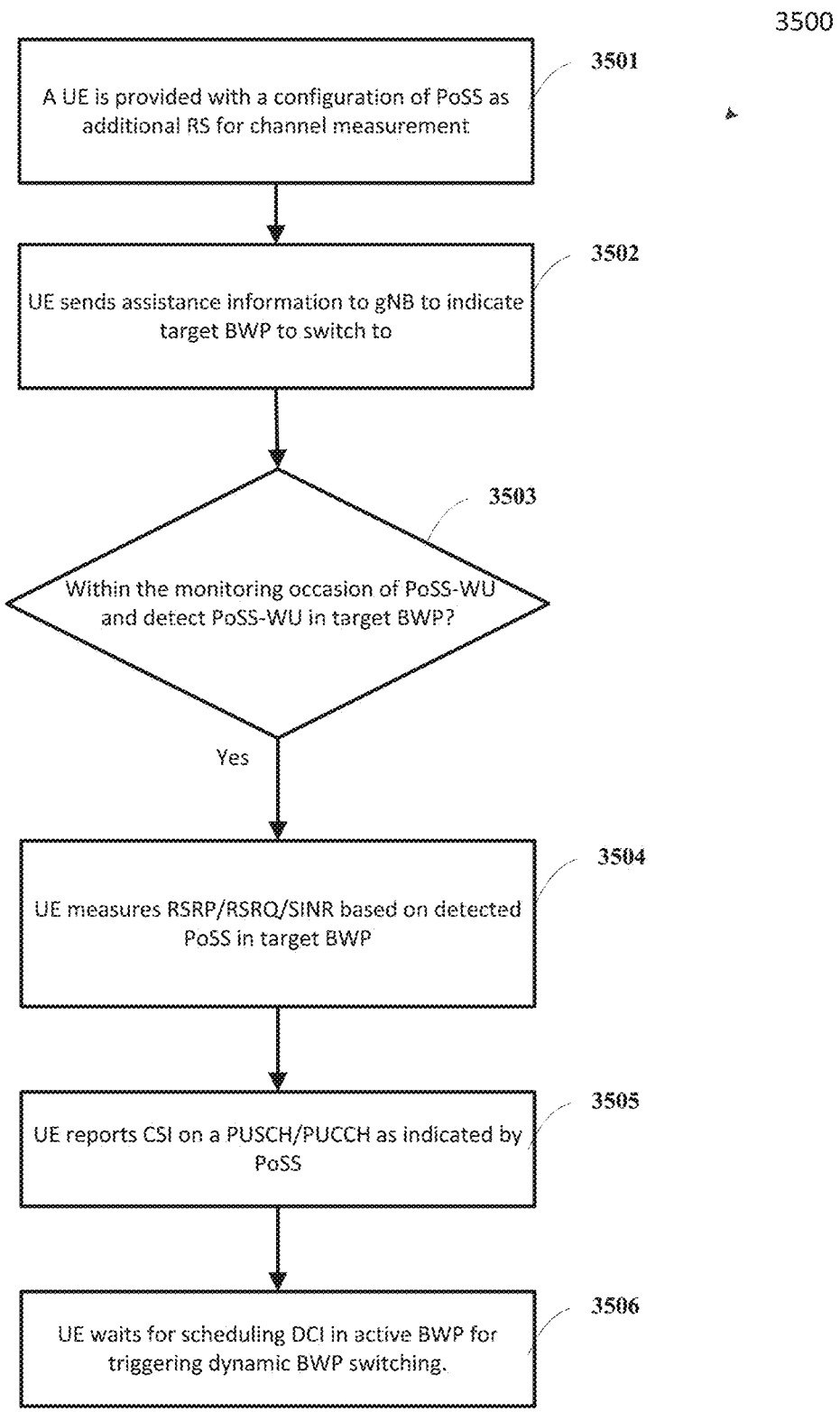
FIG. 35 illustrates an example UE procedure for receiving PoSS as additional RS according to embodiments of the present disclosure.

FIG. 35 illustrates an example UE procedure 3500 for receiving PoSS as additional RS according to embodiments of the present disclosure. The embodiment of the UE procedure 3500 illustrated in FIG. 35 is for illustration only. FIG. 35 does not limit the scope of this disclosure to any particular implementation.

As illustrated in FIG. 35, a UE is provided with a configuration for PoSS as additional RS for channel tracking and the UE is triggered BWP switching at step 3501. The UE transmits assistance information to a gNB to indicate a target BWP to switch to at step 3502. The UE determines whether the UE is within the PoSS monitoring occasion to detect the PoSS in target BWP at step 3503. When the UE detects the PoSS in target BWP, the UE measures RSRP/RSRQ/SINR based on the detected PoSS in the target BWP at step 3504. The UE reports CSI on an associated PUSCH/PUCCH as indicated by the PoSS at step 3505. The UE detects a scheduling DCI format in the active BWP that triggers the dynamic BWP switching at step 3506.

In one embodiment, a PoSS is used to indicate a UE assistance information request, i.e., PoSS-AIR. The PoSS-AIR can trigger a UE to report required assistance information in a PUSCH/PUCCH indicated by the PoSS-AIR.

The UE assistance information can be a preference of the UE for system configuration on various power consumption dimensions, such as for example, a PDCCH monitoring periodicity that is preferred by the UE.

A gap in terms of number of slots or OFDM symbols between the start of PoSS-AIR and the start of associated PUSCH/PUCCH for the UE assistance information report, $N\hat{~}gap\_AIR$, can be provided to the UE by a serving gNB through higher layer signaling. The value of $N\hat{~}gap\_AIR$ and a configuration of PUSCH/PUCCH resources for transmission of assistance information report can be either predetermined in the specification of system operation, e.g., $N\hat{~}gap\_AIR=1$ slot, or be provided to the UE through higher layer signaling together with the configuration of PoSS-AIR.

Figure 36:
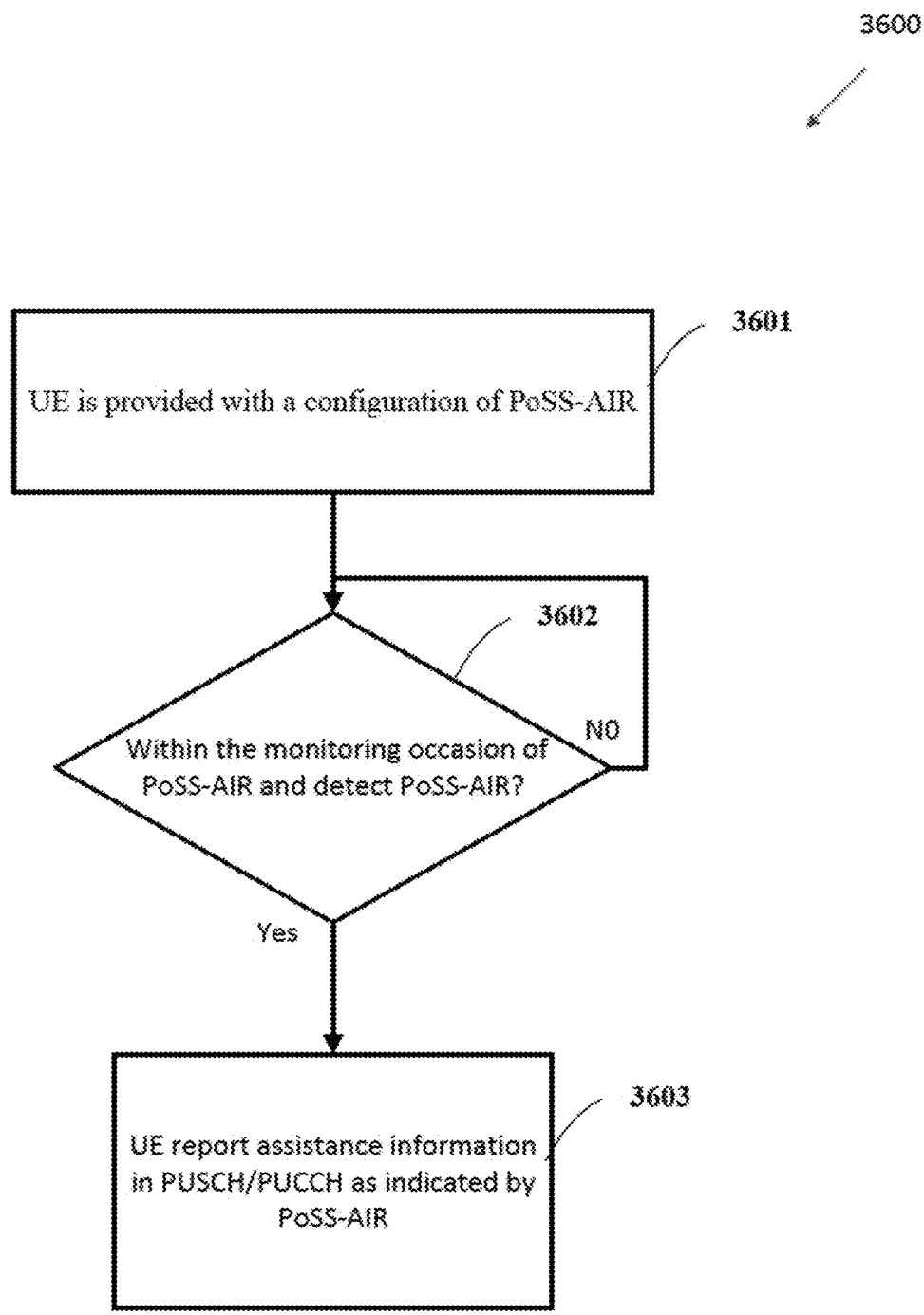
FIG. 36 illustrates an example UE procedure of receiving PoSS-AIR according to embodiments of the present disclosure.

FIG. 36 illustrates an example UE procedure 3600 of receiving PoSS-AIR according to embodiments of the present disclosure. The embodiment of the UE procedure 3600 illustrated in FIG. 36 is for illustration only. FIG. 36 does not limit the scope of this disclosure to any particular implementation.

As illustrated in FIG. 36, a UE is provided with a configuration for PoSS-AIR reception at step 3601. The UE determines whether the UE is within the PoSS-AIR monitoring occasion to detect the PoSS-AIR at step 3602. When the UE detects the PoSS-AIR, the UE reports assistance information in an associated PUSCH/PUCCH resource as indicated by PoSS-AIR at step 3603.

The present disclosure provides the sequence design of power saving signal (PoSS) for NR, including wake-up-signal and/or go-to-sleep signal, which contains the following design aspects and methods. In one example of design aspects: information carried by the PoSS; sequence generation method for PoSS; and sequence mapping pattern for PoSS.

In another example of design methods: PN-sequence based PoSS; M-sequence based PoSS; Gold-sequence based PoSS; and ZC-sequence based PoSS.

In another example of PoSS construct unit: single symbol based PoSS unit; and two symbols based PoSS unit The aspects and the combination of the aspects of the present disclosure can be utilized for formulating the sequence design principle for constructing and mapping the NR PoSS.

In one embodiment, the design principle of PoSS sequence can be common for all PoSS formats, wherein a PoSS format can be defined as the combination of the time-domain/frequency-domain resources for PoSS transmission, and/or numerology of PoSS, and/or the potentially supported QCL assumption, and/or the potentially supported transmission scheme. In another embodiment, the design principle of PoSS sequence can be exclusive for each supported PoSS format.

In one embodiment, the design principle of PoSS sequence can be common for carrier frequency ranges supported in NR. In another embodiment, the design principle of PoSS sequence can be exclusive for each carrier frequency range supported in NR.

In one embodiment, the design principle of PoSS sequence can be common for carrier frequency ranges supported in NR-U. In another embodiment, the design principle of PoSS sequence can be exclusive for each carrier frequency range supported in NR-U. The PoSS can also be utilized to indicate the success of LBT and start of COT in both uplink and downlink in NR-U.

The sequence generating PoSS is constructed based on the information the sequence carries. In one embodiment, the number of PoSS sequences equals to the number of pieces of information the number of PoSS carries, and there is a one-to-one association between the PoSS sequence and the piece of information. In another embodiment, the number of PoSS sequences can be smaller than the number of pieces of information the number of PoSS carries, and there is a one-to-many association between the PoSS sequence and the piece of information.

The information carried by the PoSS can contain at least one from the following parts and/or the combination of more than one part from the following parts, wherein the combination of multiple parts (if supported) can be either in a linear or non-linear way.

In one embodiment of a Cell ID or part of the cell ID, if part of the cell ID is carried by the PoSS, e.g., in order to reduce the total number of PoSS sequences, the part of the cell ID can be in a form of $\lfloor N\_ID\hat{}cell/c \rfloor$ and/or $N\_ID\hat{}cell$ mod b, where a and b are predefined constant integers. Denote the cell ID as $I\_ID\hat{}cell$, which can take value from at least one of the following (note that $I\_ID\hat{}cell$ can be in the form from different examples for different PoSS formats (e.g., including at least the associated BWP for PoSS) and/or carrier frequency ranges): $I\_ID\hat{}cell=N\_ID\hat{}cell$, where $0<I\_ID\hat{}cell \le 1007$, if all the whole cell ID is carried by the PoSS; $I\_ID\hat{}cell=[N\_ID\hat{}cell/a]$, where $0<I\_ID\hat{}cell \le [1008/a]-1$, if part of the cell ID is carried by the PoSS; and/or $I\_ID\hat{}cell=N\_ID\hat{}cell$ mod b, where $0<I\_ID\hat{}cell \le b-1$, if part of the cell ID is carried by the PoSS.

In one embodiment of a UE ID or part of the UE ID, if part of the UE ID is carried by the PoSS, e.g., in order to reduce the total number of PoSS sequences, the part of the UE ID can be in a grouped form, e.g., $[N\_ID\hat{}UE/c]$ and/or $N\_ID\hat{}UE$ mod d, where c and d are predefined constant integers. Denote the UE ID as $I\_ID\hat{}UE$, which can take value from at least one of the following (note that $I\_ID\hat{}UE$ can be in the form from different examples for different PoSS formats (e.g., including at least the associated BWP for PoSS) and/or carrier frequency ranges, and $I\_ID\hat{}UE$ can be in the same form from one example but with different value on $N\_\{ID,max\}\hat{}UE$ for different PoSS formats (e.g., including at least the associated BWP for PoSS) and/or carrier frequency ranges).

In one example, a UE ID can be or be derived from the International Mobile Subscriber Identity (IMSI), or SAE Temporary Mobile Subscriber Identity (s-TMSI).

In another example, a UE ID can be derived from Radio Network Temporary Identifier (RNTI), e.g., $N\_ID\hat{}UE=C-RNTI$, if UE is in RRC_CONNECTED state.

More specifically, the UE ID carried in PoSS, denoted as $I\_ID\hat{}UE$, can be determined as: $I\_ID\hat{}UE=N\_ID\hat{}UE$, where $0 \le I\_ID\hat{}UE \le N\_\{ID,max\}\hat{}UE-1$, if all the whole UE ID is carried by the PoSS; $I\_ID\hat{}UE=\lfloor N\_ID\hat{}UE/c \rfloor$, where $0 \le I\_ID\hat{}UE \le \lfloor N\_\{ID,max\}\hat{}UE/\rfloor -1$, if part of the UE ID is carried by the PoSS; and/or $I\_ID\hat{}UE=N\_ID\hat{}AUE$ mod d, where $0 \le LID\hat{}UE \le d-1$, if part of the UE ID is carried by the PoSS. e.g., d=1024.

In one embodiment of timing related information, the timing related information may contain at least one of the following sub-parts: SS/PBCH block index (or part of the SS/PBCH block index, e.g., some LSBs or MSBs of the SS/PBCH block index), and/or system frame number (SFN) (or part of the SFN, e.g., some LSBs or MSBs or particular bit(s) of the SFN), and/or half frame indicator, and/or slot index, and/or symbol index. Denote the timing related information as $I\_t$, which can be in the form of at least one of the following (note that $I\_t$ can be in the form from different examples for different PoSS formats (e.g., including at least the associated BWP for PoSS) and/or carrier frequency ranges).

In one example, $I\_t=LSSB$, if only the SS/PBCH block index is carried by PoSS.

In one example, $I\_t=I\_SSB$ mod $a\_t$, where $a\_t$ is a predefined constant integer such that $I\_t$ is the LSBs of the SS/PBCH block index, if only part of the SS/PBCH block index is carried by PoSS.

In one example, $I\_t=\lfloor I\_SSB/b\_t \rfloor$, where $b\_t$ is a predefined constant integer such that $I\_t$ is the MSBs of the SS/PBCH block index, if only part of the SS/PBCH block index is carried by PoSS.

In one example, $I\_t=LSFN$, if only the SFN is carried by PoSS.

In one example, $I\_t=I\_SFN$ mod $c\_t$, where $c\_t$ is a predefined constant integer such that $I\_t$ is the LSBs of the SFN, if only part of the SFN is carried by PoSS.

In one example, $I\_t=\lfloor I\_SFN/d\_t \rfloor$, where $d\_t$ is a predefined constant integer such that $I\_t$ is the MSBs of the SFN, if only part of the SFN is carried by PoSS.

In one example, $I\_t=I\_SSB'+e\_t*I\_HF$, where $e\_t$ is a predefined constant integer (e.g., $e\_t=4$ or 64), and $I\_SSB'$ could be any form from Example 1-3, if both the SS/PBCH block index and half frame indicator are carried by PoSS.

In one example, $I\_t=I\_SSB'+f\_t*I\_HF+g\_t*I\_SFN'$, where $e\_t$ and $f\_t$ are predefined constant integers (e.g., $e\_t=64$, $f\_t=128$), and $I\_SSB'$ could be any form from the aforementioned examples, and $I\_SFN'$ could be any form from Example 4-6, if the SS/PBCH block index, half frame indicator, and SFN are carried by PoSS.

In one example, $I\_t=I\_slot$, if only the slot index is carried by PoSS.

In one example, $I\_t=I\_sym$, if only the symbol index is carried by PoSS.

In one example, I_t=I_sym+g_t*I_slot, where g_t is a predefined constant integer (e.g., g_t=14), if both the slot index and symbol index are carried by PoSS.

In one example, I_t=I_sym+h_t*I_slot+i_t*I_SFN', where h_t and i_t are predefined constant integers (e.g., h_t=14, i_t=10*2^µ), and I_SFN' could be any form from the aforementioned examples, if SFN, slot index, and symbol index are carried by PoSS.

In one embodiment of system information update indicator and/or updated system information. Denote the information related to the system information update indicator and/or updated system information as I_s, where 0≤I_s≤N_s−1, and N_s is the total number of hypotheses related to the system information update indicator and/or updated system information (e.g., N_s=2 for indicating the system information update, and N_s=2 or 4 or 8 for indicating the system information).

In one embodiment of PoSS format related information. PoSS may carry some exclusive information for an associated PoSS format. Denote the information related to PoSS format as I_f, which can be in the form of at least one of the following (note that I_f can be in the form from different examples for different PoSS formats and/or carrier frequency ranges).

In one example, for a PF-specific PoSS format, I_f can refer to the index of PF within a DRX cycle. For one instance, I_f=I_SFN mod T, where T is the associated DRX cycle and I_SFN is the SFN index.

In one example, for a PF-specific PoSS format, I_f can refer to the index of the bitmap of all POs within the associated PF within a DRX cycle.

In one example, for a PO-specific PoSS format, I_f can refer to the index of the PO within the associated PF within a DRX cycle. For one instance, I_f=I_PO mod N_PO, where I_PO is the slot index for the associated PO within the frame, and N_PO is the total number of configured PO(s) within the associated PF. For another instance, I_f=I_PO, where I_PO is the slot index for the associated PO within the frame.

In one example, for a search-space-specific PoSS format, I_f can refer to a CORESET index within the associated BWP. For one instance, I_f=p, where p the CORESET index.

In one example, for a search-space-specific PoSS format, I_f can refer to the index of search space set within a DRX cycle. For one instance, I_f=s mod N_{p,s}, where s is the search-space index, and N_{p,s} is the number of search spaces monitored by the PoSS, wherein N_{p,s}≤S−1, and S is the number of PDCCH monitoring occasions configured for a given CORESET with S≤10. For another instance, I_f=s, where s is the search-space index. For yet another instance, I_f=s_PoSS, where s_PoSS is the relative search space index within the associated CORESET, with s_PoSS≤N_{p,s}−1, and N_{p,s} is the number of search spaces monitored by the PoSS.

In one example, for a search-space-specific PoSS format, I_f can refer to the combination of the index of search space set within a DRX cycle. For one instance, I_f=(p+1)(s+1), where s is the search-space set index and p is the CORESET index. For another instance, I_f=S*(p+1)+(s+1), where s is the search space set index and p is the CORESET index.

In one embodiment of tracking area related information, PoSS may carry some exclusive information for an associated tracking area (TA). For example, the tracking area code (TAC), which is the unique code that each operator assigns to each of their TAs. Denote the information related to TA ID as I_ID^TA, which can be in the form of at least one of the following (Note that LTA can be in the form from different examples for different PoSS formats (e.g., including at least the associated BWP for PoSS) and/or carrier frequency ranges): I_ID^TA=TAC, if all the TAC is carried by the PoSS; I_ID^TA=⌊TAC/a⌋, if part of the TAC is carried by the PoSS; and/or I_ID^TA=TAC mod b, if part of the TAC is carried by the PoSS.

In one embodiment of dynamic reconfiguration/adaptation related information, PoSS may carry some unknown information to UE for dynamic reconfiguration/adaptation purpose. Denote the information related to dynamic reconfiguration/adaptation as I_conf, which can be in the form of at least one of the following (I_conf can be in the form from different examples for different PoSS functionalities).

In one example, I_conf equals to I_AR or I_sleep or I_PS as defined in other embodiment of this invention.

In another example, I_conf can refer to the combination of scalars associated to the parameters configured for dynamic DRX reconfiguration. In one sub-example, I_conf=s_DRX+a*s_nB, where a is predefined constant integer while s_DRX and s_nB are the scalar factors of DRX cycle and s_nB is configured for idle/connected mode paging. e.g., a=2. In another sub-example, I_conf=s_sDRX+b*s_lDRX, where b is a predefined constant integer while s_sDRX, and s_lDRX are the scalar factors of short DRX cycle and long DRX cycle configured for connected mode DRX, e.g., b=2. In yet another sub-example, I_conf=s_eDRX+c*s_PTW where c is predefined constant integer while s_eDRX and s_PTW are the scalar factors of eDRX cycle and PTW length configured eDRX in idle/inactive mode paging.

In yet another example, I_conf=s_DRX, which is binary scalar on DRX cycle.

For another example, I_conf can refer to the combination of scalars associated to the parameters configured for PDCCH monitoring. In one sub-example, I_conf=s_k_{p, s} where s_k_{p, s} is the scalar factor of search space monitoring periodicity. In another sub-example, I_conf=s_format+a*s_AL+b*s_candidate where a and b are predefined constant integers while s_format, s_AL, and s_candidate are the scalars associated with number of DCI formats, number of CCE aggregation levels, and number of PDCCH candidates such as a=2, b=2.

For yet another example, I_conf can refer to the combination of scalars associated to parameters configured for RRM monitoring and reporting. In one sub-example, I_conf=s^RRM_p+a*s^RRM_RB, where a is predefined constant while s^RRM_p and s^RRM_RB are scalars associated with CQI reporting periodicity and RRM measurement bandwidth, such as a=2.

For yet another example, I_conf indicates the reconfiguration for a parameter X. More specifically, the reconfiguration for X is determined by TABLE 4 and TABLE 5 where a_step is a constant value, such as a_step=2.

TABLE 4

| Reconfiguration of X | |
|---|---|
| I_conf | X |
| 0 | Stay same, X = X |
| 1 | Increase, X = a_step*X |
| 2 | Decreases, X = X/a_step |

TABLE 5

Reconfiguration of X

| I_conf | X |
| --- | --- |
| 0 | Stay same, X = X |
| 1 | Reset to default, X = X_default |
| 2 | Increase, X = a_step*X |
| 3 | Decreases, X = X/a_step |

In one sub-example, X is a PDCCH monitoring periodicity, such as X=1 slot or 2 symbols. In another sub-example, X is a COT after successful LBT. In yet another sub-example, X is a DRX cycle associated with CDRX or inactive/idle mode paging. In yet another sub-example, X is an onDuration or inActivity duration associated with CDRX.

For yet another example, I_conf indicates the reconfiguration for a parameter X that is selected from a list of candidates, $L\_x=\{c\_0, c\_1, c\_2, \ldots c\_{N-1}\}$. The reconfiguration on X to candidate $c\_i$ is conveyed by I_conf where I_conf=i. In one sub-example, X is the COT associated to LBT. In another sub-example, X is an LBT priority class or associated MCOT.

In one embodiment, PoSS may carry some unknown information to a UE for PDCCH monitoring. Denote the information related to PDCCH monitoring targets as I_tgt.

For one example, I_tgt is a bitmap information. For another example, I_tgt indicates valid time interval(s) inside the active time or ON duration time, T_active. A UE only needs to decode PDCCH candidates in PDCCH monitoring occasions within the valid time interval. More specifically, $I\_tgt=[b0, b1, \ldots b\_i \ldots, b\_{N-1}]$, where $b\_i=0$ indicates that the time interval $[i*T\_active/N, (i+1)*T\_active/N]$ is not valid and the UE can skip monitoring the PDCCH occasions inside this time interval, while $b\_i=1$ indicates that the target time interval is valid and the UE performs PDCCH monitoring during this period.

In one embodiment of DL/UL direction configuration related information, PoSS may carry some unknown information to a UE for DL/UL direction indication.

In one embodiment of power consumption profile/UE adaptation configuration table related information, PoSS may carry some unknown information to a UE for a power consumption profile or UE adaptation configuration indication.

In one embodiment of sleep type or power saving state related information, PoSS may carry some unknown information to a UE for sleep type or power saving state related indication.

In one embodiment, a general ID can be defined to refer to at least one of or the combination of cell ID/part of cell ID and UE ID/part of UE ID and TA ID/part of TA ID. Denote the ID as I_ID that can be in the form of at least one of the following (I_ID can be in the form from different examples for different PoSS formats and, for example, include at least the associated BWP for PoSS, and/or carrier frequency ranges), and $0 \leq I\_ID \leq N\_\{ID,max\}$, where N_{ID,max} is a maximum number of IDs: I_ID=a_ID*I_ID^cell+I_ID^UE if both cell ID/part of cell ID and UE ID/part of UE ID are carried by the PoSS, and a_ID is a predefined constant. For example, a_ID equals to the maximum value that I_ID^UE can have; I_ID=b_ID*I_ID^UE+I_ID^cell if both cell ID/part of cell ID and UE ID/part of UE ID are carried by the PoSS, and b_ID is a predefined constant, e.g., b_ID equals to the maximum value that I_ID^cell can have; I_ID=c_ID*I_ID^cell, if only cell ID/part of cell ID is carried by the PoSS sequence, and c_ID is a predefined constant, e.g., c_ID equals to 1, or 2; I_ID=d_ID*I_ID^UE, if only UE ID/part of UE ID is carried by the PoSS sequence, and d_ID is a predefined constant, e.g., d_ID equals to 1, or 2; I_ID=e_ID*I_ID^TA, if only TA ID/part of TA ID is carried by the PoSS sequences, and e_ID is a predefined constant, e.g., e_ID equals to 1, or 2; I_ID=f_ID*(I_ID^cell+1)(I_ID^UE+1)+g_ID*I_ID^cell+h_ID*I_ID^UE+I_ID, where f_ID, g_ID, h_ID, and I_ID are predefined constants, if both cell ID/part of cell ID and UE ID/part of UE ID are carried by the PoSS; and/or I_ID=j_ID*(I_ID^TA+1)(I_ID^UE+1)+k_ID*I_ID^TA+I_ID*I_ID^UE+m_ID, where j_ID, k_ID, I_ID, and m_ID are predefined constants, if both TA ID/part of TA ID and UE ID/part of UE ID are carried by the PoSS.

The sequence constructing the PoSS may carry all the information or at least part of the information in PoSS. If the sequence carries part of the information in PoSS, the remaining information in PoSS can be carried by at least one of the sequence mapping pattern of the sequence of PoSS, and/or the changing of the RE location for PoSS.

At least one of the following sequence generation embodiments can be supported to generate the PoSS.

In one embodiment, PN-sequence based generation method. In this method, a PN-sequence (e.g., LTE and NR PN-sequence with length-31) can be utilized to generate the PoSS, wherein the information in PoSS can be carried by the initial condition of the PN-sequence (e.g., the initial condition of one of the M-sequences generating the PN-sequence).

In one embodiment, M-sequence based generation method. In this method, at least one M-sequence can be utilized as the base sequence to generate the PoSS, wherein there can be at least one further cover code applied to the M-sequence (e.g., to carry more information, and/or for randomization purpose). In one embodiment, all of the information or part of the information in PoSS can be carried by the cyclic shift of the M-sequence generating PoSS. In another embodiment, all of the information or part of the information in PoSS can be carried by the initial condition of the M-sequence generating PoSS. In yet another embodiment, all of the information or part of the information in PoSS can be carried by both the cyclic shift and the initial condition of the M-sequence generating PoSS.

In one embodiment, Gold-sequence based generation method. In this method, at least one Gold-sequence can be utilized as the base sequence to generate the PoSS, wherein there can be at least one further cover code applied to the Gold-sequence (e.g., to carry more information, and/or for randomization purpose). In one embodiment, all of the information or part of the information in PoSS can be carried by the cyclic shift of at least one of the two M-sequences constructing the Gold-sequence. In another embodiment, all of the information or part of the information in PoSS can be carried by the initial condition of at least one of the two M-sequences constructing the Gold-sequence. In yet another embodiment, all of the information or part of the information in PoSS can be carried by both the cyclic shift and the initial condition of at least one of the two M-sequences constructing the Gold-sequence.

In one embodiment, ZC-sequence based generation method. In this method, at least one ZC-sequence can be utilized as the base sequence to generate the PoSS, wherein there can be at least one further cover code applied to the ZC-sequence (e.g., to carry more information, and/or for randomization purpose). In one embodiment, all of the information or part of the information in PoSS can be carried by the root of the ZC-sequence generating PoSS. In another embodiment, all of the information or part of the information in PoSS can be carried by the cyclic shift of the ZC-sequence generating PoSS. In yet another embodiment, all of the information or part of the information in PoSS can be carried by the phase shift of the ZC-sequence generating PoSS. In yet another embodiment, all of the information or part of the information in PoSS can be carried by the combination of at least two of the root, cyclic shift, and phase shift of the ZC-sequence generating PoSS.

In some embodiments, the sequence mapping pattern of the PoSS is fixed and predefined in the specification. In one example, the sequence is mapped in a frequency-domain first and time-domain second pattern to all the available REs for a PoSS, wherein the PoSS sequence is generated and mapped for all the symbols of PoSS.

In another example, the sequence is mapped in a time-domain first and frequency-domain second pattern to all the available REs for a PoSS, wherein the PoSS sequence is generated and mapped for all the symbols of PoSS.

In yet another example, the sequence is mapped in a lowest-to-highest RE order to all the available REs within each symbol for a PoSS, wherein the PoSS sequence is generated and mapped per symbol.

In yet another example, the sequence is mapped in a highest-to-lowest RE order to all the available REs within each symbol for a PoSS, wherein the PoSS sequence is generated and mapped per symbol.

In yet another example, the PoSS sequence is mapped discontinuously in frequency domain. When mapping in RB level, the PoSS sequence is mapped into every $M>=1$ contiguous RBs with a gap of $N\hat{}gap>=0$ RBs between two adjacent configured M RB resources. More specifically, the PoSS sequence is mapped into M contiguous RBs with indices [x, x+1, . . . , x+M−1], where mod(x, $N\hat{}gap+M)=N\hat{}offset$, where $N\hat{}offset$ is the offset in terms of number of RBs, $N\hat{}offset \leq N\hat{}gap$. When mapping in subcarrier level, the PoSS sequence is mapped into every $M>=1$ contiguous subcarriers with a gap of $N\hat{}gap>=0$ subcarriers between two adjacent configured M subcarrier resources. More specifically, the PoSS sequence is mapped into M contiguous subcarriers with indices [x, x+1, . . . , x+M−1], where mod(x, $N\hat{}gap+M)=N\hat{}offset$, where $N\hat{}offset$ is the offset in terms of number of subcarriers, $N\hat{}offset<N\hat{}gap$.

In one embodiment, the gap between two adjacent assigned frequency resources can be scaled with association to the configured bandwidth. In one sub-example, $N\hat{}gap=N\hat{}gap\_0+s\hat{}BW*M$, where $N\hat{}gap\_0$ is the gap for reference bandwidth, e.g., $N\hat{}gap\_0=0$, $s\hat{}BW>=1$ is the scalar of configured bandwidth for PoSS sequence relative to the reference bandwidth. The reference bandwidth can be bandwidth of default active DL BWP or bandwidth of initial access DL BWP.

In another embodiment, $N\hat{}gap$, M, and $N\hat{}offset$ can be predefined constants. In one sub-example, $N\hat{}gap=2$ subcarriers, $N\hat{}offset=0$, M=1 subcarrier, where PoSS sequence occupies all the even subcarriers within associated bandwidth. In another sub-example, $N\hat{}gap=2$ subcarriers, $N\hat{}offset=1$, M=1 subcarrier, where PoSS sequence occupies all the odd subcarriers within associated bandwidth. In yet another sub-example, $N\hat{}gap=4$ subcarriers, M=1 subcarrier, where PoSS sequence occupies one out of 4 subcarriers within configured bandwidth.

In another embodiment, the sequence mapping pattern of the PoSS can carry some information. In one example, the mapping order of the PoSS sequence within a symbol (e.g., lowest-to-highest RE or highest-to-lowest RE) can be utilized to indicate some information carried by the PoSS.

In another example, the mapping order of the PoSS in frequency and time domain (e.g., frequency-domain first and time-domain second or time-domain first and frequency-domain second) can be utilized to indicate some information carried by the PoSS.

In yet another example, if PoSS is multiplexing with other signal/channel within a symbol, different RE location within different symbols (e.g., a predefined or cell-specific RE shift) can be utilized to indicate some information carried by the PoSS.

In yet another example, if PoSS sequence is mapped discontinuously in frequency domain, the gap, i.e., $N\hat{}gap$, and offset, i.e., $N\hat{}offset$ can carry in carry information contained in PoSS. In one sub-example, $N\hat{}offset$ can carry UE ID related information, refer $I\_ID\hat{}UE$ in Part 2 of Aspect 1. PoSS regarding different UE groups or UEs can be interlaced frequency division multiplexed (IFDMed).

In one embodiment, PoSS can be constructed from a PN-sequence, wherein the PN-sequence is generated from a QPSK modulated sequence constructed by XOR of two M-sequences with length $2\hat{}31-1$, e.g., the PN-sequence s(n) can be generated according to $s(n)=(1-2*((s\_A(2n+Nc)+s\_B(2n+Nc)) \mod 2))/\sqrt{2}+j*(1-2*((s\_A(2n+Nc+1)+s\_B(2n+Nc+1)) \mod 2))/\sqrt{2}$ where the generator of s_A can be $g\_A(x)=x\hat{}31+x\hat{}3+1$, the generator of s_B can be $g\_B(x)=x\hat{}31+x\hat{}3+x+2+x+1$, the initial condition of s_A is fixed as c_A=1, the initial condition of s_B, c_B, can carry the information in PoSS, and Nc is an output shift offset (e.g., Nc=1600).

In one embodiment, PoSS sequence can carry the ID only, wherein ID can refer to I_ID, i.e., at least one of or the combination of cell ID/part of cell ID and UE ID/part of UE ID and TA ID/part of TA ID. In one example, for this embodiment, the initial condition c_B can be determined according to $c\_B=b\_PN*(I\_ID+1)+a\_PN$, where a_PN and b_PN are predefined constant integers.

In another embodiment, PoSS sequence can carry the combination of the ID and timing related information, wherein ID can refer to I_ID, i.e., at least one of or the combination of cell ID/part of cell ID and UE ID/part of UE ID and TA ID/part of TA ID, and the timing related information can refer to I_t.

In one example, for this embodiment, the initial condition c_B can be determined according to $c\_B=b\_PN*(I\_ID+1)*(I\_t+1)+c\_PN*(I\_ID+1)+d\_PN*(I\_t+1)+a\_PN$, where a_PN, b_PN, c_PN, and d_PN are predefined constant integers.

In yet another embodiment, PoSS sequence can carry the combination of the ID and PoSS format related information, wherein ID can refer to I_ID, i.e., at least one of or the combination of cell ID/part of cell ID and UE ID/part of UE ID and TA ID/part of TA ID, and the PoSS format related information can refer to I_f.

In one example, for this embodiment, the initial condition c_B can be determined according to $c\_B=b\_PN*(I\_ID+1)*(I\_f+1)+c\_PN*(I\_ID+1)+d\_PN*(I\_f+1)+a\_PN$, where a_PN, b_PN, c_PN, and d_PN are predefined constant integers.

In yet another embodiment, PoSS sequence can carry the combination of the ID and system information/system information update indicator, wherein ID can refer to I_ID, i.e., at least one of or the combination of cell ID/part of cell ID and UE ID/part of UE ID and TA ID/part of TA ID, and the system information/system information update indicator can refer to I_s.

In one example, for this embodiment, the initial condition $c\_B$ can be determined according to $c\_B=b\_PN*(I\_ID+1)*(I\_s+1)+c\_PN*(I\_ID+1)+d\_PN*(I\_s+1)+a\_PN$, where $a\_PN$, $b\_PN$, $c\_PN$, and $d\_PN$ are predefined constant integers.

In yet another embodiment, PoSS sequence can carry the combination of the ID, timing related information, and PoSS format related information, wherein ID can refer to $I\_ID$, i.e., at least one of or the combination of cell ID/part of cell ID and UE ID/part of UE ID and TA ID/part of TA ID, and the timing related information can refer to $I\_t$, and the PoSS format related information can refer to $I\_f$.

In one example, for this embodiment, the initial condition $c\_B$ can be determined according to $c\_B=b\_PN*(e\_PN*I\_ID+I\_f+1)*(I\_t+1)+c\_PN*(e\_PN*I\_ID+I\_f+1)+d\_PN*(I\_t+1)+a\_PN$, where $a\_PN$, $b\_PN$, $c\_PN$, $d\_PN$, and $e\_PN$ are predefined constant integers.

In another example, for this embodiment, the initial condition $c\_B$ can be determined according to $c\_B=b\_PN*(I\_ID+1)*(e\_PN*I\_t+I\_f+1)+c\_PN*(I\_ID+1)+d\_PN*(e\_PN*I\_t+I\_f+1)+a\_PN$, where $a\_PN$, $b\_PN$, $c\_PN$, $d\_PN$, and $e\_PN$ are predefined constant integers.

In yet another example, for this embodiment, the initial condition $c\_B$ can be determined according to $c\_B=b\_PN*(I\_ID+1)*(e\_PN*I\_f+I\_t+1)+c\_PN*(I\_ID+1)+d\_PN*(e\_PN*I\_f+I\_t+1)+a\_PN$, where $a\_PN$, $b\_PN$, $c\_PN$, $d\_PN$, and $e\_PN$ are predefined constant integers.

In yet another embodiment, PoSS sequence can carry the combination of the ID, timing related information, and power consumption profile/UE adaptation configuration table related information, wherein ID can refer to $I\_ID$, i.e., at least one of or the combination of cell ID/part of cell ID and UE ID/part of UE ID and TA ID/part of TA ID, and the timing related information can refer to $I\_t$, and the power consumption profile/UE adaptation configuration table related information can refer to $I\_profile$.

In one example, for this embodiment, the initial condition $c\_B$ can be determined according to $c\_B=b\_PN*(e\_PN*I\_ID+I\_profile+1)*(I\_t+1)+c\_PN*(e\_PN*I\_ID+I\_profile+1)+d\_PN*(I\_t+1)+a\_PN$, where $a\_PN$, $b\_PN$, $c\_PN$, $d\_PN$, and $e\_PN$ are predefined constant integers.

In another example, for this embodiment, the initial condition $c\_B$ can be determined according to $c\_B=b\_PN*(I\_ID+1)*(e\_PN*I\_t+I\_profile+1)+c\_PN*(I\_ID+1)+d\_PN*(e\_PN*I\_t+I\_profile+1)+a\_PN$, where $a\_PN$, $b\_PN$, $c\_PN$, $d\_PN$, and $e\_PN$ are predefined constant integers.

In yet another example, for this embodiment, the initial condition $c\_B$ can be determined according to $c\_B=b\_PN*(I\_ID+1)*(e\_PN*I\_profile+I\_t+1)+c\_PN*(LID+1)+d\_PN*(e\_PN*I\_profile+I\_t+1)+a\_PN$, where $a\_PN$, $b\_PN$, $c\_PN$, $d\_PN$, and $e\_PN$ are predefined constant integers.

In yet another embodiment, PoSS sequence can carry the combination of the ID, timing related information, and sleep type or power saving state related information, wherein ID can refer to $I\_ID$, i.e., at least one of or the combination of cell ID/part of cell ID and UE ID/part of UE ID and TA ID/part of TA ID, and the timing related information can refer to $I\_t$, and the sleep type or power saving state related information can refer to $I\_sleep$.

In one example, for this embodiment, the initial condition $c\_B$ can be determined according to $c\_B=b\_PN*(e\_PN*I\_ID+I\_sleep+1)*(I\_t+1)+c\_PN*(e\_PN*I\_ID+I\_sleep+1)+d\_PN*(I\_t+1)+a\_PN$, where $a\_PN$, $b\_PN$, $c\_PN$, $d\_PN$, and $e\_PN$ are predefined constant integers. In another example, for this embodiment, the initial condition $c\_B$ can be determined according to $c\_B=b\_PN*(I\_ID+1)*(e\_PN*I\_t+I\_sleep+1)+c\_PN*(I\_ID+1)+d\_PN*(e\_PN*I\_t+I\_sleep+1)+a\_PN$, where $a\_PN$, $b\_PN$, $c\_PN$, $d\_PN$, and $e\_PN$ are predefined constant integers. In yet another example, for this embodiment, the initial condition $c\_B$ can be determined according to $c\_B=b\_PN*(I\_ID+1)*(e\_PN*I\_sleep+I\_t+1)+c\_PN*(I\_ID+1)+d\_PN*(e\_PN*I\_sleep+I\_t+1)+a\_PN$, where $a\_PN$, $b\_PN$, $c\_PN$, $d\_PN$, and $e\_PN$ are predefined constant integers.

In yet another embodiment, PoSS sequence can carry the combination of the ID, timing related information, and system information/system information update indicator, wherein ID can refer to $I\_ID$, i.e., at least one of or the combination of cell ID/part of cell ID and UE ID/part of UE ID and TA ID/part of TA ID, and the timing related information can refer to $I\_t$, and system information/system information update indicator can refer to $I\_s$.

In one example, for this embodiment, the initial condition $c\_B$ can be determined according to $c\_B=b\_PN*(e\_PN*I\_ID+I\_s+1)*(I\_t+1)+c\_PN*(e\_PN*I\_ID+I\_s+1)+d\_PN*(I\_t+1)+a\_PN$, where $a\_PN$, $b\_PN$, $c\_PN$, $d\_PN$, and $e\_PN$ are predefined constant integers.

In another example, for this embodiment, the initial condition $c\_B$ can be determined according to $c\_B=b\_PN*(I\_ID+1)*(e\_PN*I\_t+I\_s+1)+c\_PN*(I\_ID+1)+d\_PN*(e\_PN*I\_t+I\_s+1)+a\_PN$, where $a\_PN$, $b\_PN$, $c\_PN$, $d\_PN$, and $e\_PN$ are predefined constant integers.

In yet another example, for this embodiment, the initial condition $c\_B$ can be determined according to $c\_B=b\_PN*(LID+1)*(e\_PN*I\_s+Lt+1)+c\_PN*(LID+1)+d\_PN*(e\_PN*I\_s+I\_t+1)+a\_PN$, where $a\_PN$, $b\_PN$, $c\_PN$, $d\_PN$, and $e\_PN$ are predefined constant integers.

In yet another embodiment, PoSS sequence can carry some unknown information for dynamic reconfiguration on PDCCH monitoring and DRX. In one example, for this embodiment, the initial condition $c\_B$ can be determined according to $c\_B=b\_PN*(I\_conf+1)+a\_PN$, where $a\_PN$ and $b\_PN$ are predefined constant integers.

In yet another embodiment, PoSS sequence can carry the combination of the ID and dynamic reconfiguration information, wherein ID can refer to $I\_ID$, i.e., at least one of or the combination of cell ID/part of cell ID and UE ID/part of UE ID and TA ID/part of TA ID, and the dynamic reconfiguration information can refer to $I\_conf$. In one example, for this embodiment, the initial condition $c\_B$ can be determined according to $c\_B=b\_PN*(I\_ID+1)*(I\_conf+1)+c\_PN*(I\_ID+1)+d\_PN*(I\_conf+1)+a\_PN$, where $a\_PN$, $b\_PN$, $c\_PN$, and $d\_PN$ are predefined constant integers.

In yet another embodiment, PoSS sequence can carry the combination of the ID and DL/UL direction indication, wherein ID can refer to $I\_ID$, i.e., at least one of or the combination of cell ID/part of cell ID and UE ID/part of UE ID and TA ID/part of TA ID, and the DL/UL direction indication can refer to $I\_SF$. In one example, for this embodiment, the initial condition $c\_B$ can be determined according to $c\_B=b\_PN*(I\_ID+1)*(I\_SF+1)+c\_PN*(I\_ID+1)+d\_PN*(I\_SF+1)+a\_PN$, where $a\_PN$, $b\_PN$, $c\_PN$, and $d\_PN$ are predefined constant integers.

In one embodiment, PoSS can be constructed from a QPSK or BPSK modulated M-sequence, e.g., the base sequence $s(n)$ can be generated according to $s(n)=(1-2*s\_M((2n+m\_M) \bmod L\_M))/\sqrt{2}+j*(1-2*s\_M(2n+1+m\_M) \bmod L\_M))/\sqrt{2}$, if QPSK modulated, or $s(n)=1-2*s\_M((n+m\_M) \bmod L\_M)$, if BPSK modulated, where $L\_M$ is the length of M-sequence, and $m\_M$ is the cyclic shift applied to the M-sequence. Denote the generator of M-sequence as $g\_M(x)$, which can be determined based on the sequence length $L\_M$, and with a predefined initial condition.

In one embodiment, regarding the length of M-sequence, $L\_M$, $L\_M$ can depend on the PoSS format. For example, for cell-specific, PF-specific, and PO-specific PoSS formats, a common M-sequence length is used; and for search-space-specific PoSS format, another M-sequence length is used. In another embodiment, regarding the length of M-sequence, $L\_M$, $L\_M$ can depend on the PoSS BW, if PoSS sequence is constructed and mapped per symbol. In yet another embodiment, regarding the length of M-sequence, $L\_M$, $L\_M$ can depend on the total number of REs for PoSS, if PoSS sequence is constructed and mapped across all symbol(s) for PoSS. In yet another embodiment, regarding the length of M-sequence, $L\_M$, $L\_M$ can be common for all the supported PoSS formats, PoSS BW, and REs.

In one embodiment, regarding the generator of M-sequence, $g\_M(x)$, and the cyclic shift of M-sequence, $m\_M$, only the generator of M-sequence carries information in PoSS, and cyclic shift can be predefined (e.g., $m\_M=0$ for each generator, i.e., no cyclic shift).

In another embodiment, regarding the generator of M-sequence, $g\_M(x)$, and the cyclic shift of M-sequence, $m\_M$, only the cyclic shift of M-sequence carries information in PoSS, and generator can be predefined.

In yet another embodiment, regarding the generator of M-sequence, $g\_M(x)$, and the cyclic shift of M-sequence, $m\_M$, both the cyclic shift of M-sequence generator can carry part of the information in PoSS.

In one embodiment, PoSS sequence can carry the ID only, wherein ID can refer to LID, i.e., at least one of or the combination of cell ID/part of cell ID and UE ID/part of UE ID and TA ID/part of TA ID. In one example, for this embodiment, there can be a single generator of M-sequence and $m\_M=b\_M*I\_ID+a\_M$, where $a\_M$ and $b\_M$ are predefined constant integers. In another example, for this embodiment, there can be $n\_M$ generators of M-sequences, wherein each generator $g\_\{M,i\}(x)$ with index i corresponds to $I\_ID \bmod n\_M=i$, and $m\_M=b\_M*\lfloor I\_ID/n\_M\rfloor+a\_M$, where $a\_M$ and $b\_M$ are predefined constant integers for each generator.

In another embodiment, PoSS sequence can carry the combination of the ID and timing related information, wherein ID can refer to $I\_ID$, i.e., at least one of or the combination of cell ID/part of cell ID and UE ID/part of UE ID and TA ID/part of TA ID, and the timing related information can refer to $I\_t$. In one example, for this embodiment, there can be a single generator of M-sequence and $m\_M=b\_M*(I\_ID+1)*(I\_t+1)+c\_M*(I\_ID+1)+d\_M*(I\_t+1)+a\_M$, where $a\_M$, $b\_M$, $c\_M$, and $d\_M$ are predefined constant integers. In another example, for this embodiment, there can be $n\_M$ generators of M-sequences, wherein each generator $g\_\{M,i\}(x)$ with index i corresponds to $I\_ID \bmod n\_M=i$, and $m\_M=b\_M*(\lfloor I\_ID/n\_M\rfloor+1)*(I\_t+1)+c\_M*(\lfloor I\_ID/n\_M\rfloor+1)+d\_M*(I\_t+1)+a\_M$, where $a\_M$, $b\_M$, $c\_M$, and $d\_M$ are predefined constant integers for each generator. In yet another example, for this embodiment, there can be $N\_t$ generators of M-sequences, wherein each generator $g\_\{M,i\}(x)$ with index i corresponds to $Lt \bmod N\_t=i$, and $m\_M=b\_M*I\_ID+a\_M$, where $a\_M$ and $b\_M$ are predefined constant integers for each generator.

In yet another embodiment, PoSS sequence can carry the combination of the ID and PoSS format related information, wherein ID can refer to $I\_ID$, i.e., at least one of or the combination of cell ID/part of cell ID and UE ID/part of UE ID and TA ID/part of TA ID, and the PoSS format related information can refer to $I\_f$. In one example, for this embodiment, there can be a single generator of M-sequence and $m\_M=b\_M*(I\_ID+1)*(I\_f+1)+c\_M*(I\_ID+1)+d\_M*(I\_f+1)+a\_M$, where $a\_M$, $b\_M$, $c\_M$, and $d\_M$ are predefined constant integers. In another example, for this embodiment, there can be $n\_M$ generators of M-sequences, wherein each generator $g\_\{M,i\}(x)$ with index i corresponds to $I\_ID \bmod n\_M=i$, and $m\_M=b\_M*(\lfloor I\_ID/n\_M\rfloor+1)*(I\_f+1)+c\_M*(\lfloor I\_ID/n\_M\rfloor+1)+d\_M*(I\_f+1)+a\_M$, where $a\_M$, $b\_M$, $c\_M$, and $d\_M$ are predefined constant integers for each generator. In yet another example, for this embodiment, there can be $N\_f$ generators of M-sequences, wherein each generator $g\_\{M,i\}(x)$ with index i corresponds to $I\_f \bmod N\_f=i$, and $m\_M=b\_M*LID+a\_M$, where $a\_M$ and $b\_M$ are predefined constant integers for each generator.

In yet another embodiment, PoSS sequence can carry the combination of the ID and system information/system information update indicator, wherein ID can refer to $I\_ID$, i.e., at least one of or the combination of cell ID/part of cell ID and UE ID/part of UE ID and TA ID/part of TA ID, and the system information/system information update indicator can refer to $I\_s$. In one example, for this embodiment, there can be a single generator of M-sequence and $m\_M=b\_M*(I\_ID+1)*(I\_s+1)+c\_M*(I\_ID+1)+d\_M*(I\_s+1)+a\_M$, where $a\_M$, $b\_M$, $c\_M$, and $d\_M$ are predefined constant integers. In another example, for this embodiment, there can be $n\_M$ generators of M-sequences, wherein each generator $g\_\{M,i\}(x)$ with index i corresponds to $I\_ID \bmod n\_M=i$, and $m\_M=b\_M*(\lfloor I\_ID/n\_M\rfloor+1)*(I\_s+1)+c\_M*(\lfloor I\_ID/n\_M\rfloor+1)+d\_M*(I\_s+1)+a\_M$, where $a\_M$, $b\_M$, $c\_M$, and $d\_M$ are predefined constant integers for each generator. In yet another example, for this embodiment, there can be $N\_s$ generators of M-sequences, wherein each generator $g\_\{M,i\}(x)$ with index i corresponds to $I\_s \bmod N\_s=i$, and $m\_M=b\_M*I\_ID+a\_M$, where $a\_M$ and $b\_M$ are predefined constant integers for each generator.

In yet another embodiment, PoSS sequence can carry the combination of the ID and power consumption profile/UE adaptation configuration table related information, wherein ID can refer to $I\_ID$, i.e., at least one of or the combination of cell ID/part of cell ID and UE ID/part of UE ID and TA ID/part of TA ID, and the power consumption profile/UE adaptation configuration table related information can refer to $I\_profile$. In one example, for this embodiment, there can be a single generator of M-sequence and $m\_M=b\_M*(I\_ID+1)*(I\_profile+1)+c\_M*(I\_ID+1)+d\_M*(I\_profile+1)+a\_M$, where $a\_M$, $b\_M$, $c\_M$, and $d\_M$ are predefined constant integers. In another example, for this embodiment, there can be $n\_M$ generators of M-sequences, wherein each generator $g\_\{M,i\}(x)$ with index i corresponds to $I\_ID \bmod n\_M=i$, and $m\_M=b\_M*(\lfloor I\_ID/n\_M\rfloor+1)*(I\_profile+1)+c\_M*(\lfloor I\_ID/n\_M\rfloor+1)+d\_M*(I\_profile+1)+a\_M$, where $a\_M$, $b\_M$, $c\_M$, and $d\_M$ are predefined constant integers for each generator. In yet another example, for this embodiment, there can be $N\_s$ generators of M-sequences, wherein each generator $g\_\{M,i\}(x)$ with index i corresponds to $I\_profile \bmod N\_s=i$, and $m\_M=b\_M*I\_ID+a\_M$, where $a\_M$ and $b\_M$ are predefined constant integers for each generator.

In yet another embodiment, PoSS sequence can carry the combination of the ID and sleep type or power saving state related information, wherein ID can refer to $I\_ID$, i.e., at least one of or the combination of cell ID/part of cell ID and UE ID/part of UE ID and TA ID/part of TA ID, and the sleep type or power saving state related information related information can refer to $I\_sleep$. In one example, for this embodiment, there can be a single generator of M-sequence and $m\_M=b\_M*(I\_ID+1)*(I\_sleep+1)+c\_M*(I\_ID+1)+d\_M*(I\_sleep+1)+a\_M$, where $a\_M$, $b\_M$, $c\_M$, and $d\_M$ are predefined constant integers. In another example, for this embodiment, there can be $n\_M$ generators of M-sequences, wherein each generator $g\_\{M,i\}(x)$ with index i corresponds to I_ID mod n_M=i, and $m\_M=b\_M*(\lfloor I\_ID/n\_M\rfloor+1)*(I\_sleep+1)+c\_M*(\lfloor I\_ID/n\_M\rfloor+1)+d\_M*(I\_sleep+1)+a\_M$, where a_M, b_M, c_M, and d_M are predefined constant integers for each generator. In yet another example, for this embodiment, there can be N_s generators of M-sequences, wherein each generator $g\_\{M,i\}(x)$ with index i corresponds to I_sleep mod N_s=i, and $m\_M=b\_M*I\_ID+a\_M$, where a_M and b_M are predefined constant integers for each generator In yet another embodiment, PoSS sequence can carry some unknown information for dynamic reconfiguration on PDCCH monitoring and DRX. In one example, for this embodiment, there can be a single generator of M-sequence and $m\_M=b\_M*I\_conf+a\_M$, where a_M and b_M are predefined constant integers. In another example, for this embodiment, there can be N_conf generators of M-sequences, wherein each generator $g\_\{M,i\}(x)$ with index i corresponds to I_conf mod N_conf=i, and N_conf is the size of I_conf.

In yet another embodiment, PoSS sequence can carry the combination of the ID and reconfiguration scalars, wherein ID can refer to I_ID, i.e., at least one of or the combination of cell ID/part of cell ID and UE ID/part of UE ID and TA ID/part of TA ID, and the dynamic reconfiguration information can refer to I_conf. In one example, for this embodiment, there can be n_M generators of M-sequences, wherein each generator $g\_\{M,i\}(x)$ with index i corresponds to I_ID mod n_M=i, and $m\_M=c\_M*\lfloor I\_ID/d\_M\rfloor+b\_M*I\_conf+a\_M$, where a_M, b_M, c_M, and d_M are predefined constant integers for each generator. In yet another example, for this embodiment, there can be N_conf generators of M-sequences, wherein each generator $g\_\{M,i\}(x)$ with index i corresponds to I_conf mod N_conf=i, and $m\_M=b\_M*I\_ID+a\_M$, where a_M and b_M are predefined constant integers for each generator.

In yet another embodiment, PoSS sequence can carry the combination of the ID and DL/UL direction indication, wherein ID can refer to I_ID, i.e., at least one of or the combination of cell ID/part of cell ID and UE ID/part of UE ID and TA ID/part of TA ID, and the DL/UL direction indication can refer to I_SF. In one example, for this embodiment, there can be n_M generators of M-sequences, wherein each generator $g\_\{M,i\}(x)$ with index i corresponds to I_ID mod n_M=i, and $m\_M=c\_M*\lfloor I\_ID/d\_M\rfloor+b\_M*I\_SF+a\_M$, where a_M, b_M, c_M, and d_M are predefined constant integers for each generator. In yet another example, for this embodiment, there can be N_SF generators of M-sequences, wherein each generator $g\_\{M,i\}(x)$ with index i corresponds to I_SF mod N_SF=i, and $m\_M=b\_M*I\_ID+a\_M$, where a_M and b_M are predefined constant integers for each generator.

In some embodiments, PoSS can be constructed from interleaved sequences s_1 (m) and s_2 (m), where both s_1 (m) and s_2 (m) are generated from M-sequence(s), e.g., the base sequence for PoSS, s(n), can be generated according to $s(2*m)=s\_1(m)$, and $s(2*m+1)=s\_2(m)$, where $s\_1(m)=1-2*s\_M1((m+m\_M1) \bmod L\_M)$, $s\_2(m)=1-2*s\_M2((m+m\_M2) \bmod L\_M)$, and s_M1(m) and s_M2(m) are M-sequences with length L_M, and cyclic shifts m_M1 and m_M2 are applied to s_M1(m) and s_M2(m), respectively.

In one embodiment, the generators for s_M1(m) and s_M2(m) can be the same, i.e., using the same base M-sequences in generating PoSS but with different cyclic shifts, m_M1 and m_M2. In another embodiment, the generators for s_M1(m) and s_M2(m) can be different.

In one embodiment, regarding the length of M-sequences, L_M, L_M can depend on the PoSS format. For example, for cell-specific, PF-specific, and PO-specific PoSS formats, a common M-sequence length is used; and for search-space-specific PoSS format, another M-sequence length is used.

In another embodiment, regarding the length of M-sequences, L_M, L_M can depend on the PoSS BW, if PoSS sequence is constructed and mapped per symbol.

In yet another embodiment, regarding the length of M-sequences, L_M, L_M can depend on the total number of REs for PoSS, if PoSS sequence is constructed and mapped across all symbol(s) for PoSS.

In yet another embodiment, regarding the length of M-sequences, L_M, L_M can be common for all the supported PoSS formats, PoSS BW, and REs.

In one embodiment, PoSS sequence can carry the ID only, wherein ID can refer to I_ID, i.e., at least one of or the combination of cell ID/part of cell ID and UE ID/part of UE ID and TA ID/part of TA ID. In one example, for this embodiment, both of the cyclic shifts can be utilized to indicate part of the ID, and $m\_M1=b\_M*(I\_ID \bmod c\_M)+a\_M$, $m\_M2=d\_M*\lfloor I\_ID/c\_M\rfloor+e\_M$, where a_M, b_M, c_M, d_M, and e_M are predefined constant integers, e.g., a_M=0, b_M=1, c_M=L_M.

In another embodiment, PoSS sequence can carry the combination of the ID and timing related information, wherein ID can refer to I_ID, i.e., at least one of or the combination of cell ID/part of cell ID and UE ID/part of UE ID and TA ID/part of TA ID, and the timing related information can refer to I_t. In one example, both of the cyclic shifts can be utilized to indicate the ID and timing related information, and $m\_M1=b\_M*(\lfloor I\_ID/e\_M\rfloor+1)*(I\_t+1)+c\_M*(\lfloor I\_ID/e\_M\rfloor+1)+d\_M*(I\_t+1)+a\_M$, $m\_M2=f\_M*(I\_ID \bmod e\_M)+h\_M$, where a_M, b_M, c_M, d_M, e_M, f_M, and h_M are predefined constant integers.

In yet another embodiment, PoSS sequence can carry the combination of the ID and PoSS format related information, wherein ID can refer to I_ID, i.e., at least one of or the combination of cell ID/part of cell ID and UE ID/part of UE ID and TA ID/part of TA ID, and the PoSS format related information can refer to LE In one example, for this embodiment, both of the cyclic shifts can be utilized to indicate the ID and PoSS format related information, and $m\_M1=b\_M*(\lfloor I\_ID/e\_M\rfloor+1)*(I\_f+1)+c\_M*(\lfloor I\_ID/e\_M\rfloor+1)+d\_M*(I\_f+1)+a\_M$, $m\_M2=f\_M*(I\_ID \bmod e\_M)+h\_M$, where a_M, b_M, c_M, d_M, e_M, f_M, and h_M are predefined constant integers. In another example, for this embodiment, both of the cyclic shifts can be utilized to indicate the ID and PoSS format related information, and $m\_M1=c\_M*\lfloor I\_ID/e\_M\rfloor+b\_M*I\_f+a\_M$, $m\_M2=d\_M*(I\_ID \bmod e\_M)+f\_M$, where a_M, b_M, c_M, d_M, e_M, and f_M are predefined constant integers. In yet another example, for this embodiment, both of the cyclic shifts can be utilized to indicate the ID and PoSS format related information, and $m\_M1=c\_M*(I\_ID \bmod e\_M)+b\_M*I\_f+a\_M$, $m\_M2=d\_M*\lfloor I\_ID/e\_M\rfloor+f\_M$, where a_M, b_M, c_M, d_M, e_M, and f_M are predefined constant integers.

In yet another embodiment, PoSS sequence can carry the combination of the ID and power consumption profile/UE adaptation configuration table related information, wherein ID can refer to I_ID, i.e., at least one of or the combination of cell ID/part of cell ID and UE ID/part of UE ID and TA ID/part of TA ID, and the power consumption profile/UE adaptation configuration table related information can refer to I_profile. In one example, for this embodiment, both of the cyclic shifts can be utilized to indicate the ID and power consumption profile/UE adaptation configuration table related information, and $m\_M1=b\_M*(\lfloor I\_ID/e\_M \rfloor+1)*(I\_profile+1)+c\_M*(\lfloor I\_ID/e\_M \rfloor+1)+d\_M*(I\_profile+1)+a\_M$, $m\_M2=f\_M*(I\_ID \bmod e\_M)+h\_M$, where $a\_M$, $b\_M$, $c\_M$, $d\_M$, $e\_M$, $f\_M$, and $h\_M$ are predefined constant integers. In another example, for this embodiment, both of the cyclic shifts can be utilized to indicate the ID and power consumption profile/UE adaptation configuration table related information, and $m\_M1=c\_M*\lfloor I\_ID/e\_M \rfloor+b\_M*I\_profile+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In yet another example, for this embodiment, both of the cyclic shifts can be utilized to indicate the ID and power consumption profile/UE adaptation configuration table related information, and $m\_M1=c\_M*(I\_ID \bmod e\_M)+b\_M*I\_profile+a\_M$, $m\_M2=d\_M*\lfloor I\_ID/e\_M \rfloor+f\_M$, where $a\_M$, $b\_M$, $c\_M$, $d\_M$, $e\_M$, and $f\_M$ are predefined constant integers.

In yet another embodiment, PoSS sequence can carry the combination of the ID and sleep type or power saving state related information, wherein ID can refer to I_ID, i.e., at least one of or the combination of cell ID/part of cell ID and UE ID/part of UE ID and TA ID/part of TA ID, and the sleep type or power saving state related information can refer to I_sleep. In one example, for this embodiment, both of the cyclic shifts can be utilized to indicate the ID and sleep type or power saving state related information, and $m\_M1=b\_M*(\lfloor I\_ID/e\_M \rfloor+1)*(I\_sleep+1)+c\_M*(\lfloor I\_ID/e\_M \rfloor+1)+d\_M*(I\_sleep+1)+a\_M$, $m\_M2=f\_M*(I\_ID \bmod e\_M)+h\_M$, where $a\_M$, $b\_M$, $c\_M$, $d\_M$, $e\_M$, $f\_M$, and $h\_M$ are predefined constant integers. In another example, for this embodiment, both of the cyclic shifts can be utilized to indicate the ID and sleep type or power saving state related information, and $m\_M1=c\_M*\lfloor I\_ID/e\_M \rfloor+b\_M*I\_sleep+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In yet another example, for this embodiment, both of the cyclic shifts can be utilized to indicate the ID and sleep type or power saving state related information, and $m\_M1=c\_M*(I\_ID \bmod e\_M)+b\_M*I\_profile+a\_M$, $m\_M2=d\_M*\lfloor I\_ID/e\_M \rfloor+f\_M$, where $a\_M$, $b\_M$, $c\_M$, $d\_M$, $e\_M$, and $f\_M$ are predefined constant integers.

In yet another embodiment, PoSS sequence can carry the combination of the ID and system information/system information update indicator, wherein ID can refer to I_ID, i.e., at least one of or the combination of cell ID/part of cell ID and UE ID/part of UE ID and TA ID/part of TA ID, and the system information/system information update indicator can refer to I_s. In one example, for this embodiment, both of the cyclic shifts can be utilized to indicate the ID and system information related information, and $m\_M1=b\_M*(\lfloor I\_ID/e\_M \rfloor+1)*(I\_s+1)+c\_M*(\lfloor I\_ID/e\_M \rfloor+1)+d\_M*(I\_s+1)+a\_M$, $m\_M2=f\_M*(I\_ID \bmod e\_M)+h\_M$, where $a\_M$, $b\_M$, $c\_M$, $d\_M$, $e\_M$, $f\_M$, and $h\_M$ are predefined constant integers. In another example, for this embodiment, both of the cyclic shifts can be utilized to indicate the ID and system information related information, and $m\_M1=c\_M*\lfloor I\_ID/e\_M \rfloor+b\_M*I\_s+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In yet another example, for this embodiment, both of the cyclic shifts can be utilized to indicate the ID and system information related information, and $m\_M1=c\_M*(I\_ID \bmod e\_M)+b\_M*I\_s+a\_M$, $m\_M2=d\_M*\lfloor I\_ID/e\_M \rfloor+f\_M$, where $a\_M$, $b\_M$, $c\_M$, $d\_M$, $e\_M$, and $f\_M$ are predefined constant integers.

In yet another embodiment, PoSS sequence can carry some unknown information for dynamic reconfiguration on PDCCH monitoring and DRX. In one example, for this embodiment, only one of the cyclic shift is utilized to carry the reconfiguration scalar, $m\_M1=b\_M*I\_conf+a\_M$, $m\_M2=c\_M$, where $a\_M$, $b\_M$, $c\_M$ are predefined constant integers. In another example, for this embodiment, both of the cyclic shifts can be utilized to carry the reconfiguration scalar, and $m\_M1=b\_G*(I\_conf \bmod c\_G)+a\_G$, $m\_M2=d\_G*\lfloor I\_conf/c\_G \rfloor+e\_G$, where $a\_G$, $b\_G$, $c\_G$, $d\_G$, and $e\_G$ are predefined constant integers.

In yet another embodiment, PoSS sequence can carry the combination of the ID and dynamic reconfiguration information, wherein ID can refer to I_ID, i.e., at least one of or the combination of cell ID/part of cell ID and UE ID/part of UE ID and TA ID/part of TA ID, and the dynamic reconfiguration information can refer to I_conf. In one example, for this embodiment, both of the cyclic shifts can be utilized to indicate the ID and reconfiguration scalar, and $m\_M1=c\_M*\lfloor I\_ID/e\_M \rfloor+b\_M*I\_conf+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In another example, for this embodiment, both of the cyclic shifts can be utilized to indicate the ID and reconfiguration scalar, and $m\_M1=c\_M*(I\_ID \bmod e\_M)+b\_M*I\_conf+a\_M$, $m\_M2=d\_M*\lfloor I\_ID/e\_M \rfloor+f\_M$, where $a\_M$, $b\_M$, $c\_M$, $d\_M$, $e\_M$, and $f\_M$ are predefined constant integers.

In yet another embodiment, PoSS sequence can carry the combination of the ID and DL/UL direction indication, wherein ID can refer to I_ID, i.e., at least one of or the combination of cell ID/part of cell ID and UE ID/part of UE ID and TA ID/part of TA ID, and the DL/UL direction indication can refer to LSF. In one example, for this embodiment, both of the cyclic shifts can be utilized to indicate the ID and DL/UL direction related information, and $m\_M1=c\_M*\lfloor I\_ID/e\_M \rfloor+b\_M*I\_SF+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In another example, for this embodiment, both of the cyclic shifts can be utilized to indicate the ID and DL/UL direction related information, and $m\_M1=c\_M*(I\_ID \bmod e\_M)+b\_M*I\_SF+a\_M$, $m\_M2=d\_M*\lfloor I\_ID/e\_M \rfloor+f\_M$, where $a\_M$, $b\_M$, $c\_M$, $d\_M$, $e\_M$, and $f\_M$ are predefined constant integers.

In some embodiments, PoSS can be constructed from a QPSK or BPSK modulated Gold-sequence, e.g., the base sequence $s(n)$ can be generated according to $s(n)=(1-2*((s\_M1((2n+m\_M1) \bmod L\_G)+s\_M2((2n+m-M2) \bmod L\_G)) \bmod 2))/\sqrt{2}+j*(1-2*((s\_M1((2n+1+m\_M1) \bmod L-G)+s-M2((2n+1+m\_M2) \bmod L\_G)) \bmod 2))/\sqrt{2}$, if QPSK modulated, or $s(n)=1-2*((s\_M1((n+m\_M1) \bmod L\_G)+s\_M2((n+m\_M2) \bmod L\_G)) \bmod 2)$, if BPSK modulated, where $L\_G$ is the length of Gold-sequence, and $m\_M1$ and $m\_M2$ are the cyclic shifts applied to the each of the two M-sequences constructing the Gold-sequence, respectively. Denote the generator of the two M-sequences constructing the Gold-sequence as $g\_M1(x)$ and $g\_M2(x)$, respectively, which can be determined based on the sequence length $L\_G$, and with a predefined initial condition for each of the M-sequence.

In one embodiment, regarding the length of Gold-sequence $L\_G$, $L\_G$ can depend on the PoSS format. For example, for cell-specific, PF-specific, and PO-specific PoSS formats, a common Gold-sequence length is used; and for search-space-specific PoSS format, another Gold-sequence length is used.

In another embodiment, regarding the length of Gold-sequence $L\_G$, $L\_G$ can depend on the PoSS BW, if PoSS sequence is constructed and mapped per symbol.

In yet another embodiment, regarding the length of Gold-sequence L_G, L_G can depend on the total number of REs for PoSS, if PoSS sequence is constructed and mapped across all symbol(s) for PoSS.

In yet another embodiment, regarding the length of Gold-sequence L_G, L_G can be common for all the supported PoSS formats, PoSS BW, and REs.

In one embodiment, regarding the cyclic shifts of Gold-sequence m_M1 and m_M2, only of the cyclic shifts is utilized to carry information in PoSS (e.g., m_M1) and the other cyclic shift is fixed (e.g., m_M2=0, i.e., no cyclic shift).

In another embodiment, regarding the cyclic shifts of Gold-sequence m_M 1 and m_M2, both the cyclic shifts of Gold-sequence can carry part of the information in PoSS.

In one embodiment, PoSS sequence can carry the ID only, wherein ID can refer to I_ID, i.e., at least one of or the combination of cell ID/part of cell ID and UE ID/part of UE ID and TA ID/part of TA ID. In one example, for this embodiment, one of the cyclic shifts can be utilized to indicate the ID, and m_M1=b_G*I_ID+a_G, where a_G and b_G are predefined constant integers, e.g., b_G=⌊L_G/N_{ID,max}⌋. In another example, for this embodiment, both of the cyclic shifts can be utilized to indicate part of the ID, and m_M1=b_G*(I_ID mod c_G)+a_G, m_M2=d_G*⌊I_ID/c_G⌋+e_G, where a_G, b_G, c_G, d_G, and e_G are predefined constant integers, e.g., a_G=0, b_G=1, c_G=L_G.

In another embodiment, PoSS sequence can carry the combination of the ID and timing related information, wherein ID can refer to I_ID, i.e., at least one of or the combination of cell ID/part of cell ID and UE ID/part of UE ID and TA ID/part of TA ID, and the timing related information can refer to I_t. In one example, for this embodiment, one of the cyclic shifts can be utilized to indicate the ID and timing related information, and m_M1=b_G*(I_ID+1)*(I_t+1)+c_G*(I_ID+1)+d_G*(I_t+1)+a_G, where a_G, b_G, c_G, and d_G are predefined constant integers. In another example, for this embodiment, both of the cyclic shifts can be utilized to indicate the ID and timing related information, and m_M1=b_G*(⌊I_ID/e_G⌋+1)*(I_t+1)+c_G*(⌊I_ID/e_G⌋+1)+d_G*(I_t+1)+a_G, m_M2=f_G*(I_ID mod e_G)+h_G, where a_G, b_G, c_G, d_G, e_G, f_G, and h_G are predefined constant integers.

In yet another embodiment, PoSS sequence can carry the combination of the ID and PoSS format related information, wherein ID can refer to I_ID, i.e., at least one of or the combination of cell ID/part of cell ID and UE ID/part of UE ID and TA ID/part of TA ID, and the PoSS format related information can refer to I_f. In one example, for this embodiment, one of the cyclic shifts can be utilized to indicate the ID and PoSS format related information, and m_M1=b_G*(I_ID+1)*(I_f+1)+c_G*(I_ID+1)+d_G*(I_f+1)+a_G, where a_G, b_G, c_G, and d_G are predefined constant integers. In another example, for this embodiment, one of the cyclic shifts can be utilized to indicate the ID and PoSS format related information, and m_M1=c_G*LID+b_G*I_f+a_G, where a_G, b_G, and c_G are predefined constant integers. In yet another example, for this embodiment, both of the cyclic shifts can be utilized to indicate the ID and PoSS format related information, and m_M1=b_G*(⌊I_ID/e_G⌋+1)*(I_f+1)+c_G*(⌊I_ID/e_G⌋+1)+d_G*(I_f+1)+a_G, m_M2=f_G*(I_ID mod e_G)+h_G, where a_G, b_G, c_G, d_G, e_G, f_G, and h_G are predefined constant integers. In yet another example, for this embodiment, both of the cyclic shifts can be utilized to indicate the ID and PoSS format related information, and m_M1=c_G*⌊I_ID/e_G⌋+b_G*I_f+a_G, m_M2=d_G*(I_ID mod e_G)+f_G, where a_G, b_G, c_G, d_G, e_G, and f_G are predefined constant integers. In yet another example, for this embodiment, both of the cyclic shifts can be utilized to indicate the ID and PoSS format related information, and m_M1=c_G*(I_ID mod e_G)+b_G*I_f+a_G, m_M2=d_G*⌊I_ID/e_G⌋+f_G, where a_G, b_G, c_G, d_G, e_G, and f_G are predefined constant integers.

In yet another embodiment, PoSS sequence can carry the combination of the ID and system information/system information update indicator, wherein ID can refer to I_ID, i.e., at least one of or the combination of cell ID/part of cell ID and UE ID/part of UE ID and TA ID/part of TA ID, and the system information/system information update indicator can refer to I_s. In one example, for this embodiment, one of the cyclic shifts can be utilized to indicate the ID and system information related information, and m_M1=b_G*(I_ID+1)*(I_s+1)+c_G*(I_ID+1)+d_G*(I_s+1)+a_G, where a_G, b_G, c_G, and d_G are predefined constant integers. In another example, for this embodiment, one of the cyclic shifts can be utilized to indicate the ID and system information related information, and m_M1=c_G*I_ID+b_G*I_s+a_G, where a_G, b_G, and c_G are predefined constant integers. In yet another example, for this embodiment, both of the cyclic shifts can be utilized to indicate the ID and system information related information, and m_M1=b_G*(⌊I_ID/e_G⌋+1)*(I_s+1)+c_G*(⌊I_ID/e_G⌋+1)+d_G*(I_s+1)+a_G, m_M2=f_G*(I_ID mod e_G)+h_G, where a_G, b_G, c_G, d_G, e_G, f_G, and h_G are predefined constant integers. In yet another example, for this embodiment, both of the cyclic shifts can be utilized to indicate the ID and system information related information, and m_M1=c_G*⌊I_ID/e_G⌋+b_G*I_s+a_G, m_M2=d_G*(I_ID mod e_G)+f_G, where a_G, b_G, c_G, d_G, e_G, and f_G are predefined constant integers. In yet another example, for this embodiment, both of the cyclic shifts can be utilized to indicate the ID and system information related information, and m_M1=c_G*(I_ID mod e_G)+b_G*I_s+a_G, m_M2=d_G*⌊I_ID/e_G⌋+f_G, where a_G, b_G, c_G, d_G, e_G, and f_G are predefined constant integers.

In yet another embodiment, PoSS sequence can carry the combination of the ID and power consumption profile/UE adaptation configuration table related information, wherein ID can refer to I_ID, i.e., at least one of or the combination of cell ID/part of cell ID and UE ID/part of UE ID and TA ID/part of TA ID, and the power consumption profile/UE adaptation configuration table related information can refer to I_profile. In one example, for this embodiment, one of the cyclic shifts can be utilized to indicate the ID and power consumption profile/UE adaptation configuration table related information, and m_M1=b_G*(I_ID+1)*(I_profile+1)+c_G*(I_ID+1)+d_G*(I_profile+1)+a_G, where a_G, b_G, c_G, and d_G are predefined constant integers. In another example, for this embodiment, one of the cyclic shifts can be utilized to indicate the ID and power consumption profile/UE adaptation configuration table related information, and m_M1=c_G*I_ID+b_G*I_profile+a_G, where a_G, b_G, and c_G are predefined constant integers. In yet another example, for this embodiment, both of the cyclic shifts can be utilized to indicate the ID and power consumption profile/UE adaptation configuration table related information, and m_M1=b_G*(⌊I_ID/e_QG⌋+1)*(I_profile+1)+c_G*(⌊I_ID/e_G⌋+1)+d_G*(I_profile+1)+a_G, m_M2=f_G*(I_ID mod e_G)+h_G, where a_G, b_G, c_G, d_G, e_G, f_G, and h_G are predefined constant integers. In yet another example, for this embodiment, both of the cyclic shifts can be utilized to indicate the ID and system information related information power consumption profile/UE adaptation configuration table related information, and $m\_M1=c\_G*\lfloor I\_ID/e\_G\rfloor+b\_G*I\_profile+a\_G$, $m\_M2=d\_G*(I\_ID \bmod e\_G)+f\_G$, where $a\_G$, $b\_G$, $c\_G$, $d\_G$, $e\_G$, and $f\_G$ are predefined constant integers. In yet another example, for this embodiment, both of the cyclic shifts can be utilized to indicate the ID and system information related information power consumption profile/UE adaptation configuration table related information, and $m\_M1=c\_G*(I\_ID \bmod e\_G)+b\_G*I\_profile+a\_G$, $m\_M2=d\_G*\lfloor I\_ID/e\_G\rfloor+f\_G$, where $a\_G$, $b\_G$, $c\_G$, $d\_G$, $e\_G$, and $f\_G$ are predefined constant integers.

In yet another embodiment, PoSS sequence can carry the combination of the ID and sleep type or power saving state related information, wherein ID can refer to I_ID, i.e., at least one of or the combination of cell ID/part of cell ID and UE ID/part of UE ID and TA ID/part of TA ID, and the sleep type or power saving state related information can refer to I_sleep. In one example, for this embodiment, one of the cyclic shifts can be utilized to indicate the ID and sleep type or power saving state related information, and $m\_M1=b\_G*(I\_ID+1)*(I\_sleep+1)+c\_G*(I\_ID+1)+d\_G*(I\_sleep+1)+a\_G$, where $a\_G$, $b\_G$, $c\_G$, and $d\_G$ are predefined constant integers. In another example, for this embodiment, one of the cyclic shifts can be utilized to indicate the ID and sleep type or power saving state related information, and $m\_M1=c\_G*I\_ID+b\_G*I\_sleep+a\_G$, where $a\_G$, $b\_G$, and $c\_G$ are predefined constant integers. In yet another example, for this embodiment, both of the cyclic shifts can be utilized to indicate the ID and sleep type or power saving state related information, and $m\_M1=b\_G*(\lfloor I\_ID/e\_G\rfloor+1)*(I\_sleep+1)+c\_G*(\lfloor I\_ID/e\_G\rfloor+1)+d\_G*(I\_sleep+1)+a\_G$, $m\_M2=f\_G*(I\_ID \bmod e\_G)+h\_G$, where $a\_G$, $b\_G$, $c\_G$, $d\_G$, $e\_G$, $f\_G$, and $h\_G$ are predefined constant integers. In yet another example, for this embodiment, both of the cyclic shifts can be utilized to indicate the ID and sleep type or power saving state related information, and $m\_M1=c\_G*\lfloor I\_ID/e\_G\rfloor+b\_G*I\_sleep+a\_G$, $m\_M2=d\_G*(I\_ID \bmod e\_G)+f\_G$, where $a\_G$, $b\_G$, $c\_G$, $d\_G$, $e\_G$, and $f\_G$ are predefined constant integers. In yet another example, for this embodiment, both of the cyclic shifts can be utilized to indicate the ID and sleep type or power saving state related information, and $m\_M1=c\_G*(I\_ID \bmod e\_G)+b\_G*I\_sleep+a\_G$, $m\_M2=d\_G*\lfloor I\_ID/e\_G\rfloor+f\_G$, where $a\_G$, $b\_G$, $c\_G$, $d\_G$, $e\_G$, and $f\_G$ are predefined constant integers.

In yet another embodiment, PoSS sequence can carry some unknown information for dynamic reconfiguration on PDCCH monitoring and DRX. In one example, for this embodiment, only one of the cyclic shift is utilized to carry the reconfiguration scalar, $m\_M1=b\_M*I\_conf+a\_M$, $m\_M2=c\_M$, where $a\_M$, $b\_M$, $c\_M$ are predefined constant integers. In another example, for this embodiment, both of the cyclic shifts can be utilized to carry the reconfiguration scalar, and $m\_M1=b\_G*(I\_conf \bmod c\_G)+a\_G$, $m\_M2=d\_G*\lfloor I\_conf/c\_G\rfloor+e\_G$, where $a\_G$, $b\_G$, $c\_G$, $d\_G$, and $e\_G$ are predefined constant integers.

In yet another embodiment, PoSS sequence can carry the combination of the ID and dynamic reconfiguration information, wherein ID can refer to I_ID, i.e., at least one of or the combination of cell ID/part of cell ID and UE ID/part of UE ID and TA ID/part of TA ID, and the dynamic reconfiguration information can refer to I_conf. In one example, for this embodiment, both of the cyclic shifts can be utilized to indicate the ID and reconfiguration scalar, and $m\_M1=c\_M*\lfloor I\_ID/e\_M\rfloor+b\_M*I\_conf+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In another example, for this embodiment, both of the cyclic shifts can be utilized to indicate the ID and reconfiguration scalar, and $m\_M1=c\_M*(I\_ID \bmod e\_M)+b\_M*I\_conf+a\_M$, $m\_M2=d\_M*\lfloor I\_ID/e\_M\rfloor+f\_M$, where $a\_M$, $b\_M$, $c\_M$, $d\_M$, $e\_M$, and $f\_M$ are predefined constant integers.

In yet another embodiment, PoSS sequence can carry the combination of the ID and DL/UL direction indication, wherein ID can refer to I_ID, i.e., at least one of or the combination of cell ID/part of cell ID and UE ID/part of UE ID and TA ID/part of TA ID, and the DL/UL direction indication can refer to I_SF. In one example, for this embodiment, both of the cyclic shifts can be utilized to indicate the ID and DL/UL direction related information, and $m\_M1=c\_M*\lfloor I\_ID/e\_M\rfloor+b\_M*I\_SF+a\_M$, $m\_M2=d\_M*(I\_ID \bmod e\_M)+f\_M$, where $a\_M$, $b\_M$, $c\_M$, $d\_M$, $e\_M$, and $f\_M$ are predefined constant integers. In another example, for this embodiment, both of the cyclic shifts can be utilized to indicate the ID and DL/UL direction related information, and $m\_M1=c\_M*(I\_ID \bmod e\_M)+b\_M*I\_SF+a\_M$, $m\_M2=d\_M*\lfloor I\_ID/e\_M\rfloor+f\_M$, where $a\_M$, $b\_M$, $c\_M$, $d\_M$, $e\_M$, and $f\_M$ are predefined constant integers.

In some embodiments, PoSS can be constructed based on ZC-sequence, e.g., the sequence constructing PoSS s(n) can be generated according to $s(n)=c(m)*\exp(-j*2*\pi*\theta*n)*\exp(-j*\pi*u*n'*(n'+1))/L\_ZC)$, $n=0, \ldots, L\_ZC-1$ where c(m) is the potential cover code, θ is the potential phase shift of ZC-sequence, m_ZC is the potential cyclic shift of ZC-sequence, u is the root of ZC-sequence, and $n'=(n+m\_ZC) \bmod L\_ZC$, $m=n \bmod L\_c$, wherein L_ZC is the length of ZC-sequence, and L_c is the length of cover code c(m).

In one embodiment, regarding the length of ZC-sequence L_ZC, L_ZC can depend on the PoSS format. For example, for cell-specific, PF-specific, and PO-specific PoSS formats, a common M-sequence length is used; and for search-space-specific PoSS format, another M-sequence length is used.

In another embodiment, regarding the length of ZC-sequence L_ZC, L_ZC can depend on the PoSS BW, if PoSS sequence is constructed and mapped per symbol. In one example, if PoSS BW is 6 PRB, L_ZC=71. In another example, if PoSS BW is 12 PRB, L_ZC=139.

In yet another embodiment, regarding the length of ZC-sequence L_ZC, L_ZC can depend on the total number of REs for PoSS, if PoSS sequence is constructed and mapped across all symbol(s) for PoSS.

In yet another embodiment, regarding the length of ZC-sequence L_ZC, L_ZC can be common for all the supported PoSS formats, PoSS BW, and REs.

In one embodiment, regarding the information carried in PoSS, ZC-sequence carries UE ID related information, and cover code carries cell ID and timing related information. Multiple PoSS sequences associated to different UEs or different group of UEs in same cell can be transmitted simultaneously, a.k.a., CDMed. In one sub-embodiment, c(m)=1 for all m, i.e., no cover code.

In one embodiment, the root u, and/or the phase shift θ of ZC-sequence is utilized for generating PoSS and carrying information in PoSS, and the cyclic shift m_ZC of ZC-sequence is fixed as 0 (i.e., no cyclic shift).

In another embodiment, the root u, and/or the cyclic shift m_ZC of ZC-sequence is utilized for generating PoSS and carrying information in PoSS, and the phase shift θ of ZC-sequence is fixed as 0 (i.e., no phase shift).

In one embodiment, PoSS sequence can carry the ID only, wherein ID can refer to LID, i.e., at least one of or the combination of cell ID/part of cell ID and UE ID/part of UE ID and TA ID/part of TA ID. In one example, for this embodiment, only the root index u can be utilized to carry the ID, and can be determined according to $u=b\_ZC*I\_ID+a\_ZC$, where $a\_ZC$ and $b\_ZC$ are predefined constant integers. In another example, for this embodiment, both the root index u and phase shift θ can be utilized to carry the ID, and can be determined according to $u=b\_ZC*(I\_ID \bmod c\_ZC)+a\_ZC$, and $\theta=\lfloor I\_ID/c\_ZC \rfloor/d\_ZC$, where $a\_ZC$, $b\_ZC$, $c\_ZC$, and $d\_ZC$ are predefined constant integers. In another example, for this embodiment, both the root index u and cyclic shift $m\_ZC$ can be utilized to carry the ID, and can be determined according to $u=b\_ZC*(I\_ID \bmod c\_ZC)+a\_ZC$, and $m\_ZC=d\_ZC\lfloor I\_ID/c\_ZC \rfloor+e\_ZC$, where $a\_ZC$, $b\_ZC$, $c\_ZC$, $d\_ZC$, and $e\_ZC$ are predefined constant integers.

In another embodiment, PoSS sequence can carry the combination of the ID and timing related information, wherein ID can refer to I_ID, i.e., at least one of or the combination of cell ID/part of cell ID and UE ID/part of UE ID and TA ID/part of TA ID, and the timing related information can refer to I_t. In one example, for this embodiment, only the root index u can be utilized to carry the ID, and the phase shift θ can be utilized to indicate the timing related information, and can be determined according to $u=b\_ZC*I\_ID+a\_ZC$, and $\theta=I\_t/c\_ZC$, where $a\_ZC$, $b\_ZC$, and $c\_ZC$ are predefined constant integers. In another example, for this embodiment, only the root index u can be utilized to carry the ID, and the cyclic shift $m\_ZC$ can be utilized to indicate the timing related information, and can be determined according to $u=b\_ZC*I\_ID+a\_ZC$, and $m\_ZC=c\_ZC*I\_t+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and timing related information, and can be determined according to $u=b\_ZC*(I\_ID \bmod c\_ZC)+a\_ZC$, and $\theta=(\lfloor I\_ID/c\_ZC \rfloor+1)(I\_t+1)/d\_ZC$, where $a\_ZC$, $b\_ZC$, $c\_ZC$, and $d\_ZC$ are predefined constant integers. In yet another example, for this embodiment, both the root index u and cyclic shift $m\_ZC$ can be utilized to carry the ID and timing related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_t+1)+e\_ZC*(\lfloor I\_ID/c\_ZC \rfloor+1)+f\_ZC*(I\_t+1)+g\_ZC$, where $a\_ZC$, $b\_ZC$, $c\_ZC$, $d\_ZC$, $e\_ZC$, $f\_ZC$, and $g\_ZC$ are predefined constant integers.

In yet another embodiment, PoSS sequence can carry the combination of the ID and PoSS format related information, wherein ID can refer to I_ID, i.e., at least one of or the combination of cell ID/part of cell ID and UE ID/part of UE ID and TA ID/part of TA ID, and the PoSS format related information can refer to I_f. In one example, for this embodiment, only the root index u can be utilized to carry the ID, and the phase shift θ can be utilized to indicate the PoSS format related information, and can be determined according to $u=b\_ZC*I\_ID+a\_ZC$, and $\theta=I\_f/c\_ZC$, where $a\_ZC$, $b\_ZC$, and $c\_ZC$ are predefined constant integers. In another example, for this embodiment, only the root index u can be utilized to carry the ID, and the cyclic shift $m\_ZC$ can be utilized to indicate the PoSS format related information, and can be determined according to $u=b\_ZC*I\_ID+a\_ZC$, and $m\_ZC=c\_ZC*I\_f+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and PoSS format related information, and can be determined according to $u=b\_ZC*(I\_ID \bmod c\_ZC)+a\_ZC$, and $\theta=(\lfloor I\_ID/c\_ZC \rfloor+1)(I\_f+1)/d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and PoSS format related information, and can be determined according to $u=b\_ZC*(I\_ID \bmod c\_ZC)+a\_ZC$, and $\theta=(e\_ZC*\lfloor I\_ID/c\_ZC \rfloor+f\_ZC*I\_f+g\_ZC)/d\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and cyclic shift $m\_ZC$ can be utilized to carry the ID and PoSS format related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_f+1)+e\_ZC*(\lfloor I\_ID/c\_ZC \rfloor+1)+f\_ZC*(I\_f+1)+g\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and phase shift θ can be utilized to carry the ID and PoSS format related information, and can be determined according to $u=b\_ZC*(I\_ID \bmod c\_ZC)+a\_ZC$, and $\theta=e\_ZC*\lfloor I\_ID/c\_ZC \rfloor+f\_ZC*I\_f+g\_ZC$, where $a\_ZC$, $b\_ZC$, $c\_ZC$, $d\_ZC$, $e\_ZC$, and $f\_ZC$ are predefined constant integers.

In yet another embodiment, PoSS sequence can carry the combination of the ID and power consumption profile/UE adaptation configuration table related information, wherein ID can refer to I_ID, i.e., at least one of or the combination of cell ID/part of cell ID and UE ID/part of UE ID and TA ID/part of TA ID, and the power consumption profile/UE adaptation configuration table related information can refer to I_profile. In one example, for this embodiment, only the root index u can be utilized to carry the ID, and the phase shift θ can be utilized to indicate the power consumption profile/UE adaptation configuration table related information, and can be determined according to $u=b\_ZC*I\_ID+a\_ZC$, and $\theta=I\_profile/c\_ZC$, where $a\_ZC$, $b\_ZC$, and $c\_ZC$ are predefined constant integers. In another example, for this embodiment, only the root index u can be utilized to carry the ID, and the cyclic shift $m\_ZC$ can be utilized to indicate the power consumption profile/UE adaptation configuration table related information, and can be determined according to $u=b\_ZC*I\_ID+a\_ZC$, and $m\_ZC=c\_ZC*I\_profile+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and power consumption profile/UE adaptation configuration table related information, and can be determined according to $u=b\_ZC*(I\_ID \bmod c\_ZC)+a\_ZC$, and $\theta=(\lfloor I\_ID/c\_ZC \rfloor+1)(I\_profile+1)/d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and power consumption profile/UE adaptation configuration table related information, and can be determined according to $u=b\_ZC*(I\_ID \bmod c\_ZC)+a\_ZC$, and $\theta=(e\_ZC*\lfloor I\_ID/c\_ZC \rfloor+f\_ZC*I\_profile+g\_ZC)/d\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and cyclic shift $m\_ZC$ can be utilized to carry the ID and power consumption profile/UE adaptation configuration table related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_profile+1)+e\_ZC*(\lfloor I\_ID/c\_ZC \rfloor+1)+f\_ZC*(I\_profile+1)+g\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and phase shift θ can be utilized to carry the ID and power consumption profile/UE adaptation configuration table related information, and can be determined according to $u=b\_ZC*(I\_ID \bmod c\_ZC)+a\_ZC$, and $\theta=e\_ZC*\lfloor I\_ID/c\_ZC \rfloor+f\_ZC*I\_profile+g\_ZC$, where $a\_ZC$, $b\_ZC$, $c\_ZC$, $d\_ZC$, $e\_ZC$, and $f\_ZC$ are predefined constant integers.

In yet another embodiment, PoSS sequence can carry the combination of the ID and sleep type or power saving state related information, wherein ID can refer to I_ID, i.e., at least one of or the combination of cell ID/part of cell ID and UE ID/part of UE ID and TA ID/part of TA ID, and the sleep type or power saving state related information can refer to I_sleep. In one example, for this embodiment, only the root index u can be utilized to carry the ID, and the phase shift θ can be utilized to indicate the sleep type or power saving state related information, and can be determined according to $u=b\_ZC*I\_ID+a\_ZC$, and $\theta=I\_sleep/c\_ZC$, where $a\_ZC$, $b\_ZC$, and $c\_ZC$ are predefined constant integers. In another example, for this embodiment, only the root index u can be utilized to carry the ID, and the cyclic shift m_ZC can be utilized to indicate the sleep type or power saving state related information, and can be determined according to $u=b\_ZC*I\_ID+a\_ZC$, and $m\_ZC=c\_ZC*I\_sleep+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and sleep type or power saving state related information, and can be determined according to $u=b\_ZC*(I\_ID \bmod c\_ZC)+a\_ZC$, and $\theta=(\lfloor I\_ID/c\_ZC \rfloor+1)(I\_sleep+1)/d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and sleep type or power saving state related information, and can be determined according to $u=b\_ZC*(I\_ID \bmod c\_ZC)+a\_ZC$, and $\theta=(e\_ZC*\lfloor I\_ID/c\_ZC \rfloor+f\_ZC*I\_sleep+g\_ZC)/d\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and cyclic shift m_ZC can be utilized to carry the ID and sleep type or power saving state related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_f+1)+e\_ZC*(\lfloor I\_ID/c\_ZC \rfloor+1)+f\_ZC*(I\_sleep+1)+g\_ZC$, where $a\_ZC$, $b\_ZC$, $c\_ZC$, $d\_ZC$, $e\_ZC$, $f\_ZC$, and $g\_ZC$ are predefined constant integers. In yet another example, for this embodiment, both the root index u and phase shift θ can be utilized to carry the ID and sleep type or power saving state related information, and can be determined according to $u=b\_ZC*(I\_ID \bmod c\_ZC)+a\_ZC$, and $\theta=e\_ZC*\lfloor I\_ID/c\_ZC \rfloor+f\_ZC*I\_sleep+g\_ZC$, where $a\_ZC$, $b\_ZC$, $c\_ZC$, $d\_ZC$, $e\_ZC$, and $f\_ZC$ are predefined constant integers.

In yet another embodiment, PoSS sequence can carry some unknown information for dynamic reconfiguration on PDCCH monitoring and DRX. In one example, for this embodiment, only the root index u can be utilized to carry reconfiguration scalar, and can be determined according to $u=b\_ZC*I\_conf+a\_ZC$, where $a\_ZC$ and $b\_ZC$ are predefined constant integers. In another example, for this embodiment, both the root index u and phase shift θ can be utilized to carry the I_conf, and can be determined according to $u=b\_ZC*(I\_conf \bmod c\_ZC)+a\_ZC$, and $\theta=\lfloor I\_conf/c\_ZC \rfloor/d\_ZC$, where $a\_ZC$, $b\_ZC$, $c\_ZC$, and $d\_ZC$ are predefined constant integers. In yet another example, for this embodiment, both the root index u and cyclic shift m_ZC can be utilized to carry the I_conf, and can be determined according to $u=b\_ZC*(I\_conf \bmod c\_ZC)+a\_ZC$, and $m\_ZC=d\_ZC*\lfloor I\_conf/c\_ZC \rfloor+e\_ZC$, where $a\_ZC$, $b\_ZC$, $c\_ZC$, $d\_ZC$, and $e\_ZC$ are predefined constant integers.

In yet another embodiment, PoSS sequence can carry the combination of the ID and dynamic reconfiguration information, wherein ID can refer to I_ID, i.e., at least one of or the combination of cell ID/part of cell ID and UE ID/part of UE ID and TA ID/part of TA ID, and the dynamic reconfiguration information can refer to I_conf. In one example, for this embodiment, only the root index u can be utilized to carry the ID, and the phase shift θ can be utilized to indicate the reconfiguration related information, and can be determined according to $u=b\_ZC*I\_ID+a\_ZC$, and $\theta=I\_conf/c\_ZC$, where $a\_ZC$, $b\_ZC$, and $c\_ZC$ are predefined constant integers. In another example, for this embodiment, only the root index u can be utilized to carry the ID, and the cyclic shift m_ZC can be utilized to indicate the reconfiguration related information, and can be determined according to $u=b\_ZC*I\_ID+a\_ZC$, and $m\_ZC=c\_ZC*I\_conf+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and reconfiguration related information, and can be determined according to $u=b\_ZC*(I\_ID \bmod c\_ZC)+a\_ZC$, and $\theta=(\lfloor I\_ID/c\_ZC \rfloor+1)(I\_conf+1)/d\_ZC$, where $a\_ZC$, $b\_ZC$, $c\_ZC$, and $d\_ZC$ are predefined constant integers. In yet another example, for this embodiment, both the root index u and cyclic shift m_ZC can be utilized to carry the ID and reconfiguration related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_conf+1)+e\_ZC*(\lfloor I\_ID/c\_ZC \rfloor+1)+f\_ZC*(I\_conf+1)+g\_ZC$, where $a\_ZC$, $b\_ZC$, $c\_ZC$, $d\_ZC$, $e\_ZC$, $f\_ZC$, and $g\_ZC$ are predefined constant integers.

In yet another embodiment, PoSS sequence can carry the combination of the ID and DL/UL direction indication, wherein ID can refer to I_ID, i.e., at least one of or the combination of cell ID/part of cell ID and UE ID/part of UE ID and TA ID/part of TA ID, and the DL/UL direction indication can refer to I_SF. In one example, for this embodiment, only the root index u can be utilized to carry the ID, and the phase shift θ can be utilized to indicate the DL/UL direction related information, and can be determined according to $u=b\_ZC*I\_ID+a\_ZC$, and $\theta=I\_SF/c\_ZC$, where $a\_ZC$, $b\_ZC$, and $c\_ZC$ are predefined constant integers. In another example, for this embodiment, only the root index u can be utilized to carry the ID, and the cyclic shift m_ZC can be utilized to indicate the DL/UL direction related information, and can be determined according to $u=b\_ZC*I\_ID+a\_ZC$, and $m\_ZC=c\_ZC*I\_SF+d\_ZC$, where $a\_ZC$, $b\_ZC$, $c\_ZC$, and $d\_ZC$ are predefined constant integers. In yet another example, for this embodiment, both the root index u and phase shift θ can be utilized to carry the ID and DL/UL direction related information, and can be determined according to $u=b\_ZC*(I\_ID \bmod c\_ZC)+a\_ZC$, and $\theta=(\lfloor I\_ID/c\_ZC \rfloor+1)(I\_SF+1)/d\_ZC$, where $a\_ZC$, $b\_ZC$, $c\_ZC$, and $d\_ZC$ are predefined constant integers. In yet another example, for this embodiment, both the root index u and cyclic shift m_ZC can be utilized to carry the ID and DL/UL direction related information, and can be determined according to $u=b\_ZC*(I\_ID \bmod c\_ZC)+a\_ZC$, and $m\_ZC=d\_ZC*(\lfloor I\_ID/c\_ZC \rfloor+1)(I\_SF+1)+e\_ZC*(\lfloor I\_ID/c\_ZC \rfloor+1)+f\_ZC*(I\_SF+1)+g\_ZC$, where $a\_ZC$, $b\_ZC$, $c\_ZC$, $d\_ZC$, $e\_ZC$, $f\_ZC$, and $g\_ZC$ are predefined constant integers.

In yet another embodiment, both the root index u and cyclic shift m_ZC can be utilized to carry the UE ID related information, $LID\char`^UE$, and reconfiguration related information, $I\_conf=0, \ldots, N\_conf-1$. More specifically, $$m\_ZC = \mathrm{mod}(I\_ID \wedge UE, a\_ZC),$$

$$\begin{cases} u = u0 + \mathrm{floor}(I_{conf}/2) * \\ \quad b_{ZC} + \mathrm{floor}\left(\dfrac{I_{ID}^{UE}}{a_{ZC}}\right) * c_{ZC}, & \text{if } \mathrm{mod}(I_{conf},2) = 0 \\ u = N_{ZC} - \left(u0 + \mathrm{floor}(I_{conf}/2) * \right. & \text{if } \mathrm{mod}(I_{conf},2) = 1 \\ \quad \left. b_{ZC} + \mathrm{floor}\left(\dfrac{I_{ID}^{UE}}{a_{ZC}}\right) * c_{ZC}\right), \end{cases}$$

where, a_ZC, b_ZC, c_ZC, u0 are predefined constants.

For one example, a_ZC=N_ZC, b_zc=ceil((N_ZC−1)/N_conf), c_zc=1, and $$u0 = \mathrm{floor}\left(\left(N\_ZC - 1 - N\_conf * \mathrm{floor}\left(\dfrac{I_{ID}^{UE}}{a_{ZC}}\right)\right)/2\right).$$

For another example, a_ZC=N_ZC, b_zc=ceil((N_ZC−1)/N_conf), c_zc=0, and u0=floor((N_ZC−1−N_conf)/2).

In yet another embodiment, both the root index u and cyclic shift m_ZC can be utilized to carry the UE ID related information, I_ID^UE, and PDCCH targets related information, I_tgt. More specifically, $$m\_ZC = \mathrm{mod}(I\_ID \wedge UE, a\_ZC),$$

$$\begin{cases} u = u0 + \mathrm{floor}(I \wedge d\_tgt/2) * \\ \quad b_{ZC} + \mathrm{floor}\left(\dfrac{I_{ID}^{UE}}{a_{ZC}}\right) * c_{ZC}, & \text{if } \mathrm{mod}(I \wedge d\_tgt/2) = 0 \\ u = N_{ZC} - \left(u0 + \mathrm{floor}(I \wedge d\_tgt/2) * \right. & \text{if } \mathrm{mod}(I \wedge d\_tgt/2) = 1 \\ \quad \left. b_{ZC} + \mathrm{floor}\left(\dfrac{I_{ID}^{UE}}{a_{ZC}}\right) * c_{ZC}\right), \end{cases}$$

$$I \wedge d\_tgt = \sum_{i=0}^{N_{tgt}-1} I\_tgt(i) * 2 \wedge i,$$

is the decimal value of bitmap I_tgt with size of N_tgt where, a_ZC, b_ZC, c_ZC, u0 are predefined constants. For example, a_ZC=N_ZC, b_zc=ceil((N_ZC−1)/N_tgt), c_zc=1, and $$u0 = \mathrm{floor}\left(\left(N\_ZC - 1 - N\_tgt * \mathrm{floor}\left(\dfrac{I_{ID}^{UE}}{a_{ZC}}\right)\right)/2\right).$$

In yet another embodiment, PoSS sequence can carry the combination of the ID and system information related information, wherein ID can refer to I_ID, i.e., at least one of or the combination of cell ID/part of cell ID and UE ID/part of UE ID and TA ID/part of TA ID, and the system information related information can refer to I_s. In one example, for this embodiment, only the root index u can be utilized to carry the ID, and the phase shift θ can be utilized to indicate the system information related information, and can be determined according to u=b_ZC*I_ID+a_ZC, and θ=Ls/c_ZC, where a_ZC, b_ZC, and c_ZC are predefined constant integers. In another example, for this embodiment, only the root index u can be utilized to carry the ID, and the cyclic shift m_ZC can be utilized to indicate the system information related information, and can be determined according to u=b_ZC*I_ID+a_ZC, and m_ZC=c_ZC*I_s+d_ZC, where a_ZC, b_ZC, c_ZC, and d_ZC are predefined constant integers. In yet another example, for this embodiment, both the root index u and phase shift θ can be utilized to carry the ID and system information related information, and can be determined according to u=b_ZC*(I_ID mod c_ZC)+a_ZC, and θ=(⌊I_ID/c_ZC⌋+1)(I_s+1)/d_ZC, where a_ZC, b_ZC, c_ZC, and d_ZC are predefined constant integers. In yet another example, for this embodiment, both the root index u and phase shift θ can be utilized to carry the ID and system information related information, and can be determined according to u=b_ZC*(I_ID mod c_ZC)+a_ZC, and θ=(e_ZC*⌊I_ID/c_ZC⌋+f_ZC*I_s+g_ZC)/d_ZC, where a_ZC, b_ZC, c_ZC, d_ZC, e_ZC, f_ZC, and g_ZC are predefined constant integers. In yet another example, for this embodiment, both the root index u and cyclic shift m_ZC can be utilized to carry the ID and system information related information, and can be determined according to u=b_ZC*(I_ID mod c_ZC)+a_ZC, and m_ZC=d_ZC*(⌊I_ID/c_ZC⌋+1)(I_s+1)+e_ZC*(⌊I_ID/c_ZC⌋+1)+f_ZC*(I_s+1)+g_ZC, where a_ZC, b_ZC, c_ZC, d_ZC, e_ZC, f_ZC, and g_ZC are predefined constant integers. In yet another example, for this embodiment, both the root index u and phase shift θ can be utilized to carry the ID and system information related information, and can be determined according to u=b_ZC*(I_ID mod c_ZC)+a_ZC, and θ=e_ZC*⌊I_ID/c_ZC⌋+f_ZC*I_s+g_ZC, where a_ZC, b_ZC, c_ZC, d_ZC, e_ZC, and f_ZC are predefined constant integers.

In yet another embodiment, PoSS sequence can carry the combination of cell ID/part of cell ID and UE ID/part of UE ID and TA ID/part of TA ID, and the DL/UL direction indication can refer to I_SF. In one example, for this embodiment, only the root index u can be utilized to carry the ID, and the phase shift θ can be utilized to indicate DL/UL direction related information, and can be determined according to u=b_ZC*I_ID+a_ZC, and θ=I_SF/c_ZC, where a_ZC, b_ZC, and c_ZC are predefined constant integers. In another example, for this embodiment, only the root index u can be utilized to carry the ID, and the cyclic shift m_ZC can be utilized to indicate the DL/UL direction related information, and can be determined according to u=b_ZC*I_ID+a_ZC, and m_ZC=c_ZC*I_SF+d_ZC, where a_ZC, b_ZC, c_ZC, and d_ZC are predefined constant integers. In yet another example, for this embodiment, both the root index u and phase shift θ can be utilized to carry the ID and DL/UL direction related information, and can be determined according to u=b_ZC*(I_ID mod c_ZC)+a_ZC, and θ=(⌊I_ID/c_ZC⌋+1)(I_SF+1)/d_ZC, where a_ZC, b_ZC, c_ZC, and d_ZC are predefined constant integers. In yet another example, for this embodiment, both the root index u and phase shift θ can be utilized to carry the ID and DL/UL direction related information, and can be determined according to u=b_ZC*(I_ID mod c_ZC)+a_ZC, and θ=(e_ZC*⌊I_ID/c_ZC⌋+f_ZC*I_SF+g_ZC)/d_ZC, where a_ZC, b_ZC, c_ZC, d_ZC, e_ZC, f_ZC, and g_ZC are predefined constant integers. In yet another example, for this embodiment, both the root index u and cyclic shift m_ZC can be utilized to carry the ID and DL/UL direction related information, and can be determined according to u=b_ZC*(I_ID mod c_ZC)+a_ZC, and m_ZC=d_ZC*(⌊I_ID/c_ZC⌋+1)(I_SF+1)+e_ZC*(⌊I_ID/c_ZC⌋+1)+f_ZC*(I_s+1)+g_ZC, where a_ZC, b_ZC, c_ZC, d_ZC, e_ZC, f_ZC, and g_ZC are predefined constant integers. In yet another example, for this embodiment, both the root index u and phase shift θ can be utilized to carry the ID and DL/UL direction related information, and can be determined according to $u=b\_ZC*(I\_ID \mod c\_ZC)+a\_ZC$, and $\theta=e\_ZC*\lfloor I\_ID/c\_ZC \rfloor+f\_ZC*I\_SF+g\_ZC$, where $a\_ZC$, $b\_ZC$, $c\_ZC$, $d\_ZC$, $e\_ZC$, and $f\_ZC$ are predefined constant integers.

In some embodiments, c(m) is a Hadamard code, and the all the embodiments in the aforementioned embodiment on the ZC-sequence design can be combined with the cover code design in this sub-component. For one example, c(m) is a fixed Hadamard code and does not carry any information in PoSS, e.g., only used for orthogonality purpose. For another example, c(m) can be from a set of Hadamard code with the same length, and carries part of the information in PoSS.

In one embodiment, cover code c(m) can carry part of the ID only, wherein ID can refer to I_ID, i.e., at least one of or the combination of cell ID/part of cell ID and UE ID/part of UE ID and TA ID/part of TA ID. In one example, for this embodiment, multiple cover codes c_i(m) are utilized to indicate the ID carried by the cover codes, and the one with index i, c_i(m), indicates $I\_ID \mod a\_c$, where a_c is a predefined constant integer. In another example, for this embodiment, multiple cover codes c_i(m) are utilized to indicate the ID carried by the cover codes, and the one with index i, c_i(m), indicates $\lfloor I\_ID/a\_c \rfloor$, where a_c is a predefined constant integer.

In another embodiment, cover code c(m) can carry part of the ID as well as timing related information, wherein ID can refer to I_ID, i.e., at least one of or the combination of cell ID/part of cell ID and UE ID/part of UE ID and TA ID/part of TA ID, and the timing related information can refer to I_t. In one example, for this embodiment, multiple cover codes c_i(m) are utilized to indicate the ID carried by the cover codes as well as the timing related information, and the one with index i, c_i(m), indicates $b\_c*(I\_ID \mod a\_c)+I\_t$, where a_c and b_c are predefined constant integers. In another example, for this embodiment, multiple cover codes c_i(m) are utilized to indicate the ID carried by the cover codes as well as the timing related information, and the one with index i, c_i(m), indicates $b\_c*(\lfloor I\_ID/a\_c \rfloor)+I\_t$, where a_c and b_c are predefined constant integers.

In yet another embodiment, cover code c(m) can carry part of the ID as well as PoSS format related information, wherein ID can refer to I_ID, i.e., at least one of or the combination of cell ID/part of cell ID and UE ID/part of UE ID and TA ID/part of TA ID, and the PoSS format related information can refer to I_f. In one example, for this embodiment, multiple cover codes c_i(m) are utilized to indicate the ID carried by the cover codes as well as the PoSS format related information, and the one with index i, c_i(m), indicates $b\_c*(I\_ID \mod a\_c)+I\_f$, where a_c and b_c are predefined constant integers. In another example, for this embodiment, multiple cover codes c_i(m) are utilized to indicate the ID carried by the cover codes as well as the PoSS format related information, and the one with index i, c_i(m), indicates $b\_c*(\lfloor I\_ID/a\_c \rfloor)+I\_f$, where a_c and b_c are predefined constant integers.

In yet another embodiment, cover code c(m) can carry part of the ID as well as power consumption profile/UE adaptation configuration table related information, wherein ID can refer to I_ID, i.e., at least one of or the combination of cell ID/part of cell ID and UE ID/part of UE ID and TA ID/part of TA ID, and the power consumption profile/UE adaptation configuration table related information can refer to I_profile. In one example, for this embodiment, multiple cover codes c_i(m) are utilized to indicate the ID carried by the cover codes as well as the power consumption profile/UE adaptation configuration table related information, and the one with index i, c_i(m), indicates $b\_c*(I\_ID \mod a\_c)+I\_profile$, where a_c and b_c are predefined constant integers. In another example, for this embodiment, multiple cover codes c_i(m) are utilized to indicate the ID carried by the cover codes as well as the power consumption profile/UE adaptation configuration table related information, and the one with index i, c_i(m), indicates $b\_c*(\lfloor I\_ID/a\_c \rfloor)+I\_profile$, where a_c and b_c are predefined constant integers.

In yet another embodiment, cover code c(m) can carry part of the ID as well as sleep type or power saving state related information, wherein ID can refer to I_ID, i.e., at least one of or the combination of cell ID/part of cell ID and UE ID/part of UE ID and TA ID/part of TA ID, and the sleep type or power saving state related information can refer to I_sleep. In one example, for this embodiment, multiple cover codes c_i(m) are utilized to indicate the ID carried by the cover codes as well as the sleep type or power saving state related information, and the one with index i, c_i(m), indicates $b\_c*(I\_ID \mod a\_c)+I\_sleep$, where a_c and b_c are predefined constant integers. In another example, for this embodiment, multiple cover codes c_i(m) are utilized to indicate the ID carried by the cover codes as well as the sleep type or power saving state related information, and the one with index i, c_i(m), indicates $b\_c*(\lfloor I\_ID/a\_c \rfloor)+I\_sleep$, where a_c and b_c are predefined constant integers.

In yet another embodiment, cover code c(m) can carry part of the ID as well as system information related information, wherein ID can refer to I_ID, i.e., at least one of or the combination of cell ID/part of cell ID and UE ID/part of UE ID and TA ID/part of TA ID, and the system information related information can refer to Lf. In one example, for this embodiment, multiple cover codes c_i(m) are utilized to indicate the ID carried by the cover codes as well as the system information related information, and the one with index i, c_i(m), indicates $b\_c*(I\_ID \mod a\_c)+I\_f$, where a_c and b_c are predefined constant integers. In another example, for this embodiment, multiple cover codes c_i(m) are utilized to indicate the ID carried by the cover codes as well as the system information related information, and the one with index i, c_i(m), indicates $b\_c*(\lfloor I\_ID/a\_c \rfloor)+I\_f$, where a_c and b_c are predefined constant integers.

In yet another embodiment, cover code c(m) can carry timing related information only, wherein the timing related information can refer to I_t. In one example, for this embodiment, multiple cover codes c_i(m) are utilized to indicate the timing related information carried by the cover codes, and the one with index i, c_i(m), indicates I_t, e.g., i=I_t. In yet another embodiment, cover code c(m) can carry PoSS format related information only, wherein the PoSS format related information can refer to I_f. In one example, for this embodiment, multiple cover codes c_i(m) are utilized to indicate the PoSS format related information carried by the cover codes, and the one with index i, c_i(m), indicates I_t, e.g., i=I_f.

In yet another embodiment, cover code c(m) can carry system information related information only, wherein the system information related information can refer to I_s. In one example, for this embodiment, multiple cover codes c_i(m) are utilized to indicate the system information related information carried by the cover codes, and the one with index i, c_i(m), indicates Ls, e.g., i=I_s.

In yet another embodiment, cover code c(m) can carry DL/UL direction information only, wherein the DL/UL direction related information can refer to I_SF. In one example, for this embodiment, multiple cover codes c_i(m) are utilized to indicate the DL/UL direction related information carried by the cover codes, and the one with index i, c_i(m), indicates I_SF, e.g., i=I_SF.

In some embodiments, c(m) is based on a_M-sequence, and the all the embodiments in the aforementioned embodiment on the ZC-sequence design can be combined with the cover code design in this sub-component. For example, if cover code carries information in PoSS, cyclic shift to the M-sequence, m_c, can be utilized to indicate the information in PoSS.

In one embodiment, cover code c(m) can carry part of the ID only, wherein ID can refer to I_ID, i.e., at least one of or the combination of cell ID/part of cell ID and UE ID/part of UE ID and TA ID/part of TA ID. In one example, for this embodiment, cyclic shift of M-sequence can be utilized to indicate the ID carried by the cover codes, and m_c=b_c*(I_ID mod a_c)+c_c, where a_c, b_c, and c_c are predefined constant integers. In another example, for this embodiment, cyclic shift of M-sequence can be utilized to indicate the ID carried by the cover codes, and m_c=b_c*⌊I_ID/a_c⌋+c_c, where a_c, b_c, and c_c are predefined constant integers.

In another embodiment, cover code c(m) can carry part of the ID as well as timing related information, wherein ID can refer to I_ID, i.e., at least one of or the combination of cell ID/part of cell ID and UE ID/part of UE ID and TA ID/part of TA ID, and the timing related information can refer to I_t. In one example, for this embodiment, cyclic shift of M-sequence can be utilized to indicate the ID carried by the cover codes as well as the timing related information, and m_c=b_c*((I_ID mod a_c)+1)(I_t+1)+c_c*((I_ID mod a_c)+1)+d_c*(I_t+1)+e_c, where a_c, b_c, c_c, d_c, and e_c are predefined constant integers. In another example, for this embodiment, cyclic shift of M-sequence can be utilized to indicate the ID carried by the cover codes as well as the timing related information, and m_c=b_c*(⌊I_ID/a_c⌋+1)(I_t+1)+c_c*(⌊I_ID/a_c⌋+1)+d_c*(I_t+1)+e_c, where a_c, b_c, c_c, d_c, and e_c are predefined constant integers.

In yet another embodiment, cover code c(m) can carry part of the ID as well as PoSS format related information, wherein ID can refer to I_ID, i.e., at least one of or the combination of cell ID/part of cell ID and UE ID/part of UE ID and TA ID/part of TA ID, and the PoSS format related information can refer to I_f. In one example, for this embodiment, cyclic shift of M-sequence can be utilized to indicate the ID carried by the cover codes as well as the PoSS format related information, and m_c=b_c*((I_ID mod a_c)+1)(I_f+1)+c_c*((I_ID mod a_c)+1)+d_c*(I_f+1)+e_c, where a_c, b_c, c_c, d_c, and e_c are predefined constant integers. In another example, for this embodiment, cyclic shift of M-sequence can be utilized to indicate the ID carried by the cover codes as well as the PoSS format related information, and m_c=b_c*(⌊I_ID/a_c⌋+1)(I_f+1)+c_c*(⌊I_ID/a_c⌋+1)+d_c*(I_f+1)+e_c, where a_c, b_c, c_c, d_c, and e_c are predefined constant integers.

In yet another embodiment, cover code c(m) can carry part of the ID as well as power consumption profile/UE adaptation configuration table related information, wherein ID can refer to I_ID, i.e., at least one of or the combination of cell ID/part of cell ID and UE ID/part of UE ID and TA ID/part of TA ID, and the power consumption profile/UE adaptation configuration table related information can refer to I_profile. In one example, for this embodiment, cyclic shift of M-sequence can be utilized to indicate the ID carried by the cover codes as well as the power consumption profile/UE adaptation configuration table related information, and m_c=b_c*((I_ID mod a_c)+1)(I_profile+1)+c_c*((I_ID mod a_c)+1)+d_c*(I_profile+1)+e_c, where a_c, b_c, c_c, d_c, and e_c are predefined constant integers. In another example, for this embodiment, cyclic shift of M-sequence can be utilized to indicate the ID carried by the cover codes as well as the power consumption profile/UE adaptation configuration table related information, and m_c=b_c*(⌊I_ID/a_c⌋+1)(I_profile+1)+c_c*(⌊I_ID/a_c⌋+1)+d_c*(I_profile+1)+e_c, where a_c, b_c, c_c, d_c, and e_c are predefined constant integers.

In yet another embodiment, cover code c(m) can carry part of the ID as well as sleep type or power saving state related information, wherein ID can refer to I_ID, i.e., at least one of or the combination of cell ID/part of cell ID and UE ID/part of UE ID and TA ID/part of TA ID, and the sleep type or power saving state related information can refer to I_sleep. In one example, for this embodiment, cyclic shift of M-sequence can be utilized to indicate the ID carried by the cover codes as well as the sleep type or power saving state related information, and m_c=b_c*((I_ID mod a_c)+1)(I_sleep+1)+c_c*((I_ID mod a_c)+1)+d_c*(I_sleep+1)+e_c, where a_c, b_c, c_c, d_c, and e_c are predefined constant integers. In another example, for this embodiment, cyclic shift of M-sequence can be utilized to indicate the ID carried by the cover codes as well as the sleep type or power saving state related information and m_c=b_c*(⌊I_ID/a_c⌋+1)(I_sleep+1)+c_c*(⌊I_ID/a_c⌋+1)+d_c*(I_sleep+1)+e_c, where a_c, b_c, c_c, d_c, and e_c are predefined constant integers.

In yet another embodiment, cover code c(m) can carry part of the ID as well as system information related information, wherein ID can refer to I_ID, i.e., at least one of or the combination of cell ID/part of cell ID and UE ID/part of UE ID and TA ID/part of TA ID, and the system information related information can refer to I_f. In one example, for this embodiment, cyclic shift of M-sequence can be utilized to indicate the ID carried by the cover codes as well as the system information related information, and m_c=b_c*((I_ID mod a_c)+1)(I_s+1)+c_c*((I_ID mod a_c)+1)+d_c*(I_s+1)+e_c, where a_c, b_c, c_c, d_c, and e_c are predefined constant integers. In another example, for this embodiment, cyclic shift of M-sequence can be utilized to indicate the ID carried by the cover codes as well as the system information related information, and m_c=b_c*(⌊I_ID/a_c⌋+1)(I_s+1)+c_c*(⌊I_ID/a_c⌋+1)+d_c*(I_s+1)+e_c, where a_c, b_c, c_c, d_c, and e_c are predefined constant integers.

In yet another embodiment, cover code c(m) can carry timing related information only, wherein the timing related information can refer to I_t. In one example, for this embodiment, cyclic shift of M-sequence can be utilized to indicate the timing related information carried by the cover codes, and m_c=a_c*I_t+b_c, where a_c, and b_c are predefined constant integers.

In yet another embodiment, cover code c(m) can carry PoSS format related information only, wherein the PoSS format related information can refer to I_f. In one example, for this embodiment, cyclic shift of M-sequence can be utilized to indicate the PoSS format related information carried by the cover codes, and m_c=a_c*I_f+b_c, where a_c, and b_c are predefined constant integers.

In yet another embodiment, cover code c(m) can carry PoSS format related information only, wherein the system information related information can refer to I_s. In one example, for this embodiment, cyclic shift of M-sequence can be utilized to indicate the system information related information carried by the cover codes, and $m\_c=a\_c*I\_s+b\_c$, where $a\_c$, and $b\_c$ are predefined constant integers.

In yet another embodiment, cover code $c(m)$ can carry DL/UL direction information only, wherein the DL/UL direction related information can refer to $I\_SF$. In one example, for this embodiment, cyclic shift of M-sequence can be utilized to indicate the DL/UL direction related information carried by the cover codes, and $m\_c=a\_c*I\_SF+b\_c$, where $a\_c$, and $b\_c$ are predefined constant integers.

In some embodiments, $c(m)$ is based on a Gold-sequence, and the all the embodiments in the aforementioned embodiment on the ZC-sequence design can be combined with the cover code design in this sub-component. For example, if cover code carries information in PoSS, cyclic shifts to one or both of the M-sequences generating the Gold-sequence, $m\_c1$ and/or $m\_c2$, can be utilized to indicate the information in PoSS.

In one embodiment, cover code $c(m)$ can carry part of the ID only, wherein ID can refer to $I\_ID$, i.e., at least one of or the combination of cell ID/part of cell ID and UE ID/part of UE ID and TA ID/part of TA ID. In one example, for this embodiment, cyclic shift of one M-sequence can be utilized to indicate the ID carried by the cover codes, and $m\_c1=b\_c*(I\_ID \bmod a\_c)+c\_c$, where $a\_c$, $b\_c$, and $c\_c$ are predefined constant integers. In another example, for this embodiment, cyclic shift of one M-sequence can be utilized to indicate the ID carried by the cover codes, and $m\_c1=b\_c*\lfloor I\_ID/a\_c \rfloor+c\_c$, where $a\_c$, $b\_c$, and $c\_c$ are predefined constant integers.

In another embodiment, cover code $c(m)$ can carry part of the ID as well as timing related information, wherein ID can refer to $I\_ID$, i.e., at least one of or the combination of cell ID/part of cell ID and UE ID/part of UE ID and TA ID/part of TA ID, and the timing related information can refer to $I\_t$. In one example, for this embodiment, cyclic shift of one M-sequence can be utilized to indicate the ID carried by the cover codes, and cyclic shift of the other M-sequence can be utilized to indicate the timing related information, and $m\_c1=b\_c*(I\_ID \bmod a\_c)+c\_c$, $m\_c2=d\_c*I\_t+e\_c$, where $a\_c$, $b\_c$, $c\_c$, $d\_c$, and $e\_c$ are predefined constant integers. In another example, for this embodiment, cyclic shift of one M-sequence can be utilized to indicate the ID carried by the cover codes, and cyclic shift of the other M-sequence can be utilized to indicate the timing related information, and $m\_c1=b\_c*\lfloor I\_ID/a\_c \rfloor+c\_c$, $m\_c2=d\_c*I\_t+e\_c$, where $a\_c$, $b\_c$, $c\_c$, $d\_c$, and $e\_c$ are predefined constant integers.

In yet another embodiment, cover code $c(m)$ can carry part of the ID as well as PoSS format related information, wherein ID can refer to $I\_ID$, i.e., at least one of or the combination of cell ID/part of cell ID and UE ID/part of UE ID and TA ID/part of TA ID, and the PoSS format related information can refer to Lf. In one example, for this embodiment, cyclic shift of one M-sequence can be utilized to indicate the ID carried by the cover codes, and cyclic shift of the other M-sequence can be utilized to indicate the PoSS format related information, and $m\_c1=b\_c*(I\_ID \bmod a\_c)+c\_c$, $m\_c2=d\_c*I\_f+e\_c$, where $a\_c$, $b\_c$, $c\_c$, $d\_c$, and $e\_c$ are predefined constant integers. In another example, for this embodiment, cyclic shift of one M-sequence can be utilized to indicate the ID carried by the cover codes, and cyclic shift of the other M-sequence can be utilized to indicate the PoSS format related information, and $m\_c1=b\_c*\lfloor I\_ID/a\_c \rfloor+c\_c$, $m\_c2=d\_c*I\_f+e\_c$, where $a\_c$, $b\_c$, $c\_c$, $d\_c$, and $e\_c$ are predefined constant integers.

In yet another embodiment, cover code $c(m)$ can carry part of the ID as well as power consumption profile/UE adaptation configuration table related information, wherein ID can refer to $I\_ID$, i.e., at least one of or the combination of cell ID/part of cell ID and UE ID/part of UE ID and TA ID/part of TA ID, and the power consumption profile/UE adaptation configuration table related information can refer to $I\_profile$. In one example, for this embodiment, cyclic shift of one M-sequence can be utilized to indicate the ID carried by the cover codes, and cyclic shift of the other M-sequence can be utilized to indicate the power consumption profile/UE adaptation configuration table related information, and $m\_c1=b\_c*(I\_ID \bmod a\_c)+c\_c$, $m\_c2=d\_c*I\_profile+e\_c$, where $a\_c$, $b\_c$, $c\_c$, $d\_c$, and $e\_c$ are predefined constant integers. In another example, for this embodiment, cyclic shift of one M-sequence can be utilized to indicate the ID carried by the cover codes, and cyclic shift of the other M-sequence can be utilized to indicate the power consumption profile/UE adaptation configuration table related information, and $m\_c1=b\_c*\lfloor I\_ID/a\_c \rfloor+c\_c$, $m\_c2=d\_c*I\_profile+e\_c$, where $a\_c$, $b\_c$, $c\_c$, $d\_c$, and $e\_c$ are predefined constant integers In yet another embodiment, cover code $c(m)$ can carry part of the ID as well as sleep type or power saving state related information, wherein ID can refer to $I\_ID$, i.e., at least one of or the combination of cell ID/part of cell ID and UE ID/part of UE ID and TA ID/part of TA ID, and the sleep type or power saving state related information can refer to $I\_sleep$. In one example, for this embodiment, cyclic shift of one M-sequence can be utilized to indicate the ID carried by the cover codes, and cyclic shift of the other M-sequence can be utilized to indicate the sleep type or power saving state related information, and $m\_c1=b\_c*(I\_ID \bmod a\_c)+c\_c$, $m\_c2=d\_c*I\_sleep+e\_c$, where $a\_c$, $b\_c$, $c\_c$, $d\_c$, and $e\_c$ are predefined constant integers. In another example, for this embodiment, cyclic shift of one M-sequence can be utilized to indicate the ID carried by the cover codes, and cyclic shift of the other M-sequence can be utilized to indicate the sleep type or power saving state related information, and $m\_c1=b\_c*\lfloor I\_ID/a\_c \rfloor+c\_c$, $m\_c2=d\_c*I\_sleep+e\_c$, where $a\_c$, $b\_c$, $c\_c$, $d\_c$, and $e\_c$ are predefined constant integers.

In yet another embodiment, cover code $c(m)$ can carry part of the ID as well as system information related information, wherein ID can refer to $I\_ID$, i.e., at least one of or the combination of cell ID/part of cell ID and UE ID/part of UE ID and TA ID/part of TA ID, and the system information related information can refer to $I\_f$. In one example, for this embodiment, cyclic shift of one M-sequence can be utilized to indicate the ID carried by the cover codes, and cyclic shift of the other M-sequence can be utilized to indicate the system information related information, and $m\_c1=b\_c*(I\_ID \bmod a\_c)+c\_c$, $m\_c2=d\_c*I\_s+e\_c$, where $a\_c$, $b\_c$, $c\_c$, $d\_c$, and $e\_c$ are predefined constant integers. In another example, for this embodiment, cyclic shift of one M-sequence can be utilized to indicate the ID carried by the cover codes, and cyclic shift of the other M-sequence can be utilized to indicate the system information related information, and $m\_c1=b\_c*\lfloor I\_ID/a\_c \rfloor+c\_c$, $m\_c2=d\_c*I\_s+e\_c$, where $a\_c$, $b\_c$, $c\_c$, $d\_c$, and $e\_c$ are predefined constant integers.

In yet another embodiment, cover code $c(m)$ can carry timing related information only, wherein the timing related information can refer to $I\_t$. In one example, for this embodiment, cyclic shift of one M-sequence can be utilized to indicate the timing related information carried by the cover codes, and $m\_c1=a\_c*I\_t+b\_c$, where $a\_c$, and $b\_c$ are predefined constant integers.

In yet another embodiment, cover code $c(m)$ can carry PoSS format related information only, wherein the PoSS format related information can refer to $I\_f$. In one example, for this embodiment, cyclic shift of one M-sequence can be utilized to indicate the PoSS format related information carried by the cover codes, and $m\_c1=a\_c*I\_f+b\_c$, where $a\_c$, and $b\_c$ are predefined constant integers.

In yet another embodiment, cover code $c(m)$ can carry system information related information only, wherein the system information related information can refer to $I\_s$. In one example, for this embodiment, cyclic shift of one M-sequence can be utilized to indicate the system information related information carried by the cover codes, and $m\_c1=a\_c*I\_s+b\_c$, where $a\_c$, and $b\_c$ are predefined constant integers.

In yet another embodiment, cover code $c(m)$ can carry DL/UL direction information only, wherein the DL/UL direction related information can refer to LSF. In one example, for this embodiment, cyclic shift of M-sequence can be utilized to indicate the DL/UL direction related information carried by the cover codes, and $m\_c1=a\_c*I\_SF+b\_c$, where $a\_c$, and $b\_c$ are predefined constant integers.

In some embodiments, $c(m)$ is based on a PN-sequence, and the aforementioned embodiments on the ZC-sequence design can be combined with the cover code design in this sub-component. For example, if cover code carries information in PoSS, the initial condition of the PN-sequence, $c\_int$, can be utilized to indicate the information in PoSS.

In one embodiment, cover code $c(m)$ can carry part of the ID only, wherein ID can refer to $I\_ID$, i.e., at least one of or the combination of cell ID/part of cell ID and UE ID/part of UE ID and TA ID/part of TA ID. In one example, for this embodiment, the initial condition of the PN-sequence can be utilized to indicate the ID carried by the cover codes, and $c\_int=b\_c*I\_ID+a\_c$, where $a\_c$, and $b\_c$ are predefined constant integers. In another example, for this embodiment, the initial condition of the PN-sequence can be utilized to indicate the ID carried by the cover codes, and $c\_int=b\_c*(I\_ID \bmod a\_c)+c\_c$, where $a\_c$, $b\_c$, and $c\_c$ are predefined constant integers. In yet another example, for this embodiment, the initial condition of the PN-sequence can be utilized to indicate the ID carried by the cover codes, and $c\_int=b\_c*\lfloor I\_ID/a\_c \rfloor+c\_c$, where $a\_c$, $b\_c$, and $c\_c$ are predefined constant integers.

In another embodiment, cover code $c(m)$ can carry the ID as well as timing related information, wherein ID can refer to $I\_ID$, i.e., at least one of or the combination of cell ID/part of cell ID and UE ID/part of UE ID and TA ID/part of TA ID, and the timing related information can refer to $I\_t$. In one example, for this embodiment, the initial condition of the PN-sequence can be utilized to indicate the ID carried by the cover codes as well as the timing related information, and $c\_int=b\_c*(I\_ID+1)(I\_t+1)+c\_c*(I\_ID+1)+d\_c*(I\_t+1)+e\_c$, where $b\_c$, $c\_c$, $d\_c$, and $e\_c$ are predefined constant integers. In another example, for this embodiment, the initial condition of the PN-sequence can be utilized to indicate the ID carried by the cover codes as well as the timing related information, and $c\_int=b\_c*((I\_ID \bmod a\_c)+1)(I\_t+1)+c\_c*((I\_ID \bmod a\_c)+1)+d\_c*(I\_t+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate the ID carried by the cover codes as well as the timing related information, and $c\_int=b\_c*(\lfloor I\_ID/a\_c \rfloor+1)(I\_t+1)+c\_c*(\lfloor I\_ID/a\_c \rfloor+1)+d\_c*(I\_t+1)+e\_c$, where $a\_c$, $b\_c$, $c\_c$, $d\_c$, and $e\_c$ are predefined constant integers.

In another embodiment, cover code $c(m)$ can carry power consumption profile/UE adaptation configuration table related information as well as timing related information, wherein power consumption profile/UE adaptation configuration table related information can refer to Lprofile, and the timing related information can refer to $I\_t$. In one example, for this embodiment, the initial condition of the PN-sequence can be utilized to indicate the power consumption profile/UE adaptation configuration table related information carried by the cover codes as well as the timing related information, and $c\_int=b\_c*(I\_profile+1)(I\_t+1)+c\_c*(I\_profile+1)+d\_c*(I\_t+1)+e\_c$, where $b\_c$, $c\_c$, $d\_c$, and $e\_c$ are predefined constant integers. In another example, for this embodiment, the initial condition of the PN-sequence can be utilized to indicate the power consumption profile/UE adaptation configuration table related information carried by the cover codes as well as the timing related information, and $c\_int=b\_c*((I\_profile \bmod a\_c)+1)(U+1)+c\_c*((I\_profile \bmod a\_c)+1)+d\_c*(I\_t+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate the power consumption profile/UE adaptation configuration table related information carried by the cover codes as well as the timing related information, and $c\_int=b\_c*(\lfloor I\_profile/a\_c \rfloor+1)(U+1)+c\_c*(\lfloor I\_profile/a\_c \rfloor+1)+d\_c*(I\_t+1)+e\_c$, where $a\_c$, $b\_c$, $c\_c$, $d\_c$, and $e\_c$ are predefined constant integers.

In another embodiment, cover code $c(m)$ can carry sleep type or power saving state related information as well as timing related information, wherein sleep type or power saving state related information can refer to $I\_sleep$, and the timing related information can refer to $I\_t$. In one example, for this embodiment, the initial condition of the PN-sequence can be utilized to indicate the sleep type or power saving state related information carried by the cover codes as well as the timing related information, and $c\_int=b\_c*(I\_sleep+1)(I\_t+1)+c\_c*(I\_sleep+1)+d\_c*(I\_t+1)+e\_c$, where $b\_c$, $c\_c$, $d\_c$, and $e\_c$ are predefined constant integers. In another example, for this embodiment, the initial condition of the PN-sequence can be utilized to indicate the sleep type or power saving state related information carried by the cover codes as well as the timing related information, and $c\_int=b\_c*((I\_sleep \bmod a\_c)+1)(I\_t+1)+c\_c*((I\_sleep \bmod a\_c)+1)+d\_c*(I\_t+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate sleep type or power saving state related information carried by the cover codes as well as the timing related information, and $c\_int=b\_c*(\lfloor I\_sleep/a\_c \rfloor+1)(I\_t+1)+c\_c*(\lfloor I\_sleep/a\_c \rfloor+1)+d\_c*(I\_t+1)+e\_c$, where $a\_c$, $b\_c$, $c\_c$, $d\_c$, and $e\_c$ are predefined constant integers In yet another embodiment, cover code $c(m)$ can carry part of the ID as well as PoSS format related information, wherein ID can refer to $I\_ID$, i.e., at least one of or the combination of cell ID/part of cell ID and UE ID/part of UE ID and TA ID/part of TA ID, and the PoSS format related information can refer to $I\_f$. In one example, for this embodiment, the initial condition of the PN-sequence can be utilized to indicate the ID carried by the cover codes as well as the PoSS format related information, and $c\_int=b\_c*(I\_ID+1)(I\_f+1)+c\_c*(I\_ID+1)+d\_c*(I\_f+1)+e\_c$, where $b\_c$, $c\_c$, $d\_c$, and $e\_c$ are predefined constant integers. In another example, for this embodiment, the initial condition of the PN-sequence can be utilized to indicate the ID carried by the cover codes as well as the PoSS format related information, and $c\_int=b\_c*((I\_ID \bmod a\_c)+1)(I\_f+1)+c\_c*((I\_ID \bmod a\_c)+1)+d\_c*(I\_f+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate the ID carried by the cover codes as well as the PoSS format related information, and $c\_int=b\_c*(\lfloor I\_ID/a\_c \rfloor+1)(I\_f+1)+c\_c*(\lfloor I\_ID/a\_c \rfloor+1)+d\_c*(I\_f+1)+e\_c$, where $a\_c$, $b\_c$, $c\_c$, $d\_c$, and $e\_c$ are predefined constant integers.

In yet another embodiment, cover code c(m) can carry part of the ID as well as system information related information, wherein ID can refer to I_ID, i.e., at least one of or the combination of cell ID/part of cell ID and UE ID/part of UE ID and TA ID/part of TA ID, and the system information related information can refer to I_f. In one example, for this embodiment, the initial condition of the PN-sequence can be utilized to indicate the ID carried by the cover codes as well as the system information related information, and $c\_int=b\_c*(I\_ID+1)(I\_s+1)+c\_c*(I\_ID+1)+d\_c*(I\_s+1)+e\_c$, where $b\_c$, $c\_c$, $d\_c$, and $e\_c$ are predefined constant integers. In another example, for this embodiment, the initial condition of the PN-sequence can be utilized to indicate the ID carried by the cover codes as well as the system information related information, and $c\_int=b\_c*((I\_ID \bmod a\_c)+1)(I\_s+1)+c\_c*((I\_ID \bmod a\_c)+1)+d\_c*(I\_s+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate the ID carried by the cover codes as well as the system information related information, and $c\_int=b\_c*(\lfloor I\_ID/a\_c \rfloor+1)(I\_s+1)+c\_c*(\lfloor I\_ID/a\_c \rfloor+1)+d\_c*(I\_s+1)+e\_c$, where $a\_c$, $b\_c$, $c\_c$, $d\_c$, and $e\_c$ are predefined constant integers.

In yet another embodiment, cover code c(m) can carry part of the ID as well as system information related information, wherein ID can refer to I_ID, i.e., at least one of or the combination of cell ID/part of cell ID and UE ID/part of UE ID and TA ID/part of TA ID, and the DL/UL direction related information can refer to I_SF. In one example, for this embodiment, the initial condition of the PN-sequence can be utilized to indicate the ID carried by the cover codes as well as the DL/UL direction related information, and $c\_int=b\_c*(I\_ID+1)(I\_SF+1)+c\_c*(I\_ID+1)+d\_c*(I\_SF+1)+e\_c$, where $b\_c$, $c\_c$, $d\_c$, and $e\_c$ are predefined constant integers. In another example, for this embodiment, the initial condition of the PN-sequence can be utilized to indicate the ID carried by the cover codes as well as the DL/UL direction related information and $c\_int=b\_c*((I\_ID \bmod a\_c)+1)(I\_SF+1)+c\_c*((I\_ID \bmod a\_c)+1)+d\_c*(I\_SF+1)+e\_c$, where $a\_c$, $b\_c$, $c\_c$, $d\_c$, and $e\_c$ are predefined constant integers. In yet another example, for this embodiment, the initial condition of the PN-sequence can be utilized to indicate the ID carried by the cover codes as well as the DL/UL direction related information and $c\_int=b\_c*(\lfloor I\_ID/a\_c \rfloor+1)(I\_SF+1)+c\_c*(\lfloor I\_ID/a\_c \rfloor+1)+d\_c*(I\_SF+1)+e\_c$, where $a\_c$, $b\_c$, $c\_c$, $d\_c$, and $e\_c$ are predefined constant integers.

In yet another embodiment, cover code c(m) can carry timing related information only, wherein the timing related information can refer to I_t. In one example, for this embodiment, the initial condition of the PN-sequence can be utilized to indicate the timing related information carried by the cover codes, and $c\_int=a\_c*I\_t+b\_c$, where $a\_c$, and $b\_c$ are predefined constant integers.

In yet another embodiment, cover code c(m) can carry PoSS format related information only, wherein the PoSS format related information can refer to Lf. In one example, for this embodiment, the initial condition of the PN-sequence can be utilized to indicate the PoSS format related information carried by the cover codes, and $c\_int=a\_c*I\_f+b\_c$, where $a\_c$, and $b\_c$ are predefined constant integers.

In yet another embodiment, cover code c(m) can carry PoSS format related information only, wherein the system information related information can refer to I_s. In one example, for this embodiment, the initial condition of the PN-sequence can be utilized to indicate the system information related information carried by the cover codes, and $c\_int=a\_c*I\_s+b\_c$, where $a\_c$, and $b\_c$ are predefined constant integers.

In yet another embodiment, cover code c(m) can carry DL/UL direction information only, wherein the DL/UL direction related information can refer to LSF. In one example, for this embodiment, the initial condition of the PN-sequence can be utilized to indicate the DL/UL direction related information carried by the cover codes, and $c\_int=a\_c*I\_SF+b\_c$, where $a\_c$, and $b\_c$ are predefined constant integers.

In yet another embodiment, cover code c(m) carry cell ID related information and timing information. In one example, c(m) is same as PDCCH DMRS, where ID in the initialization is cell ID. In another example, c(m) is modification of PDCCH DMRS, where the modulation of c(m) from the initial PN sequence, p(n), is determined by $I_{conf}$ or $I\char`\^d\_tgt$ if carried in PoSS. The ID in the initialization is cell ID.

More specifically, When $I_{conf}$ is carried in PoSS, $c(m)=1/\sqrt{2}(1-2*p(2n))+j*1/\sqrt{2}(1-2*p(2*n+1))$, if $\bmod(I_{conf}, 2)=0$, $c(m)=1/\sqrt{2}(1-2*p(2n))-j*1/\sqrt{2}(1-2*p(2*n+1))$, if $\bmod(I_{conf}, 2)=1$, when $I_{tgt}^d$ is carried in PoSS, $c(m)=1/\sqrt{2}(1-2*p(2n))+j*1/\sqrt{2}(1-2*p(2*n+1))$, if $\bmod(I_{tgt}^d, 2)=0$, $c(m)=1/\sqrt{2}(1-2*p(2n))-j*1/\sqrt{2}(1-2*p(2*n+1))$, if $\bmod(I_{tgt}^d, 2)=1$, PoSS construct unit is the PoSS content, which is mapped into the basic RE resources of PoSS burst block.

In one embodiment, PoSS construct unit is one OFDM symbol sequence, s(m). s(m) can be generated based on any design method as described in the aforementioned embodiments.

In one embodiment, the PoSS construct unit can be used to indicate the presence of valid PDCCH, and carry only known information to a UE.

In another embodiment, the PoSS construct unit can be used for dynamic reconfiguration, and only carry some unknown information to a UE.

In yet another embodiment, the PoSS construct unit can carry both known and unknown information to a UE.

In one embodiment, PoSS construct unit consists of two consecutive OFDM symbols, s(m, 1) and s(m, 2), where s(m, 1), s(m, 2) can be generated based on any design embodiments aforementioned.

In one embodiment, the first symbol can be used to indicate the presence of valid PDCCH, and carry only known information to UE. The second symbol can be used for dynamic reconfiguration, and carry some unknown information to UE.

The present disclosure relates to supporting existing reference signal (RS), including PDDCH DMRS, CSI-RS, SSS, PSS based power saving signal design. This disclosure also relates to modification on existing RS based power saving signal in order to support UE multiplexing or carrying information.

In one embodiment, the functionality of existing reference sequence/signal (RS) is provided based power saving signal. The existing RS can be PDCCH DMRS, CSI-RS, SSS, or PSS, or any modification of them. Except for the fundamental functionality as defined in NR specification, the existing RS can be used as power saving signal (PoSS) to trigger UE adaptation or the functionalites defined in this invention, such as PoSS-WU, PoSS-GTS, PoSS-COT, PoSS-AR, PoSS-AIR.

In one embodiment, the existing RS based PoSS can be used to trigger UE power consumption states switching. The power consumption states could be any of them following examples.

In one example, the power consumption state can be active or normal access state where UE performs normal PDCCH/PDSCH/PUSCH/PUCCH processing and periodic CSI and RRM measurements in RRC_CONNECTED state. In this state, all the baseband and FR modules are on, and no additional transition overhead is required to perform data reception and transmission.

In another example, the power consumption state can be dormant/inactive where a UE does not monitor PDCCH for data reception or transmission and performs periodic CSI and RRM measurements in the RRC_CONNECTED state. In this state, the UE can turn off part of the baseband modules and the transition overhead to active state is low. In one sub-example, the dormant/inactive state is associated with a duration T_dormant that can be fixed, such as for example 6 ms, or can be configured through higher layer signaling.

In yet another example, the power consumption state can be sleep where a UE does not do any baseband processing. The transition overhead to normal active/normal access state is high. The UE may need to perform RRM/CSI measurement and channel time/frequency and/or beam tracking. In one sub-example, the sleep state is associated with a duration T_sleep that can be fixed, such as for example 20 ms, or can be configured through higher layer signaling.

RS based PoSS can be used to trigger a UE to switch from a current power consumption state to one out of N_states, where N_states>=1. The RS based PoSS can indicate the power consumption state switching for one or any combination of the following case(s).

In one example, the RS based PoSS can indicate to a UE to switch from a normal access/active state to a dormant state. In another example, a RS based PoSS can indicate to a UE to switch from a normal access/active state to another normal/active state. In yet another example, a RS based PoSS can indicate to a UE to switch from a normal access/active state to a sleep state. In yet another example, a RS based PoSS can indicate to a UE to switch from a dormant state to a normal access/active state. In yet another example, a RS based PoSS can indicate to a UE to switch from a dormant state to another dormant state. In yet another example, a RS based PoSS can indicate to a UE to switch from a sleep state to a normal access/active state. In yet another example, a RS based PoSS can indicate to a UE to switch from a dormant state to a sleep state. In yet another example, a RS based PoSS can indicate to a UE to switch from a sleep state to a dormant state. In yet another example, a RS based PoSS can indicate to a UE to switch from a sleep state to another sleep state.

In one embodiment, a RS-based PoSS can be used to trigger dynamic UE adaptation in one or multiple power consumption dimensions. The information carried by the PoSS can be denoted as I_d with size of log 2(N_adaptation) bits. There is 1-to-1 mapping between RS pool per associated UE or group of UEs and N_adaptation candidate adaption options.

In one example, the N_adaptation candidate adaptation request can be fixed in the specification of the system operation. In another example, the N_adaptation candidate adaptation request can be provided through higher layer signaling.

In one embodiment, a RS based PoSS can be used to indicate the acknowledgement to the adaptation request from a UE. For example, two sequences out of the entire sequence pool can be used to indicate positive or negative acknowledgement to an adaptation request by a UE. In this case, the UE starts to monitor the associated two sequences after transmitting an adaptation request to a gNB.

The one embodiment, a configuration for an allocation of channel resources for RS based PoSS is provided to a UE by a gNB through higher layer signaling.

A UE can determine the bandwidth of a RS based PoSS in terms of number of RBs, N_RB, through one of the following examples.

In one example, N_RB can be fixed in the specification of the system operation, such as N_RB=24.

In another example, the BW of RS based PoSS can be configured to a UE from a gNB through higher layer signaling.

In yet another example, the BW of RS based PoSS can be configured by the gNB in response to UE assistance information from the UE.

In yet another example, a UE can transmit assistance information to indicate scaling the BW of RS based PoSS. For example, associated UE assistance information can be 1 bit where a "0" value can indicate N_RB/2 while a "1" value can indicate 2×N_RB.

In yet another example, a UE can transmit assistance information to indicate a minimum value of N_RB.

In yet another example, a UE can transmit assistance information to indicate a preferred value of N_RB.

A UE can determine a time duration of RS based PoSS in terms of number of OFDM symbols, N_OS, through one of the following approaches.

In one example, N_OS can be fixed in the specification of the system operation. For example, N_OS=2 or N_OS=3. In another example, N_OS can be configured to a UE by a gNB through higher layer signaling. In yet another example, N_OS can be configured by the gNB in response to reception of UE assistance information. In one instance, a UE can transmit assistance information to indicate a minimum value of N_OS. In another instance, a UE can transmit assistance information to indicate a preferred value of N_OS. In yet another instance, a UE can indicate one out of all possible configurations of associated RS. For example, a UE can indicate a specific CSI-RS configuration with dense RE mapping per PRB when CSI-RS is used for PoSS.

A UE can determine the periodicity of RS based PoSS, T_PoSS, through one of the following approaches.

In one example, T_PoSS can be fixed in the specification of the system operation. In another example, T_PoSS can be provided to the UE by a serving gNB through higher layer signaling. In yet another example, T_PoSS can be associated with a PDCCH monitoring periodicity, T_PDCCH. For example, T_PoSS=c0*T_PDCCH where c0 is a constant such as c0=1. In yet another example, T_PoSS can be associated with long/short DRX cycle in CDRX mode or DRX cycle for idle mode paging, T_DRX. For example, T_PoSS=c1*T_DRX where c1 is a constant such as c1=1. In yet another example, T_PoSS can be configured to a UE by a gNB in response to a reception of UE assistance information.

In one example, a UE can transmit assistance information to indicate a minimum value of T_PoSS.

In another example, a UE can transmit assistance information to indicate a preferred value of T_PoSS.

In yet another example, a UE can transmit assistance information to indicate a dynamic scaling of T_PoSS. For example, UE assistance information can be 1 bit where a "0" value can indicate T_PoSS/2 and a "1" value can indicate 2×T_PoSS.

In yet another example, T_PoSS can be associated with a default periodicity of a RS, T_RS. For example, T_PoSS=c3*T_RS where c3 is a positive integer such as c3=1.

In one embodiment, PDCCH DMRS based PoSS is provided. The PDCCH DMRS can be used to support any functionality as described this invention, such as PoSS-WU, PoSS-GTS, PoSS-COT, PoSS-AR, PoSS-RS, PoSS-AIR.

In one approach, the DMRS-based PoSS can be associated with one CORESET within a BWP. A UE can monitor the DMRS in associated CORESET as PoSS. The UE can determine the CORESET with index p, for DMRS-based PoSS monitoring/detection through one of the following: in one example: p=0, associated with PBCH and/or system information and/or random access procedure; in another example: the CORESET with maximum frequency domain resources in terms of number of RBs; in yet another example: the CORESET with minimum frequency domain resources in terms of number of RBs; in yet another example: the CORESET associated with maximum number of RBs. A UE can determine a precoder granularity for a number of REGs in the frequency domain where the UE can assume use a same DMRS precoder through one of the following: in one example, the precoder granularity is fixed and defined in the specification of the system operation, e.g. precoder granularity is all continuous RBs in the CORESET; in another example, the precoder granularity is the configured by higher layer singlaing.

In another approach, the DMRS-based PoSS can be associated with one or multiple search space set(s). A UE can monitor the DMRS in the CORESET of associated search space sets as PoSS. The UE can determine one or multiple search space set s associated with CORESET p for DMRS-based PoSS monitoring/detection through any combination of the following: in one example, the search space set s is a configured USS that UE monitors for data reception or transmission; in another example, the search space set s, is provided by higher level signaling; in yet another example, the search space set s is a configured CSS.

In yet another approach, the DMRS-based PoSS can be associated with a GC-PDCCH. A UE can monitor the DMRS in the associated GC-PDCCH as PoSS. The UE can determine the associated GC-PDCCH for DMRS-based PoSS monitoring/detection through one of the following: in one example, the GC-PDCCH is one of the configured GC-PDCCH that UE monitors; in another example, the GC-PDCCH is a dedicated GC-PDCCH for UE power saving.

In yet another approach, the DMRS-based PoSS can be the DMRS of the associated PDCCH or the power saving channel that carrying additional power saving information.

A DMRS-based PoSS can carry a ID of the UE(s) that monitor the PoSS. The ID of associated UE(s) to monitor the DMRS-based PoSS, $N_{ID}$, can be carried in the initialization of pseudo-random sequence generating the associated DMRS sequence, e.g., $c_{init}=(2^{17}(14n_{s,f}^{\mu}+l+1)(2N_{ID}+1)+2N_{ID}) \mod 2^{31}$.

For the associated UE ID, $N_{ID}$ can be a UE ID or UE group ID or cell ID, A UE can determine $N_{ID}$ through one of the following. In one example, the UE can determine $N_{ID}$ by decoding the associated RRC parameter in a PDSCH sched-uled by a DCI format with CRC scrambled by C-RNTI. In another example, the UE can determine $N_{ID}$ by decoding the associated RRC parameter in SIB. In yet another example, the UE can determine $N_{ID}$ derived from a UE ID, such that $N_{ID}=\mod(\mathrm{floor}(\Gamma UE/c1), c3)*c3$, where $\Gamma UE$ is UE ID, for example, $\Gamma UE$ is C-RNTI, where c1, c2, c3 are either predetermined in the system operation, such as c1=1, c2=4, c3=1, or provided to UE by higher layers.

In one example, PDCCH DMRS base PoSS is UE-specific, when $N_{ID} \in \{0,1, \ldots, 65535\}$ is given by the higher-layer parameter pdcch-DMRS-ScramblingID if provided. In another example, PDCCH DMRS base PoSS is cell-specific, when $N_{ID}=N^{cell}_{ID}$, where $N_{ID}=N^{cell}_{ID}$ is cell ID. In yet another example, PDCCH DMRS base PoSS is UE-group specific, when $N_{ID}=N^{group}_{ID}$, where $N^{group}_{ID}$ is UE group ID.

There can be a sequence pool with size of N_PoSS per UE or UE group with ID of N_ID. The size of sequence pool, N_PoSS, is determined according to the function supported by PoSS. There can be 1-to-1 mapping between the sequence and the information carried by PoSS.

PDCCH DMRS based PoSS can be used at least to trigger UE switch from active/normal access state to sleep state or dormant/inactive state or active/normal access state. The number of candidate states triggered by PDCCH DMRS based PoSS can be denoted by N_states, and N_states>=2.

If N_states=2, the presence of associated PDCCH DMRS can trigger switching from normal access state to normal access state, while the non-existence of PDCCH DMRS can trigger switching from normal access state to sleep state or dormant state.

If N_states>=2, there may be 1-to-1 mapping between the sequence and the candidate state to switch to. In this case, the sequence pool size equals to number of candidate states to switch to, i.e., N_PoSS=N_states.

When PDCCH DMRS based PoSS is used to trigger dynamic adaptation for a UE in normal access state, there may be 1-to-1 mapping between candidate sequence and candidate adaptation option, the sequence pool size equals to the number of total candidate dynamic adaptations, i.e., N_PoSS=N_d.

The sequence pool with size of N_PoSS of DMRS based PoSS can be generated by one or combination of embodiments defined in following.

In one embodiment of frequency shift on RE mapping, N_PoSS sequences can be generated with modification on frequency shift of RE mapping, v. In this case, the PDCCH DMRS based PoSS is mapped to configured OFDM symbol and with frequency shift of RE v, where v=0, . . . , N_PoSS−1.

In one example, the frequency shift can be determined according to: v=I_state*b+a, where a and b are constant integers, and I_state is the power consumption state to switch indicated by PoSS. For one example, a=1, b=2. When I_state=1, v=3 is utilized to indicate that UE needs to decode the associated PDCCH and/or PDSCH, while I_state=0, v=1 is utilized to indicate no PoSS exists, and that UE can skip decoding the associated PDCCH and sleep or micro-sleep. For another example, a=3, b=−2. When I_state=0, v=3 is utilized to indicate that UE needs to decode the associated PDCCH and/or PDSCH, while I_state=1, v=1 is utilized to indicate no PoSS exists, and that UE can skip decoding the associated PDCCH and sleep or micro-sleep.

In one embodiment of sequence mapping order, N_PoSS sequences can be generated based on the sequence mapping order of associated PDCCH DMRS. The candidate N_PoSS mapping order can be the following. In one example, the mapping can be from lowest RE to highest RE. In another example, the mapping can be from highest RE to lowest RE.

In one embodiment of initialization of PN-sequence, N_PoSS sequences can be generated by modifying the initialization of PN-sequence for associated PDCCH DMRS, C_init. The UE-specific or UE-group specific information, N_ID, is already carried by PoSS, c_init. Denote the modified initialization condition, c^PoSS_init, carrying PoSS sequence ID, i.e., n_PoSS, where n_PoSS=0, . . . , N_PoSS−1. In one embodiment, the modified initialization of PN-sequence is computed as C^PoSS_init= (a_PoSS*n_PoSS+C_init) mod 2^31, where a_PoSS is a predefined constant integer, e.g., a_PoSS=2^30

In one embodiment of phase mask, N_PoSS sequences can be generated by applying an phase mask, M^PoSS(i) to associated PDCCH DMRS, r(n). The PDCCH DMRS based PoSS sequence is defined as $$d(n) = M^{\wedge} PoSS\left(\left\lfloor \frac{n}{a\_PM} \right\rfloor + b\_PM\right) \bmod N\_PM * r(n),$$

$$n = 0, \ldots, N\_DMRS - 1,$$

where a_PM and b_PM are positive constant integers, N_PM is the length of phase mask, and r(n) is the original PDCCH DMRS sequence. N_DMRS is the length of associated PDCCH DMRS. Both a_PM and b_PM can be used to generate to N_PoSS candidate sequences.

In one example, the phase mask, M^PoSS(i)=[1, −1], N_PM=2. In another example, t the phase mask, M^PoSS (i)=[j, −j], N_PM=2. In yet another example, the phase mask has four candidates [1, −1, j, −j], a_PM=N_DMRS. In yet another example, a_PM=floor(N_DMRS/c_PM), where c_PM is a positive constant, e.g., c_PM=3. Only b_PM is used to carry information. In yet another example, M^PoSS (i)=[1, −1, j, −j].

PDCCH DMRS based PoSS can be applicable for general PDCCH monitoring in RRC_CONNECTED mode. The UE may monitor PoSS for network access in RRC_CONNECTED state without DRX enabled, and in this scenario, at least one of the formats of the DMRS based PoSS can be configured to the UE.

In some embodiments, CSI reference sequence/signal (CSI-RS) based PoSS is provided. CSI-RS can be used to support any functionality as described in the first embodiment.

The CSI-RS based PoSS can be used at least to wake up associated UE(s) in dormant state or sleep state or trigger UE to switch from dormant state or sleep state to normal access/active state. The CSI-RS based PoSS can used for channel tracking or resynchronization or RRM measurement. The CSI-RS based PoSS can be transmitted on demand according to the arrival of traffic.

The CSI-RS based PoSS can be a set of CSI-RS resources, where each CSI-RS resource is associated with a resource ID. UE can monitoring a set of CSI-RS resources to improve the detection performance. The set of CSI-RS based PoSS resources can be FDMed or TDMed.

The CSI-RS based PoSS can be transmitted in a dormant BWP, where a UE does not monitor PDCCH.

The associated UE(s) with ID denoted as I_ID, can be a single UE or a group of UEs that are configured to monitor the PoSS periodically. In one example, when there is 1 to 1 mapping between PoSS and associated UE, the UE ID can be the scramblingID of CSI-RS. In another example, when there is 1 to N mapping between PoSS and associated UEs, the UE group ID can be derived from the scramblingID of CSI-RS. In one sub-example, I_ID=mod(scramblingID, N_UEgroups), where N_UEgroups is number of UE groups supported per cell for PoSS monitoring.

CSI-RS based PoSS can be used as L1 signaling to indicate the power consumption profile of UE. The power consumption profile can be selected from a predefined or semi-static UE adaptation configuration table. Multiple UE transmission or reception related configuration parameters are jointly encoded in the UE adaptation configuration table. PoSS can carry a row index to the table to indicate the associated UE adaptation configuration or power consumption profile.

For CSI-RS based PoSS, the CDMed antenna ports can be used to indicate the power consumption profile or UE adaptation configuration. When the CSI-RS based PoSS is configured with N antenna ports, the highest N' antenna ports can be mapped to N' power consumption profiles or UE adaptation configuration candidates or the N' rows in the UE adaptation configuration table.

The CDMed antenna ports of CSI-RS based PoSS can be used for multiplexing of UEs or UE groups. When the CSI-RS based PoSS is configured with N antenna ports, the highest N' antenna ports can be mapped to N' UEs or UE groups with ID, I_ID.

In one embodiment, SSS based PoSS is provided. NR SSS can be used to support any functionality as described in the first embodiment.

The SSS based PoSS can be used at least to wake up associated UE(s) in light-sleep or deep sleep or trigger UE switch from dormant state or sleep state to normal access/active state. SSS based PoSS can used for channel tracking or resynchronization or RRM measurement. The SSS based PoSS can be transmitted on demand according to the arrival of traffic.

The SSS based PoSS can be a set of resources, where each SSS resource is QCLed with SS/PBCH block. UE can monitoring a set of SSS resources to improve the detection performance. The set of SSS resources can be time domain multiplexed. i.e., TDMed or frequency domain multiplexed, i.e., FDMed. The SSS based PoSS can be transmitted in a dormant BWP, where UE does not monitor PDCCH. SSS based PoSS as power saving signal can be used as L1 signaling to indicate the power consumption profile of UE. The power consumption profile can be selected from a predefined or semi-static UE adaptation configuration table. Multiple UE transmission or reception related configuration parameters are jointly encoded in the UE adaptation configuration table. PoSS can carry a row index to the table to indicate the associated UE adaptation configuration or power consumption profile.

For SSS based PoSS, the cyclic shifts, {m0, m1} can be used to indicate the power consumption profile or UE adaptation configuration.

In one example, m0=15*floor(N^1_D)+5*N^2_ID, m1=mod(N^1_ID, 112)+I_state*a, where the cell ID, N^cellID=3*N^1_ID+N^2_ID, I_state is the row index of UE adaptation configuration table. I_state={0, 1, . . . , N_states−1}, where N_states is the size of UE adaptation table or number of power consumption profiles, a is a constant, e.g., a=1.

The cyclic shifts {m0, m1} of SSS can be used for multiplexing of UEs or UE groups for SSS based PoSS. In one example, m0=15*floor(N^1_ID)+5*N^2_ID, m1=mod (N^1_ID, 112)+I_ID*a, where the cell ID, N^cellID=3*N^1_ID+N^2_ID, I_ID is the UE ID or UE group ID, and a is a constant, e.g., a=1.

In one embodiment, PSS based PoSS is provided. NR PSS can be used to support any functionality as described in the first embodiment.

The PSS based PoSS can be used at least to trigger associated UE(s) to switch from sleep state to active/normal access state. For the UE wake up from light sleep or deep sleep, the PSS based PoSS can used for channel tracking or resynchronization or RRM measurement. The PSS based PoSS can be transmitted on demand according to the arrival of traffic.

The PSS based PoSS can be a set of resources, where each PSS resource is QCLed with SS/PBCH block. UE can monitoring a set of PSS resources to improve the detection performance. The set of PSS resources can be time domain multiplexed. i.e., TDMed or frequency domain multiplexed, i.e., FDMed. The PSS based PoSS can be transmitted in a dormant BWP, where a UE does not monitor PDCCH.

PSS based PoSS as power saving signal can be used as L1 signaling to indicate the power consumption profile of UE. The power consumption profile can be selected from a predefined or semi-static UE adaptation configuration table. Multiple UE transmissions or reception related configuration parameters are jointly encoded in the UE adaptation configuration table. PSS based PoSS can carry a row index to the table to indicate the associated UE adaptation configuration or power consumption profile.

For PSS based PoSS, a cyclic shift of PSS can be used to indicate the power consumption profile or UE adaptation configuration. In this case, the PoSS can be $d\_PoSS(n)=d\_sss(n+m0)$, where m0 is the cyclic shift. In one example, m0=I_state*a, I_state is the row index of UE adaptation configuration table. I_state={0, 1, . . . , N_states−1}, where N_states is the size of UE adaptation table or number of power consumption profiles, a is a constant, e.g., a=1.

A cyclic shift of PSS can be used for multiplexing of UEs or UE groups. In this case, the PoSS can be $d\_PoSS(n)=d\_sss(n+m0)$, where m0 is the cyclic shift. For example, m0=LID*a, where LID is the UE ID or UE group ID, and a is a constant, e.g., a=1.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for a user equipment (UE) to receive physical downlink control channels (PDCCHs), the method comprising:
receiving:
a configuration for a number of reference signal (RS) resource sets, wherein:
one or more of the RS resource sets include one or more RS resources, and
one or more of the RS resource sets are associated with a spatial reception parameter,
a configuration for a paging occasion (PO) over slots in time, wherein the PO includes a number of PDCCH reception occasions, and
synchronization signals and physical broadcast channel blocks (SS/PBCH blocks);
determining:
a first of the RS resource sets that has a spatial reception parameter that is the same as a spatial reception parameter of a received SS/PBCH block,
an absence or presence of a reception for RS resources in the first RS resource set that is in a first slot that is prior to a second slot for a PDCCH reception occasion of the PO, and
an indication based on the absence or presence of the reception for the RS resources; and
receiving a PDCCH, using the spatial reception parameter of the first RS resource set, within the second slot only when the indication is for the presence of the reception for the RS resources.

2. The method of claim 1, wherein the configuration for the number of RS resource sets is provided by a system information block.

3. The method of claim 1, further comprising determining:
the PO based on an identity of the UE, and
an antenna port based on the identity of the UE, wherein each of the RS resources is a channel state information reference signal (CSI-RS) resource from the antenna port.

4. The method of claim 1, further comprising:
measuring a reference signal received power (RSRP) or a reference signal received quality (RSRQ) for a cell based on the RS resources, and
determining a cell selection criterion for the cell, wherein the RS resources provide an identity of the cell.

5. The method of claim 1, wherein the RS resources provide information for at least one of:
a slot number,
a system frame number,
a symbol number,
a paging frame index, or
a PO index.

6. The method of claim 1, further comprising determining a time offset between a start time for one or more of the RS resource sets that are in a third slot and a start time of a PO in a fourth slot based on the configuration for the number of RS resource sets.

7. The method of claim 1, further comprising determining a number of resource blocks (RBs) for reception of the number of RS resource sets based on the configuration for the number of RS resource sets.

8. A user equipment (UE) comprising:
a receiver configured to receive:
a configuration for a number of reference signal (RS) resource sets, wherein:
one or more of the RS resource sets include one or more RS resources, and
one or more of the RS resource sets are associated with a spatial reception parameter,
a configuration for a paging occasion (PO) over slots in time, wherein the PO includes a number of physical downlink control channel (PDCCH) reception occasions, and
synchronization signals and physical broadcast channel blocks (SS/PBCH blocks); and
a processor operably connected to the receiver, the processor configured to determine:
a first of the RS resource sets that has a spatial reception parameter that is the same as a spatial reception parameter of a received SS/PBCH block, an absence or presence of a reception for RS resources in the first RS resource set that is in a first slot that is prior to a second slot for a PDCCH reception occasion of the PO, and an indication to the receiver based on the absence or presence of the reception for the RS resources, wherein the receiver is further configured to receive a PDCCH, using the spatial reception parameter of the first RS resource set, within the second slot only when the indication is for the presence of the reception for the RS resources.

9. The UE of claim 8, wherein the configuration for the number of RS resource sets is provided by a system information block.

10. The UE of claim 8, wherein:

each of the RS resources is a channel state information reference signal (CSI-RS) resource from an antenna port, and the processor is further configured to determine:
the PO based on an identity of the UE, and
the antenna port based on the identity of the UE.

11. The UE of claim 8, wherein:

the RS resources provide an identity of a cell, and the processor is further configured to:
measure a reference signal received power (RSRP) or a reference signal received quality (RSRQ) for the cell based on the RS resources, and
determine a cell selection criterion for the cell.

12. The UE of claim 8, wherein the RS resources provide information for at least one of:
a slot number,
a system frame number,
a symbol number,
a paging frame index, or
a PO index.

13. The UE of claim 8, wherein the processor is further configured to determine a time offset between a start time for reception of one or more of the RS resource sets that are in a third slot and a start time of a PO in a fourth slot based on the configuration for the number of RS resource sets.

14. The UE of claim 8, wherein the processor is further configured to determine a number of resource blocks (RBs) for reception of the number of RS resource sets based on the configuration for the number of RS resource sets.

15. A base station comprising:
a transmitter configured to transmit:
a configuration for a number of reference signal (RS) resource sets, wherein:
one or more of the RS resource sets include one or more RS resources, and
one or more of the RS resource sets are associated with a spatial reception parameter,
a configuration for a paging occasion (PO) over slots in time, wherein the PO includes a number of physical downlink control channel (PDCCH) reception occasions, and
synchronization signals and physical broadcast channel blocks (SS/PBCH blocks); and
a processor operably connected to the transmitter, the processor configured to determine:
a first of the RS resource sets that has a spatial reception parameter that is the same as a spatial transmission parameter of a transmitted SS/PBCH block,
an absence or presence of a transmission for RS resources in the first RS resource set that is in a first slot that is prior to a second slot for a PDCCH reception occasion of the PO, and
an indication to the transmitter based on the absence or presence of the transmission for the RS resources,
wherein, based on the indication, the transmitter is further configured to transmit a PDCCH, using the spatial reception parameter of the first RS resource set, within the second slot only when the indication is for the presence of the reception for the RS resources.

16. The base station of claim 15, wherein the configuration for the number of RS resource sets is provided by a system information block.

17. The base station of claim 15, wherein:

each of the RS resources is a channel state information reference signal (CSI-RS) resource from an antenna port, and the processor is further configured to determine:
the PO based on an identity of a user equipment (UE), and
the antenna port based on the identity of the UE.

18. The base station of claim 15, wherein the RS resources provide information for at least one of:
a cell,
a slot number,
a system frame number,
a symbol number,
a paging frame index, or
a PO index.

19. The base station of claim 15, wherein the processor is further configured to determine a time offset between a start time for transmission of one or more of the RS resource sets that are in a third slot and a start time of a PO in a fourth slot based on the configuration for the number of RS resource sets.

20. The base station of claim 15, wherein the processor is further configured to determine a number of resource blocks (RBs) for transmission of the number of RS resource sets based on the configuration for the number of RS resource sets.

* * * * *